United States Patent
Saldin et al.

(10) Patent No.: US 11,540,354 B2
(45) Date of Patent: Dec. 27, 2022

(54) GATEWAY WITH BACKUP POWER AND COMMUNICATIONS SYSTEM

(71) Applicant: Resolution Products, LLC, St. Paul, MN (US)

(72) Inventors: Paul G. Saldin, Stillwater, MN (US); David J. Mayne, Eagan, MN (US); Brian K. Seemann, Lakeville, MN (US)

(73) Assignee: Resolution Products, LLC, St. Paul, MN (US)

( * ) Notice: Subject to any disclaimer, the term of this patent is extended or adjusted under 35 U.S.C. 154(b) by 2 days.

(21) Appl. No.: 17/039,341

(22) Filed: Sep. 30, 2020

(65) Prior Publication Data
US 2021/0100069 A1    Apr. 1, 2021

Related U.S. Application Data

(60) Provisional application No. 62/908,040, filed on Sep. 30, 2019, provisional application No. 62/908,032, (Continued)

(51) Int. Cl.
*H04W 88/16* (2009.01)
*H02J 9/06* (2006.01)
(Continued)

(52) U.S. Cl.
CPC ............... *H04W 88/16* (2013.01); *H02J 9/06* (2013.01); *H04L 45/72* (2013.01); *H02J 7/0068* (2013.01)

(58) Field of Classification Search
CPC ........... H02J 7/0068; H02J 9/06; H04L 45/72; H04W 88/16
See application file for complete search history.

(56) References Cited

U.S. PATENT DOCUMENTS 6,624,750 B1  9/2003 Marman
7,030,752 B2  4/2006 Tyroler
(Continued)

FOREIGN PATENT DOCUMENTS

CN  101013976   8/2007
CN  101030902   9/2007
(Continued)

*Primary Examiner* — Melanie Jagannathan
(74) *Attorney, Agent, or Firm* — Fish & Richardson P.C.

(57) ABSTRACT

In one implementation, a communications apparatus includes a communications circuit including a first communications system configured to communicate with a first communications network over a first communications medium; a second communications system configured to communicate with the first communications network over a second communications medium; and a communications port configured to communicate with a second communications network. The communications apparatus can further include a power circuit that includes a first power system configured to power the communications apparatus with a first power source; and a second power system configured to power the communications apparatus with a second power source. The communications apparatus can further include a processing system configured to be powered by the power circuit and selectively control communications flows between the communications port and at least one of the first communications system and the second communications system.

20 Claims, 25 Drawing Sheets

Related U.S. Application Data filed on Sep. 30, 2019, provisional application No. 62/908,035, filed on Sep. 30, 2019, provisional application No. 62/908,050, filed on Sep. 30, 2019, provisional application No. 62/908,053, filed on Sep. 30, 2019, provisional application No. 62/908,106, filed on Sep. 30, 2019.

(51) Int. Cl.
*H04L 45/00* (2022.01)
*H02J 7/00* (2006.01)

(56) References Cited

U.S. PATENT DOCUMENTS

| | | |
|---|---|---|
| 7,262,690 B2 | 8/2007 | Heaton |
| 7,449,999 B2 | 11/2008 | Hevia |
| 7,633,385 B2 | 12/2009 | Cohn |
| 7,855,635 B2 | 12/2010 | Cohn |
| 7,956,736 B2 | 6/2011 | Cohn |
| 8,073,931 B2 | 12/2011 | Dawes |
| 8,335,842 B2 | 12/2012 | Raji |
| 8,401,575 B2 | 3/2013 | Fischer |
| 8,456,278 B1 | 6/2013 | Bergman |
| 8,473,619 B2 | 6/2013 | Baum |
| 8,478,844 B2 | 6/2013 | Baum |
| 8,478,871 B2 | 7/2013 | Gutt |
| 8,612,591 B2 | 12/2013 | Dawes |
| 8,638,211 B2 | 1/2014 | Cohn |
| 8,649,386 B2 | 2/2014 | Ansari |
| 8,970,368 B2 | 3/2015 | Bergman |
| 9,141,276 B2 | 9/2015 | Dawes |
| 9,412,248 B1 | 8/2016 | Cohn et al. |
| 10,178,533 B2 | 1/2019 | Saldin et al. |
| 10,311,359 B2 | 6/2019 | Seemann et al. |
| 10,621,139 B2 | 4/2020 | Hofstaedter |
| 10,878,322 B2 | 12/2020 | Seeman et al. |
| 2002/0077077 A1 | 6/2002 | Rezvani et al. |
| 2004/0204019 A1 | 10/2004 | Addy |
| 2005/0232186 A1 | 10/2005 | Karaoguz et al. |
| 2006/0072542 A1 | 4/2006 | Sinnreich et al. |
| 2008/0181130 A1 | 7/2008 | Balu |
| 2009/0070681 A1 | 3/2009 | Dawes et al. |
| 2009/0077622 A1 | 3/2009 | Baum et al. |
| 2009/0138547 A1 | 5/2009 | Boudreau |
| 2009/0233602 A1 | 9/2009 | Hughes |
| 2010/0172362 A1* | 7/2010 | Zhou .................. H04L 12/2834 370/402 |
| 2010/0277300 A1 | 11/2010 | Cohn |
| 2010/0304673 A1 | 12/2010 | Yoshizawa |
| 2010/0323665 A1 | 12/2010 | Ibe et al. |
| 2011/0191465 A1 | 8/2011 | Hofstaedter |
| 2012/0036242 A1 | 2/2012 | Wittenburg et al. |
| 2012/0089299 A1 | 4/2012 | Breed et al. |
| 2013/0051395 A1 | 2/2013 | Hansen |
| 2013/0124736 A1 | 5/2013 | Park |
| 2013/0154558 A1 | 6/2013 | Lee |
| 2013/0265158 A1 | 10/2013 | Bergman et al. |
| 2014/0062297 A1 | 3/2014 | Bora |
| 2014/0089143 A1 | 3/2014 | Dione |
| 2014/0115142 A1 | 4/2014 | Peng |
| 2014/0133378 A1 | 5/2014 | Wentink |
| 2014/0156819 A1 | 6/2014 | Cavgalar |
| 2014/0173692 A1 | 6/2014 | Srinivasan |
| 2014/0207707 A1 | 7/2014 | Na |
| 2014/0313882 A1* | 10/2014 | Rucker .................. H04W 76/15 370/219 |
| 2014/0368033 A1* | 12/2014 | Manikandan ............ H02J 9/06 307/23 |
| 2015/0005024 A1 | 1/2015 | Fudickar |
| 2015/0049189 A1 | 2/2015 | Yau et al. |
| 2015/0067816 A1 | 3/2015 | Rados |
| 2015/0098375 A1 | 4/2015 | Ree |
| 2015/0170506 A1 | 6/2015 | Bergman |
| 2015/0178548 A1 | 6/2015 | Abdallah |
| 2015/0288825 A1* | 10/2015 | Cook .................... H04M 7/125 379/220.01 |
| 2016/0100023 A1 | 4/2016 | Kim |
| 2016/0105041 A1* | 4/2016 | Henderson ........ H02J 7/007184 320/162 |
| 2016/0204606 A1* | 7/2016 | Matan .................. H02J 3/1892 700/291 |
| 2016/0295397 A1 | 10/2016 | Nielson |
| 2016/0323972 A1 | 11/2016 | Bora |
| 2017/0079257 A1 | 3/2017 | Haensgen |
| 2017/0127124 A9 | 5/2017 | Wilson |
| 2017/0127155 A1 | 5/2017 | Zheng |
| 2017/0230074 A1* | 8/2017 | Rose .................... H02J 7/0014 |
| 2017/0373529 A1* | 12/2017 | Fitzgerald ............... H02J 9/061 |
| 2018/0097830 A1 | 4/2018 | Shibata |
| 2019/0141506 A1 | 5/2019 | Saldin |
| 2020/0344586 A1 | 10/2020 | Saldin |
| 2021/0166134 A1 | 6/2021 | Seeman |

FOREIGN PATENT DOCUMENTS

| | | |
|---|---|---|
| CN | 101052345 | 10/2007 |
| CN | 101321180 | 12/2008 |
| CN | 102308073 | 1/2012 |
| WO | WO 2017/001928 | 1/2017 |
| WO | WO 2020/206453 | 10/2020 |

\* cited by examiner

GATEWAY WITH BACKUP POWER AND COMMUNICATIONS SYSTEM

CROSS-REFERENCE TO RELATED APPLICATIONS

This application claims the benefit of U.S. Provisional Application Ser. Nos. 62/908,106; 62/908,053; 62/908,050; 62/908,040; 62/908,035; and 62/908,032, all filed Sep. 30, 2019. The disclosure of the prior applications is considered part of (and is incorporated by reference in) the disclosure of this application.

TECHNICAL FIELD

This specification relates to electronic device communication, including electronic device communication in security and automation systems.

BACKGROUND

Gateway devices are digital networking devices that can be used to allow data to flow from one discrete network to another. Network gateways, known as protocol translation gateways or mapping gateways, can perform protocol conversions to connect networks with different network protocol technologies. They are commonly used to connect local area networks (LANs), such as home of office networks, to a wide area network (WAN), such as a network connection provided by an internet service provider (ISP). In some applications, the network gateway device also performs other roles such as that of a proxy server or network firewall. Security system gateway devices have been used to provide interfaces between mobile computing devices and an underlying security system, and the security system component devices. Communication bridge devices are digital networking devices that allow data to flow from one network format to another. In some applications, the network gateway device also performs other roles such as that of a proxy server or network firewall. Media gateways, also known as media bridges, can perform media conversions to connect networks with different network media. Such devices have been used in premises security/automation systems to provide the point of communication between the system and the outside world (e.g., a central station).

Security systems, such as home security systems, have used sensors positioned within a premises to monitor the security status of the premises and to generate security alarms when the premises has been breached. For example, sensors can be positioned on doors at a home to detect when the doors have been opened. If the security system is armed while a door opening event is detected, a security alarm can be generated indicating that the premises has been breached and that a security response should be initiated (e.g., call from security service to homeowner to verify event, dispatch police officer).

Remote keyless systems have been implemented in which an electronic remote control functions as a key to a vehicle or building. The remote control can be activated manually, or automatically through proximity detection. For example, a vehicle can be unlocked without a user physically pushing a button to the remote control. Instead, the vehicle can sense the approach of the remote control and can unlock when the remote control is detected. Keyless remotes can include a short-range radio transmitter, and must generally be within a specific range (e.g., 10-50 feet) of the vehicle or building to be detected. Keyless remotes can be coupled with security systems of particular vehicles or buildings, and can be configured to only operate with those vehicles or buildings.

In a connected and secure home, the services layer of a home automation/security system can garner value from the multitude of information coming from the multitude of sensors pre-existing or added in homes, buildings, and other locations. For example, at present many homes include multiple different sensors that transmit information about one or more components/systems within the homes, such as information indicating whether doors/windows are open or closed, motion sensor information, alarm status information, environmental information, and other information that sensors are capable of detecting. A large portion of installed sensors are wireless—meaning that they transmit at least some information wirelessly using one or more wireless protocols. The information from these sensors can have a variety of uses, such as being used to chart, classify and model consumer habits, initiate actions outside the home, automate devices and functions inside the home, and provide core security, life safety and home infrastructure monitoring and response.

Enrolling sensors with a third-party wireless system (e.g., a system not preconfigured to use or connect with particular sensors) can be a non-trivial operation. For instance, the wireless air can be considered one large, common channel over which all sensors are talking. Generally, an installer can enroll a sensor with a wireless system by causing a unique, uncommon transmission to be sent by the sensor, in order to ensure the correct sensor among many is being enrolled. Or, in another example, a unique identifier can be known for a sensor and entered into the wireless system. In a further example, installing old sensors with a wireless system (e.g., in takeover installations of old sensors) can include the installer identifying the make, model and function of each old sensor, which can be time-consuming and can require a fair amount of installer expertise. Regardless of how it is accomplished, the enrollment paradigm may be considered "closed," in a sense that an installer or user knows the sensors that are to be enrolled as part of the system, and some user action with the sensor is performed so that the desired sensor is installed.

Conventional closed systems often include technological and other barriers to recognizing sensors. For example, recognizing, enrolling and configuring wireless sensors in conventional closed systems is generally non-trivial because the wireless air surrounding the sensors is a large, common channel where all sensors are talking. Generally, an installer must cause a unique, uncommon transmission to be sent from a sensor in order to assure that the correct sensor among many is being enrolled. Alternatively, a unique radio frequency identifier (RFID) must be known and entered. Further, in take-over installations of old sensors, installers must identify the make, model, and function of each old sensor in order to properly enroll and configure each old sensor. All these types of actions can require significant time, expertise, and cost.

Security systems, such as wireless home security systems, have used distributed sensors and other security device that communicate with security system controller to provide information about a premises, such as a home or building. For example, wireless sensors can communicate with a security controller (e.g., security control panel, security gateway), for example, when a state of the sensor has changed, such as a reed switch that has changed state due to a door being opened. In addition, wireless sensors may communicate with the security system on a periodic basis making what is typically called a "supervisory" transmission, for example, to communicate that the sensor is working properly and that its battery is satisfactory. Depending on the state of the security system (for example, whether in an "armed state" or not), the security system controller can determine whether the state information provided to it by the sensors constitutes an alarm condition, and if so, the security system controller can be programmed to take the appropriate action, such as sounding a siren, making communications to a remote monitoring system, etc.

SUMMARY

In general, this document describes electronic device communication, including communication bridges of premises security/automation systems, electronic communication gateways, adjusting a transmission signal strength of a pinger device, wireless device discovery and identification (e.g., wireless device discovery and identification within a premises automation or security system), security systems, and perimeter sensors for a premises, such as a home, business, building, structure, or area.

In one implementation, a communications apparatus includes a communications circuit including a first communications system configured to communicate with a first communications network over a first communications medium; a second communications system configured to communicate with the first communications network over a second communications medium; and a communications port configured to communicate with a second communications network. The communications apparatus can further include a power circuit that includes a first power system configured to power the communications apparatus with a first power source; and a second power system configured to power the communications apparatus with a second power source. The communications apparatus can further include a processing system configured to be powered by the power circuit and selectively control communications flows between the communications port and at least one of the first communications system and the second communications system.

Such a communications apparatus can optionally include one or more of the following features. The power circuit can further include a power selection circuit configured to determine availability of power from the first power system and the second power system; selectively source power from the first power source or the second power source based on the determined availability; and power at least one of the communications circuit and the processing system with the selectively sourced power. The power selection circuit can further be configured to determine costs of power from the first power system and the second power system; and selectively source power from the first power source or the second power source based on the determined costs. The first power source can include a mains power source. The second power system can include an onboard uninterruptable power supply (UPS). Selectively controlling communications flows between the communications port and at least one of the first communications system and the second communications can include determining a first communications bandwidth to the first communications network through the first communications system; determining a second communications bandwidth to the first communications network through the second communications system; and routing communications between the first communications network and the second communications network through at least one of the first communications system and the second communications system based on the first communications bandwidth and the second communications bandwidth. Selectively controlling communications flows between the communications port and at least one of the first communications system and the second communications can include: determining a first cost of communications with the first communications network through the first communications system; determining a second cost of communications with the first communications network through the second communications system; and route communications between the first communications network and the second communications network through at least one of the first communications system and the second communications system based on the first cost and the second cost. Selectively controlling communications flows between the communications port and at least one of the first communications system and the second communications can include identifying a data connection between a first endpoint on the first communications network and a second endpoint on the second communications network; identifying a first data packet of the data connection; identifying a second data packet of the data connection; routing the first packet through the first communications system; and routing the second packet through the second communications system. The first communications network can be the Internet. The second communications network can be a local area network (LAN).

The systems and techniques described here may provide one or more of the following advantages. First, a system can provide increased reliability for network communications. For example, an example gateway may have multiple communication paths between local and remote communication networks. The gateway may communicate with a remote network even if one or more communication paths have failed or are otherwise unavailable. Second, the system can provide redundant fault tolerance for wide area network (WAN) communications. Third, communication performance may be enhanced by facilitating selection of a communication path based on one or more parameters. For example, a high-bandwidth communication path may be selected for video transmission or other data-intensive communications. Alternatively or additionally, a communication path may be selected based on one or more of availability, cost, energy usage, etc. Fourth, the system can provide increased uptime and availability in the event of power interruptions.

In various example embodiments described herein, a communication bridge provides an awareness of multiple premises subsystems and/or facilitates interaction between the subsystems, in addition to facilitating communication with external systems, such as a central station of a premises security/automation system or cloud-based systems. In some example systems, various subsystems located at the premises have no awareness of one another and do not communicate directly with one another. The communication bridge facilitates an ability of these subsystems to operate together using information generated by respective subsystems, for example, without being directly connected with one another. In some optional embodiments, the communication bridge publishes available information (e.g., sensor feeds) to various subsystems at the premises. The communication bridge can then communicate information to the subsystems (e.g., as requested by the subsystem or as determined by the gateway).

In various example embodiments, a premises security/automation system includes multiple subsystems in communication with the communication bridge. For example, the premises security/automation system may include an access control system and a video subsystem that is not directly connected (e.g., and unaware of) the access control system. The communication bridge is in communication with both the access control system and video system, and may direct communications to one based on input from the other, for example (e.g., without any interaction between the access control system and the video system.

In one implementation, a method for electronic communication in a premises security/automation system using a communication bridge includes receiving from a first component of a premises security/automation system, at a first processing system, a first communication having a first communication protocol; storing, by the first processing system, at least part of the first communication; transforming, by the first processing system, at least part of the stored first communication into a second communication having a second communication protocol; and providing to a second component of the premises security/automation system, by the first processing system, the second communication.

Such a method can optionally include one or more of the following features. Providing, by the first processing system, the second communication can further include transmitting the second communication to a second processing system. The first communication can be provided by a third processing system configured to communicate based on the first communication protocol. The second communication can be provided to the second processing system in response to a third communication based on the second communication protocol. The method can further include transforming, by the first processing system, at least part of the stored first communication into a third communication having a third communication protocol; and providing, by the first processing system, the third communication to a third processing system configured to communicate based on the third communication protocol. The method can further include receiving, at the first processing system, a third communication having a third communication protocol; storing, by the first processing system, at least part of the third communication; transforming, by the first processing system, at least part of the stored third communication into a fourth communication having the second communication protocol; and providing, by the first processing system, the fourth communication to a fourth processing system configured to communicate based on the second communication protocol. The method can further include determining, by the first processing system, data having a first data type in a first format in the first communication; and identifying, by the first processing system, that the first data type is consumable by a second processing system. Transforming at least part of the stored first communication into the second communication having a second communication protocol can further include transforming the data from the first format into a second format consumable by the second processing system. The second communication can further include transmitting, by the first processing system and based on the identifying, the second communication to the second processing system.

In some implementations, a communications bridge apparatus configured to communicate with multiple components of a premises security/automation system includes a data processing apparatus; and a non-transitory memory storage storing instructions executable by the data processing apparatus and that upon such execution cause the data processing apparatus to perform operations including receiving from a first component of a premises security/automation system, at a first processing system, a first communication having a first communication protocol; storing, by the first processing system, at least part of the first communication; transforming, by the first processing system, at least part of the stored first communication into a second communication having a second communication protocol; and providing to a second component of the premises security/automation system, by the first processing system, the second communication.

In some implementations, a non-transitory computer readable medium storing instructions executable by a data processing apparatus and that upon such execution cause the data processing apparatus to perform operations including receiving from a first component of a premises security/automation system, at a first processing system, a first communication having a first communication protocol; storing, by the first processing system, at least part of the first communication; transforming, by the first processing system, at least part of the stored first communication into a second communication having a second communication protocol; and providing to a second component of the premises security/automation system, by the first processing system, the second communication.

The systems and techniques described here may provide one or more of the following advantages. First, some example systems described herein can provide enhanced interrelationships between system components that are not directly connected and/or that may not be capable of directly communicating with one another. Additional information may be available to system components that may not otherwise be available and that can be used to determine appropriate behavior of the system component. In some embodiments, an example communication bridge of a premises security/automation system thus may facilitate additional functionality as compared to each of the system components operating independently.

Second, in some embodiments, the communication bridge may facilitate system set-up or addition of system components. For example, system components of different manufacturers, that use different communication protocols, or that may not be directly compatible with one another may be integrated into a single system using the communication bridge.

Third, in various example embodiments, a communication gateway can function as a hub both to facilitate communication between subsystems located at the premises and to communicate with the outside world, such as a central station, other networks, etc.

This document also describes systems, devices, techniques, and mechanisms for adjusting a transmission signal strength of a pinger device. For example, a user of the pinger device (e.g., a portable remote control device, such as a key fob) may choose to decrease the device's signal strength such that the device's wireless beacon signal is detectable from a short distance to a gateway device (e.g., a device that controls a security system such as a door lock), or may choose to increase the device's signal strength such that the device's wireless beacon signal is detectable from a long distance to the gateway device. The user can initiate a process for adjusting and setting the transmission signal strength of the pinger device, for example, when located at a distance from the gateway device at which one or more actions (e.g., unlocking a door, or another suitable action) are desired to be triggered. The pinger device can receive a command to set its signal strength (e.g., provided through one or more buttons of the pinger device and/or a user interface of a paired mobile computing device), and in response, the pinger device can adjust its signal strength (e.g., increase or decrease), for transmitting its wireless beacon signal. The gateway device can transmit a notification for receipt by the pinger device when the gateway device detects the pinger device's wireless beacon signal, and/or when the detected signal strength corresponds to a threshold value, for example. In response to receiving the notification, for example, the pinger device can set its transmission signal strength.

Systems, methods, and techniques for adjusting a transmission signal strength of a pinger device are described herein. In one implementation, a method for adjusting the signal strength of a wireless signal transmission device includes receiving, by a pinger device, a command to set a transmission signal strength at which the pinger device transmits a wireless beacon signal for detection by a gateway device that is remote from the pinger device; adjusting, by the pinger device, the transmission signal strength; transmitting, by the pinger device, the wireless beacon signal using the adjusted transmission signal strength; detecting, by the gateway device, a detected signal strength of the wireless beacon signal transmitted by the pinger device; in response to determining that the detected signal strength corresponds to the threshold signal strength, transmitting, by the gateway device, a notification that the detected signal strength corresponds to the threshold signal strength; and in response to receiving the notification that the detected signal strength corresponds to the threshold signal strength, setting, by the pinger device, the transmission signal strength as the adjusted transmission signal strength.

Such a method can optionally include one or more of the following features. The pinger device can be configured to transmit the wireless beacon signal at a repeating interval. The command to set the transmission signal strength can be provided using an interface of the pinger device. The method can further include transmitting, by a mobile computing device and for receipt by the pinger device, the command to set the transmission signal strength, wherein the command to set the transmission signal strength is provided using an interface of the mobile computing device. The interface of the mobile computing device can include an initiation control for initiating the command to set the transmission signal strength, and a completion control for presenting an indication that the transmission signal strength has been set. The method can further include receiving, by a mobile computing device and from the gateway device, the notification that the detected signal strength corresponds to the threshold signal strength; and transmitting, by the mobile computing device and for receipt by the pinger device, the notification that the detected signal strength corresponds to the threshold signal strength. Adjusting the transmission signal strength, transmitting the wireless beacon signal using the adjusted transmission signal strength, and detecting a detected signal strength of the wireless beacon signal transmitted by the pinger device, can be iteratively performed, until the gateway device determines that the detected signal strength corresponds to the threshold signal strength. For a first iteration, the transmission signal strength can be adjusted to a low value, and for each subsequent iteration, the transmission signal strength can be adjusted to an increasingly higher value. For a first iteration, the transmission signal strength can be adjusted to a high value, and for each subsequent iteration, the transmission signal strength can be adjusted to a decreasingly lower value. The method can further include after the pinger device has set the transmission signal strength as the adjusted signal strength: in response to detecting, by the gateway device, the wireless beacon signal transmitted by the pinger device, the wireless beacon signal having a signal strength that meets or exceeds the threshold signal strength: performing, by the gateway device, one or more actions; and in response to not detecting, by the gateway device, the wireless beacon signal transmitted by the pinger device: not performing, by the gateway device, the one or more actions.

Certain implementations may provide one or more advantages. Communication between a mobile computing device and a pinger device may generally be performed using a relatively low-power, short range protocol (such that battery power of the pinger device may be conserved, and a hardware design of the pinger device may be simplified), whereas communication between the mobile computing device and a gateway device may be performed using a higher-powered, longer-ranged protocol. A pinger device may be designed with a short range wireless receiver rather than a long range wireless receiver, while benefiting from the longer-ranged communication capabilities of a paired mobile computing device. A pinger device may be designed with a relatively simple interface, while benefiting from the more advanced interface capabilities of a mobile computing device to which the pinger device may be paired. A transmission signal strength at which a pinger device transmits a wireless beacon signal for detection by a gateway device may be set according to a schedule, such that during different times, the pinger device may use different transmission signal strengths. By setting a transmission signal strength of a pinger device to be a minimum value needed for detection by a gateway device at a desired range, power can be conserved by the pinger device.

This document also generally describes systems, devices, computer program products, and techniques to allow for the vast majority of wireless sensors to be servable, meaning they can be enrolled into and configured in an application computing system. This can include a wireless sensor "discovery" process in which an application computing system (e.g., a wireless security system) becomes connected with a sensor population that includes sensors from different manufacturers, using different protocols, doing different sensing functions, communicating in closed wireless manner (e.g., sensors not broadcasting their identity in a manner that is standardized across vendors or an industry), and being different operational models and vintages. In some implementations, wireless sensors and other components of a security system can be enrolled in the security system using image-based device enrollment. Such a wireless system using the wireless sensor discovery methodologies described herein can automatically connect to a diverse sensor population like this without needing to be configured or programmed regarding the specifics of each sensor, but can learn such specifics by observing, evaluating, and analyzing wireless signals transmitted through the wireless space.

In various example implementations, the system includes a camera that can be used for image-based enrollment, authentication, discovery, etc. In some embodiments, an authorized user can be authenticated during a device set-up or enrollment process using a camera. Alternatively or additionally, a device may be detected and/or enrolled by image-based detection of one or more characteristics of the device.

In some example implementations, image-based device enrollment may occurs with little or no user involvement, such as without a user causing a wireless sensor to make a special wireless transmission that tells the system that the sensor making that special transmission is to be enrolled into the system. Enrollment can occur without requiring a user or installer to enter information into the system, or by entering limited information such as a bar code or other device identification information. For example, there may be cases when the user can expedite an image-based enrollment process by scanning (e.g., with a smartphone) the bar code on a device being enrolled, a label, a distinctive feature, or the device itself. For example, various sensor evaluation methods may avoid the user having to determine a proper configuration of sensors and the system, in that the system utilizes a rule set that has captured how a range of different sensors may act (make transmissions) in a typical environment and set-up. In this sense, the system implements artificial intelligence and expert system methodologies.

Of course, a user or installer may be involved in the evaluation method without departing from the principles being newly described herein. For example, a user may enter preliminary information before a "discovery" sensor evaluation method is executed, and/or the system may provide a user prompt after a "discovery" process has taken place, presenting "best guesses" as to, for example, what sensors are present in the environment, what type of sensors they are, where they are located in environment and in relation to one another, and how the sensors and system may be configured given those sensors. A user may then make entries confirming information presented, or modifying it, for example, before an enrollment of sensors or configuration (or change of configuration) of sensors and system actually occurs.

In one implementation, a method of using image data to enroll devices into security systems includes authenticating a user in a device enrollment function of a security system; initiating, by the device enrollment function, an image-based device enrollment session upon authentication of the user; identifying, during the image-based device enrollment session, a device to be enrolled into the device enrollment system; determining, during the image-based device enrollment session, a location of the device within the premises of the security system; enrolling the device into the security system.

Such a method can optionally include one or more of the following features. Authenticating the user can include obtaining a biometric feature of the user by scanning the user using at least one of a webcam, a smartphone, or a camera that is part of the security system; comparing the biometric feature of the user to stored biometric information; and authenticating the user upon determining a match between the biometric feature of the user and the stored biometric information. The biometric feature is a facial scan, a fingerprint scan, a retinal scan, or a voice print. Identifying the device to be enrolled into the device enrollment system can include operating the security system in a listen mode to receive and record wireless transmissions produced by the device; evaluating the recorded wireless transmissions using a rule set that embodies normal operating characteristics of various types of wireless sensors in an operating environment; and generating, based on the evaluating, a conclusion regarding at least one attribute of the device that produced the recorded wireless transmissions. Identifying the device can include scanning the device by at least one of a webcam, a smartphone, or a camera that is part of the security system. Identifying the device to be enrolled can include determining a unique device identifier (ID) of the device by performing at least one of an optical scan of a bar code of the device, receiving an RFID signal from an RFID embedded in the device, or identifying a MAC address of the device. Determining the location of the device can includes identifying a location of a room or an area containing the device using a known reference point location and a direction of a line-of-site to the device from a scanning device; and determining, using triangulation, the location of the device based on locations and signal strengths of two or more devices registered with the security system. The method can further include providing, for presentation to the user, enrollment information about the device being enrolled, the enrollment information including a type of device, a function of the device, sensor use case, the unique device ID of the device, and a description of the location of the device; and enrolling the device into the security system after verification, by the user, of the enrollment information. The method can further include using the device within the security system. The device enrollment function can be part of a wireless gateway used in a security system Certain implementations may provide one or more advantages. For example, a person installing a wireless system can speed up the process of enrolling devices through the use of cameras on the premises of a security system, including using the camera on the person's smartphone. The wireless system can automatically identify the type of device and use locations of currently enrolled devices to triangulate the location of the device being enrolled. This can reduce the amount of installation expertise and training that is needed to install devices in the system and enroll the devices.

This document also generally describes technology for enhancing security signals that are analyzed and used by a security system to make state determinations and, when appropriate, to take security actions based on wireless signals for mobile devices (e.g., smartphones, tables, wearable devices) that are detected at a premises, regardless of whether the devices are enrolled with or otherwise known to the security system. For example, the security system can automatically monitor for wireless transmissions from mobile devices that may appear at a premises for a period of time, but which may move over time such that, at some points in time, wireless signals from the devices are detectable by one or more wireless transceivers at the premises. At other times, signals from the same mobile devices may not be detectable by such transceivers at the premises, such as when the mobile devices have been moved out of or away from the premises by a user (e.g., user leaves home with smartphone, resulting in the smartphone signal no longer being detectable by a wireless transceiver at the home). The security system can maintain data identifying authorized devices that are associated with users who have one or more levels of authorization with regard to a premises, and can correlate that data with detected wireless signals to determine who is present at a premises, whether such activity is potentially in violation of one or more security rules, and taking appropriate action in response to such determinations. Additionally, the security system can detect wireless signals from unknown or otherwise unauthorized mobile devices and can use that information to make security determinations, as well. The security system can include one or more security rules with various conditions related to the presence of known and unknown mobile devices, which can trigger, in some instances, automatic performance of designated security actions by the security system, such as generating alerts and/or setting off alarms.

For example, by scanning for wireless signals, a security system can monitor the set of mobile devices that are located at or near a premises, and can determine which of the mobile devices are authorized/known/enrolled with the security system and which of the mobile devices are not. Various rules can be designated based on the composition of the mobile device population at the premises. For instance, for a home security system that is installed in a house, the security system may be programmed to generate an alert that is sent to the owner of the house if an unknown mobile device is present at the premises (house) for at least a threshold period of time (e.g., 5 minutes, 10 minutes, 15 minutes) without any authorized/known/enrolled mobile devices also being present at the house. Such a condition may indicate that an intruder or other unauthorized person is at the house.

In another example, the mobile devices for parents at the house can be designated with top level authorization and the mobile devices for children in the house may be designated with lower level authorization with the security system. A rule can be set such that, if a high proportion of unknown mobile devices are detected at the premises while a lower level authorized device is present but a higher level authorized device is not present, an alert can be sent to the higher level authorized devices. Such a rule can detect when the children at the house are having a gathering at the house when the parents are not present, and can provide an alert to the parents when this is happening.

In a further example, mobile devices presence based on detected wireless signals can serve as a proxy for whether corresponding users are physically present at a premises. The security system can monitor for this presence and, in the event of an emergency detected by the security system (e.g., fire, break-in attempt), can transmit information indicating whether and which users are still located in the premises. For example, the security system may determine that four users are present in a house and, once a fire alarm goes off, may track that three of the users have left the premises but that one user appears to still be present in the premises. This information can be provided to not only the owner of the premises, but to authorized third parties, such as fire departments, police, security companies, and/or others.

The security system can dynamically transition mobile devices from unknown to known devices over time, as well. For example, if an unknown device is detected at the premises at least a threshold number of times while a mobile device that is associated with a top level authorized user, the security system can infer that the unknown device and the corresponding user associated with that device are known to and permitted to be present at the premises (at least while authorized devices are present). An authorized device can be one that is formally enrolled with the security system and that has a corresponding user who is registered with the system. A known device can be one that has been detected as being present at the premises on multiple separate occasions while authorized devices are present and appears to be known to the occupants of the premises, but which is not authorized with the security system. Rules can treat authorized devices, devices with different authorization levels, known devices, and unknown devices separately and/or in combination. For example, in some instances, known and unknown devices can be treated in the same manner (e.g., large number of known and unknown devices present without a top level authorized device present). In other instances, known and unknown devices ca be treated separately (e.g., presence of an unknown device at a premises without authorized device present may automatically trigger alert, whereas same condition for known device may not automatically trigger alert). The security system can log the presence of device over time, as well, to maintain a historical record of when known, unknown, and authorized devices are present at the premises, which can be used to detect other anomalous conditions (not specifically called out in rules) that can trigger alerts as well.

Systems, methods and techniques are described herein. In one implementation, a computer-implemented method includes defining, in a security system, a mobile device presence rule that describes a pattern of one or more mobile devices being present or not present at a location monitored by the security system, wherein the mobile device presence rule defines an action to perform when the mobile device presence rule is satisfied; monitoring, by the security system, wireless signals from one or more mobile devices that are at the location; determining that the monitored wireless signals from the one or more mobile devices match the mobile device presence rule; and performing the action in response to determining that the monitored wireless signals from the one or more mobile devices match the mobile device presence rule.

Such a method can optionally include one or more of the following features. The one or more mobile devices can include a first mobile device that is registered with the security system. The action can include automatically disarming the security system based on the first mobile device being present at the location. The monitored wireless signals can indicate that the first mobile device is no longer present at the location and the action comprises automatically arming the security system. The one or more mobile devices can include a second mobile device that is not registered with the security system. The mobile device presence rule can include the first mobile device not being present at the location and detection of a non-registered mobile device at the location. Performing the action can include generating an alert based on the first mobile device not being present at the location and the second mobile device being at the location as a non-registered mobile device. The mobile device presence rule can include the first mobile device not being present at the location and detection of at least a predefined number of non-registered mobile devices at the location. The action can include sending an alert to the first mobile device based on the first mobile device not being present at the location and at least the predefined number of non-registered mobile devices being at the location.

Certain implementations may provide one or more advantages. For example, actions can be automatically performed by a security system gateway in response to a detected presence or non-presence of a mobile device at or near a premises monitored by the security system. Actions can be automatically performed based on a presence or non-presence of registered and/or non-registered mobile devices at a premises monitored by a security system.

In general, this document also describes configuring a security system at a premises to include an outdoor perimeter that is handled and managed differently from an indoor perimeter to the premises. For example, security cameras that detect movement within a premises when a security system is armed can indicate a security event that warrants a security response. However, security cameras viewing an outdoor area around a premises (e.g., outdoor perimeter) that detect movement may not warrant the same level of security response because such movement may not necessarily be a security threat, such as leaves blowing in the wind, animals walking through a yard, kids playing outside, and/or other safe events. As a result, an outdoor perimeter can be monitored in a different way and can generate different security events than an indoor perimeter for a premises. For example, security notifications or warnings may be provided to a homeowner in response to a sensor that is monitoring an outdoor perimeter triggering an event, and it may be on the homeowner to manually initiate the security response, if needed.

In one implementation, a sensor system includes a first sensor in a first zone; a second sensor in a second zone that is different from the first zone; a controller configured to provide a first response to activation of the first sensor and provide a second, different response to activation of the second sensor.

In another implementation, a method of security sensing includes identifying a first sensor as being located in a predetermined first physical zone; receiving a first input based on of activation of the first sensor; activating an output based on the receipt of the first input and the identification of the first sensor as being located in the predetermined first physical zone; identifying a second sensor as being located in a predetermined second physical zone; receiving a second input based on of activation of the second sensor; determining an activation level based on the second input; and activating the output based on the activation level and the identification of the second sensor as being located in the predetermined second physical zone.

Such a system and/or method can optionally include one or more of the following features. The activation level can include a count of activations of the second sensor within a predetermined period of time, and activating the output is further based on a determination that the count exceeds a predetermined threshold count of activations. The activation level can include a duration of activation of the second sensor, and activating the output is further based on a determination that the duration exceeds a predetermined threshold duration.

The systems and techniques described here may provide one or more of the following advantages. For example, a system can monitor and establish an outdoor perimeter for a premises that will have appropriate response levels to the security events that are detected, while still providing the user with security. For instance, incorrectly triggered security responses ("false alarms") can be charged to the premises owner/tenant and, as a result, want to be avoided. However, having a low threshold for security events may render the security system meaningless if it is not going to be triggered when a true breach of security is taking place. The technology described in this document threads the needle between these two concerns—permitting for security events related to an outdoor perimeter to be surfaced and acted upon, but avoiding triggering full-blown security responses for every event that occurs.

The details of one or more implementations are set forth in the accompanying drawings and the description below. Other features and advantages will be apparent from the description and drawings, and from the claims.

DETAILED DESCRIPTION

This document describes systems and techniques for providing highly reliable electronic communication gateway operations. In many implementations (e.g., home, small business), a single gateway is used to channel all network traffic flowing between a local area network (LAN) and a single wide area network (WAN), such as the Internet. As such, the gateway can be a single point of failure for the network. In general, the electronic communication gateways described here provide increased uptime and reliability by implementing redundant power and communication subsystems. A security system gateway can thus maintain effective communication despite one or more power/communication failures, such that system status communications (e.g., alarm/alert events) can be sent and received.

Figure 1:
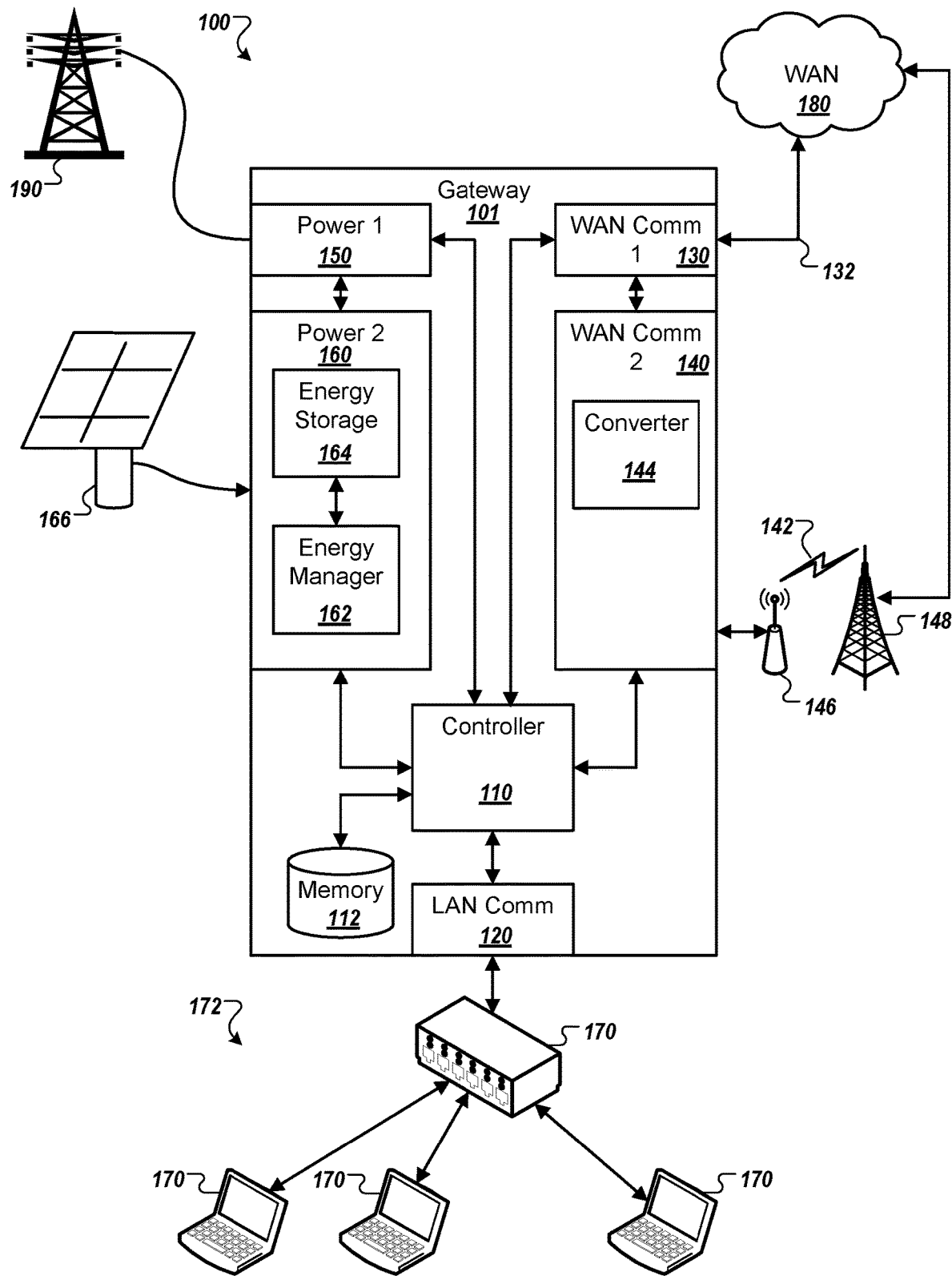
FIG. 1 is a schematic diagram that shows an example of an electronic communication gateway system.

FIG. 1 is a schematic diagram that shows an example of an electronic communication gateway system 100. The system 100 includes a gateway 101 that is configured to provide communications between collection devices 170 on a LAN 172, and a WAN 180. The gateway 101 is configured to be powered primarily by electricity provided by a utility main 190 (e.g., an electric utility provider).

The gateway 101 includes a controller 110 configured to perform operations based on computer code stored in a computer memory 112. The operations of the controller 110 include controlling flows of communications between the LAN 172 and the WAN 180, and well as power management of the gateway 101.

In some implementations, the communications medium 142 can be a primary communications link. For example, the communications medium 142 can be a broadband communications link provided by an internet service provider (ISP), such as a fiber optic link, a coaxial cable link (e.g., internet over television cable), or a digital subscriber line (DSL) link.

A LAN communications module 120 is configured to provide an interface between the LAN 172 and the controller 110. A WAN communications module 130 is configured to provide an interface between the controller 110 and the WAN 180 over a communications medium 132. In some implementations, the communications medium 132 can be a primary communications link, such as a broadband communications link provided by an internet service provider (ISP), such as a fiber optic link, a coaxial cable link (e.g., internet over television cable), a powerline communications link, or a digital subscriber line (DSL) link. A WAN communications module 140 is configured to provide an interface between the controller 110 and the WAN 180 over a communications medium 142. A converter module 144 is configured to adapt the gateway to the medium 142.

In the illustrated example, the communications medium 142 is a wireless data communication link between a transceiver 146 and a transceiver 148 (e.g., cellular, satellite, customer premises services, fixed wireless). In some embodiments, the communications medium 142 can be a second or secondary broadband communications link (e.g., a redundant backup connection provided by a different ISP than the communications medium 132). In some embodiments, the communications medium can be any other appropriate form of communications medium. For example, the converter 144 can be a computer modem and the communication medium 142 can be a telephone line used to access an on-demand dial-up internet provider.

In operation, the controller 110, the WAN communications module 130, and/or the WAN communications module 140 determine the availability and/or quality (e.g., bandwidth, ping speed, latency) of the communications medium 132 and/or 142. In some implementations, the controller 110 can be configured to route communications between the LAN communications module 120 and a selected one of the WAN communications module 130, and/or the WAN communications module 140 based on communications availability. For example, the controller 110 may be configured to use the WAN communications module 130 as a primary point of communications and use the WAN communications module 140 as a secondary or backup point of communications. In the event that the communications medium 132 becomes unusable (e.g., a fiber optic link is cut), then the controller module 110 cause communications to be routed over the communications medium 142 instead (e.g., connect to the internet over a dialup or cellular connection). The process can be reversed when the gateway 101 determines that the communications medium 132 has become functional again.

In operation, the controller 110, the WAN communications module 130, and/or the WAN communications module 140 determine the relative costs of using the communications medium 132 and/or 142. In some implementations, the controller 110 can be configured to route communications between the LAN communications module 120 and a selected one of the WAN communications module 130, and/or the WAN communications module 140 based on communications costs. For example, use of the communications medium 132 and the communications medium 142 may vary in price over time (e.g., daily peak usage cycles, monthly service rate changes) and/or as a factor of bandwidth (e.g., data caps and overcharges). The controller 110 may be configured to determine which of the WAN communications module 130 or the WAN communications module 140 would incur the lowest usage costs, and route traffic between the LAN communications module 120 and the selected, more economical option.

In operation, the controller 110, the WAN communications module 130, and/or the WAN communications module 140 determine the bandwidth available when using the communications medium 132 and/or 142. For example, the communications medium 132 may provide 100 megabits per second (Mbps) speeds, and the communications medium may provide 20 Mbps speeds. The controller 110 may be configured to route up to 100 Mbps of traffic between the LAN communications module 120 and WAN communications module 130 first, and then route up to 20 Mbps of additional traffic using the WAN communications module 140. In another implementation, the controller 110 may be configured to divide traffic loads between the WAN communications modules 130 and 140. For example, the controller 110 can be configured to route 80% of communication traffic to the WAN communications module 130 and the remaining 20% to the WAN communications module 140.

The gateway 101 is configured to be powered by a power module 150 and/or a power module 160. The power module 150 is configured to convert power from the utility main 190 to a form that is compatible with the circuitry of the gateway 101 (e.g., convert 110V AC to 20V DC).

The power module 160 is also configured to power the gateway 101. The power module 160 includes an energy manager module 162 (e.g., a battery management circuit) and an energy storage module 164 (e.g., a battery, super capacitor). The energy manager module 162 is configured to store power from the power module 150 and/or a power source 166 in the energy storage module 164 (e.g., recharge the battery), and/or discharge power from the energy storage module 164 to the power module 150 or other components of the gateway 101. In some embodiments, the power module 160 can be configured as an uninterruptible power supply (UPS). An example of such a configuration will be discussed in more detail in the description of FIG. 2.

In the illustrated example, the power source 166 is shown as a solar power source. However, in other examples other power sources can be used, such as backup generators, wind turbines, or a second utility provider. In some embodiments, the power source 166 can also be an energy storage and recovery device such as a battery, a flywheel, a pressure vessel, a mass elevation system, a heat storage vessel, or any other apparatus that can be used to store energy and later recover it in the form of electrical power.

In operation, the controller 110, the power module 150, and/or the power module 160 determine the availability and/or quality of the power that is available from the utility main 190, the power source 166, and/or the energy storage module 164. In some implementations, the controller 110 can be configured to use the power module 150 and the utility main 190 as a primary power source for powering the gateway 101 under normal operational situations, and use the power module 160 as a redundant backup power supply for powering the gateway 101. For example, the gateway 101 can normally draw power from a wall outlet, but in the event of a blackout or brownout (or somebody accidentally unplugging the gateway 101), the power module 160 can take over and provide power from the power source 166 and/or the energy storage module 164. When the problem is resolved, the energy manager module 162 can use power from the power module 150 and/or the power source 166 to recharge the energy storage module 164.

In operation, the controller 110, the power module 150, and/or the power module 160 determine the cost of the power that is available from the utility main 190, the power source 166, and/or the energy storage module 164. In some implementations, the controller 110 can be configured to use the more economical one of the utility main power 190 or the power source 166. For example, the utility main 190 may charge $0.06 per kilowatt hour (kWh) for power at night and $0.08 per kWh during the day, while the power source 166 costs a constant $0.07 per kWh to operate. In such an example, the controller 110 may cause the gateway 101 to draw power from the power source 166 during the day and draw power from the utility mains 190 during the night to power the gateway 101 and to recharge the energy storage module 164.

In some implementations, the controller 110 can be configured to use the power module 150 and the utility main 190 as a primary power source for powering the gateway 101 under normal operational situations, and use the power module 160 to reduce or replace the power consumed from the utility main 190 with stored or alternative power. For example, the gateway 101 can normally draw power from a wall outlet, but in the event of power peak event (e.g., peak pricing), the power module 160 can provide some or all of the power needed to power the gateway 101 until the event is over. When the problem is resolved, the energy manager module 162 can use power from the power module 150 and/or the power source 166 to recharge the energy storage module 164.

Figure 2:
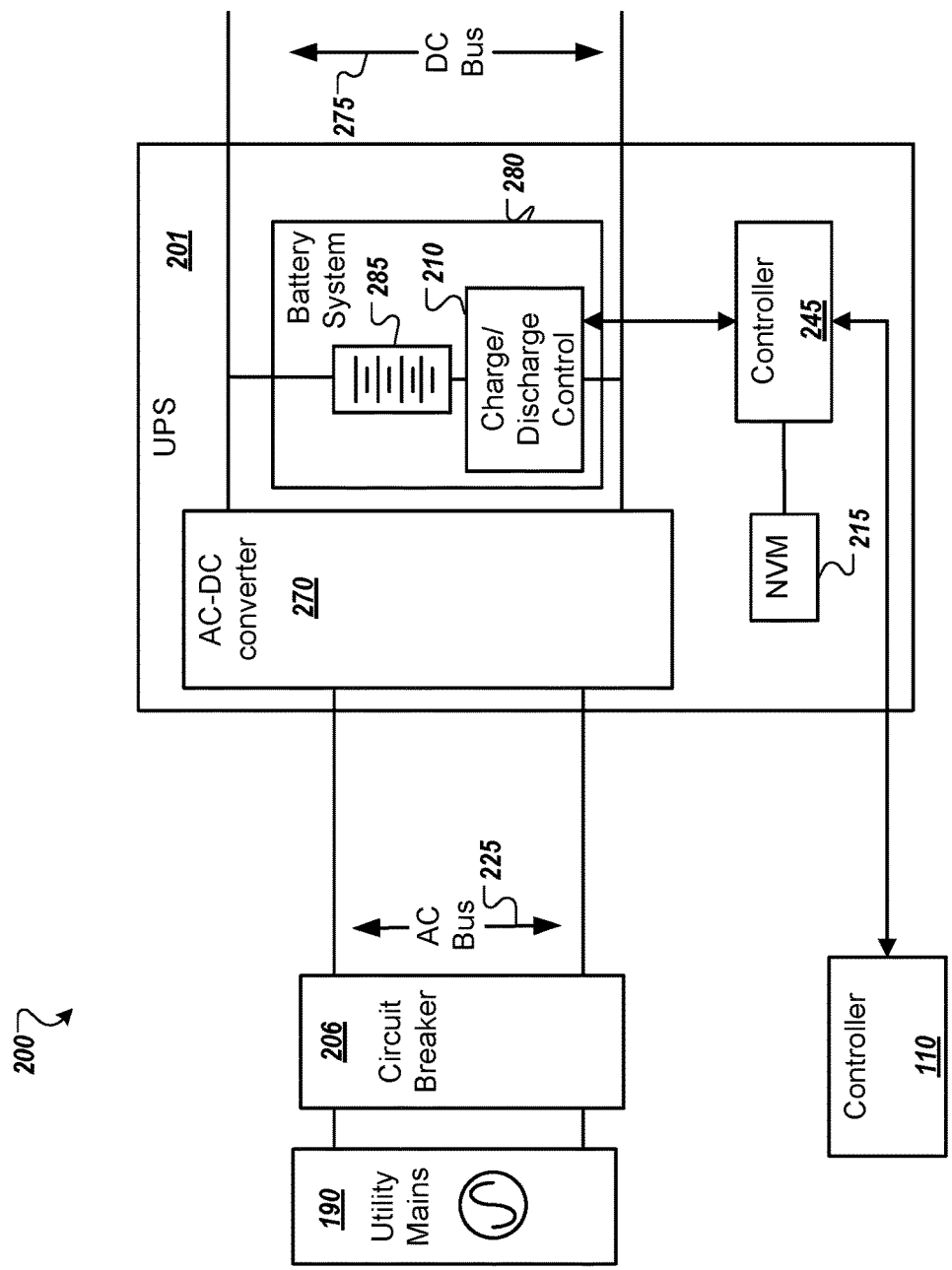
FIG. 2 is a block diagram that illustrates an exemplary power distribution architecture.

FIG. 2 is a block diagram that illustrates an exemplary power distribution architecture 200 for delivering power drawn from the utility main 190 across an AC bus 225 to operate a DC loads. In some embodiments, the architecture 200 can be all or part of the example power module 160 of FIG. 1. In some implementations, the utility main 190 is wires or busses that conduct electrical power from a power provider, such as an electric utility, to the gateway 101 of FIG. 1. The AC bus 225 conducts the electrical energy from the utility main 190 to and AC-to-DC conversion circuit 270. A circuit breaker 206 protects the AC bus 225 by limiting the amount of electrical energy that is conducted by the AC bus 225. In some implementations, the circuit breaker 206 is configured to prevent the AC bus 225 from conducting electrical energy in excess of the power rating of the AC bus 225.

In various implementations, the AC-to-DC conversion circuit 270 may regulate the single output voltage on the DC bus 275 to a set point. The set point is a static value in some implementations, or it is dynamically controllable during operation. For example, the set point may be adjusted to at least partly supplement the amount of power provided to the DC bus 275 by power drawn from the utility main 190 across the AC bus 225.

Characteristics on which a set point can be established may include the amount of power that the utility mains 205 are capable of providing, by a predetermined AC power limit, by a predetermined AC power draw change limit (e.g., power ramp rate), by the power draw of connected loads under normal operations, by the power draw of connected loads under atypical operations (e.g., startup, exceptionally heavy load), or other parameters relating to the amount of power available to or drawn from a UPS 201.

Characteristics on which a set point can be established may include battery characteristics such as battery chemistry, battery age, charge/discharge history, nominal maximum charge, temperature, charging profile (e.g., voltage charge rate under constant current), estimates of battery internal impedance, or other parameters relating to the electrical performance of the battery.

In addition to internal battery characteristics, the set point may be based at least in part on electrical circuit parameters of a battery system 280 and the DC bus 275. In some implementations, the set point to which the AC-to-DC conversion circuit 270 regulates the voltage on the DC bus 275 is a function of a battery charging circuit topology. If the battery charging circuit provides a voltage boost circuit (e.g., boost converter, charge pump, flyback), then the set point voltage may be substantially at or below a desired maximum charge voltage. If the battery charging circuit only provides a voltage step-down (e.g., linear regulator, buck converter) capability, then the set point can be set to a value sufficiently above the maximum nominal charge voltage to achieve the required charge performance over relevant temperatures, taking account of tradeoffs in power loss and charging current and corresponding charge time. In light of such trade-offs, the set point may be only as high as necessary to meet charge time specifications. For example, the set point may be set to between about 0.050 and about 1 Volt above the nominal expected battery voltage.

In the depicted implementation, the UPS 201 includes a charge/discharge control circuit 210 in series connection with the battery system 280, and further includes a controller 245 in operative connection with a non-volatile memory (NVM) 215, the controller 110 of FIG. 1, and the circuit 210. In some implementations, the controller 245 communicates with the controller 110 to configure or retrieve information about the amount of power that the gateway 101 is drawing. For example, the controller 245 can communicate with the controller 110 to determine that the communication modules 150 and 160 are running at 70% of capacity, and from that information determine an estimate of the amount of power that the gateway 101 is likely to require.

The series connected battery 285 and control circuit 210 are connected across the DC bus 275 as the battery system 280. Responsive to a signal indicative that the gateway 101 needs to draw an amount of power that exceeds the power available from the AC bus 225, the circuit 210 can operatively connect the battery system 280 across the DC bus 275 to permit the battery to variably and controllably discharge its stored energy to the gateway 101 through a low impedance path to supplement or replace the AC input signal. When the AC input voltage signal on the AC bus 225 is not faulted, the circuit 210 may selectively permit charging current to flow from the DC bus 275 to charge the battery system 280. If multiple batteries or battery strings are connected in electrical parallel, individual strings or groups of strings may be independently charged at different rates according to a defined charging algorithm.

In the depicted implementation, the NVM 215 may store set point information for regulating the output of the AC-to-DC conversion circuit 270. The set point information may be stored during manufacturing time, upon first use, and/or dynamically updated during operation of the gateway 101. The controller 245 and/or the AC-to-DC conversion circuit 270 may read and/or use the stored set point information to determine how to control the AC-to-DC conversion circuit 270. In addition to set point information, information about threshold conditions for controllably adjusting the power contributions of AC input and/or the battery system 180 to the DC bus 275 may be stored in the NVM 215, for example.

Use of the power distribution architecture 200 as part of the onboard circuitry of the gateway 101 provides advantages over the use of external backup power solutions (e.g., a freestanding UPS). For example, typical UPS hardware converts AC power to DC in order to charge onboard batteries during a charging cycle, and then converts DC battery power to AC power during discharge by using a DC/AC inverter circuit. DC/AC inverters take up space and consume a portion of the stored energy for their own operation (e.g., the conversion process incurs losses and inefficiencies). Generally speaking, low cost DC/AC inverters do not provide clean power, and DC/AC inverters that provide clean power can be expensive. Since the internal circuitry of the gateway 101 uses DC power (e.g., with an AC/DC converter of its own in order to use the utility mains 190), the DC/AC components of a typical UPS and their associated costs, inefficiencies, and spaces can be redundant. In the illustrated example, by integrating the UPS 201 into the gateway 101, the power provided by the DC bus can be matched to the power requirements of the gateway 101. DC power from the battery system 285 can easily and efficiently be modified, for example by DC/DC converters, to power the DC bus 275 without needing the DC-to-AC-to-DC steps that would occur with a traditional (e.g., offboard) UPS.

Figure 3:
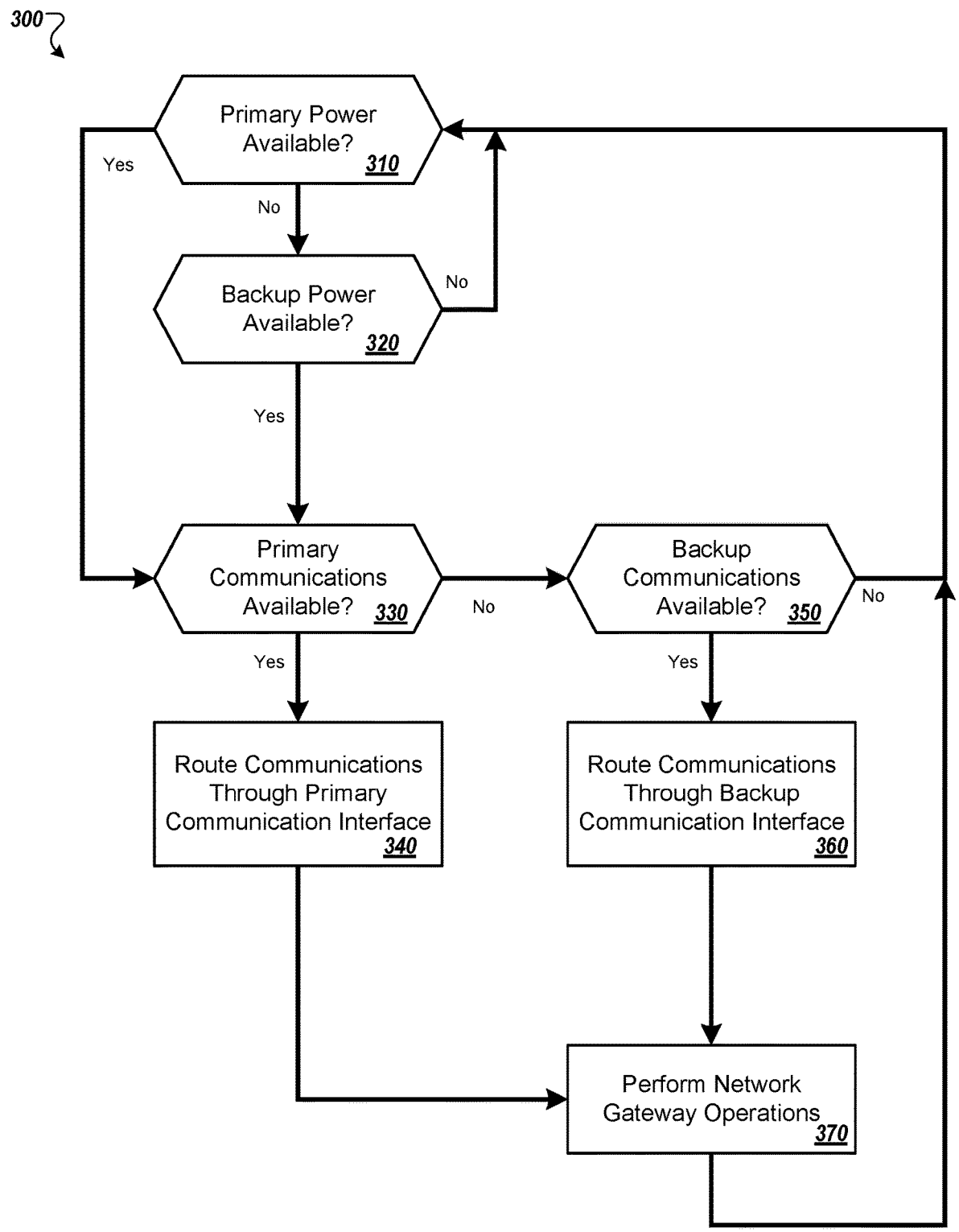
FIG. 3 is flow chart that shows an example of a process for providing redundant power and communications by an electronic communication gateway.

FIG. 3 is flow chart that shows an example of a process 300 for providing redundant power and communications by an electronic communication gateway. In some implementations, the process 300 can be performed by the example system 100 of FIG. 1.

Power from a first power source or a second power source is selectively used based on a determined availability, and at least one of the communications circuit and the processing system is powered with the selectively sourced power. At 310, availability of power from the first power system is determined. For example, the controller 110 can determine if the power module 150 is receiving power from the utility mains 190. If so, then primary power is used to power the gateway and the process 300 continues at 330. In not, then at 320, availability of backup power is determined. For example, the controller 110 can determine if the power module 160 has power available in the energy storage module 164. If not, then backup power is used to power the gateway and the process 300 continues at 310.

Communications availability to a WAN from a first provider or a second provider is selectively used based on a determined availability, and communications is routed between a first communications network and a second communications network through at least one of a first communications system and a second communications system based on the communications availability. At 330, a determination is made. If at 330, a communications through a primary communications interface to a primary provider is determined. If communications are available, then at 340 communications between the first network and the second network are routed through the primary communication interface, and at 370 network gateway operations are performed. For example, the communications medium 132 may be available for use, and if so the gateway 101 can use the WAN communication module 130 to route traffic between the LAN 170 and the WAN 180.

If at 330, primary communications are not available, then at 350 another determination is made. If at 350, a communications through a backup communications interface to a backup provider is determined. If communications are available, then at 360 communications between the first network and the second network are routed through the backup communication interface, and at 370 network gateway operations are performed. For example, the communications medium 132 may be down while the communications medium 142 is available for use, and if so the gateway 101 can use the WAN communication module 140 to route traffic between the LAN 170 and the WAN 180. If backup communications are not available, then the process 300 continues at 310 (or 330). For example, the gateway 101 can recheck the primary and backup providers to identify when one of them becomes available for use.

In some implementations, the selection of the primary or backup communication provider can include determining a first communications bandwidth to the first communications network through the first communications system, determining a second communications bandwidth to the first communications network through the second communications system, and routing communications between the first communications network and the second communications network through at least one of the first communications system and the second communications system based on the first communications bandwidth and the second communications bandwidth. For example, the gateway 101 can perform dual-WAN failover and/or load balancing.

In some implementations, the selection of the primary or backup communication provider can include determining a first cost of communications with the first communications network through the first communications system, determining a second cost of communications with the first communications network through the second communications system, and route communications between the first communications network and the second communications network through at least one of the first communications system and the second communications system based on the first cost and the second cost. For example, the gateway 101 can use the communication medium 132 or 142 based on which one has the lowest usage costs.

In some implementations, the selection of the primary or backup communication provider can include identifying a data connection between a first endpoint on the first communications network and a second endpoint on the second communications network, identifying a first data packet of the data connection, identifying a second data packet of the data connection, routing the first packet through the first communications system, and routing the second packet through the second communications system. For example, the gateway 101 can increase security of communications by dividing a connection to a remote target between multiple ISPs, so that no single ISP can see the complete communication.

This document also describes systems and techniques for providing electronic communication translation and bridging gateway operations. An example of such a system is a device hub in a premises security/automation system. In general, the device hub can be used to provide interconnections among various types of devices that might otherwise be incompatible. For example, such a device hub could provide protocol translation between devices, or could act as a media bridge (e.g., interconnecting Ethernet, BLUETOOTH, ZIGBEE, Z-WAVE, infrared, and other devices), or could process information from one device and make it useful to another (e.g., make a security camera appear as a motion sensor to a security system, make a smoke alarm's status look like a light switch to a lighting controller, make an automobile's GPS tracker look like a home occupancy transponder to a home automation controller).

Figure 4:
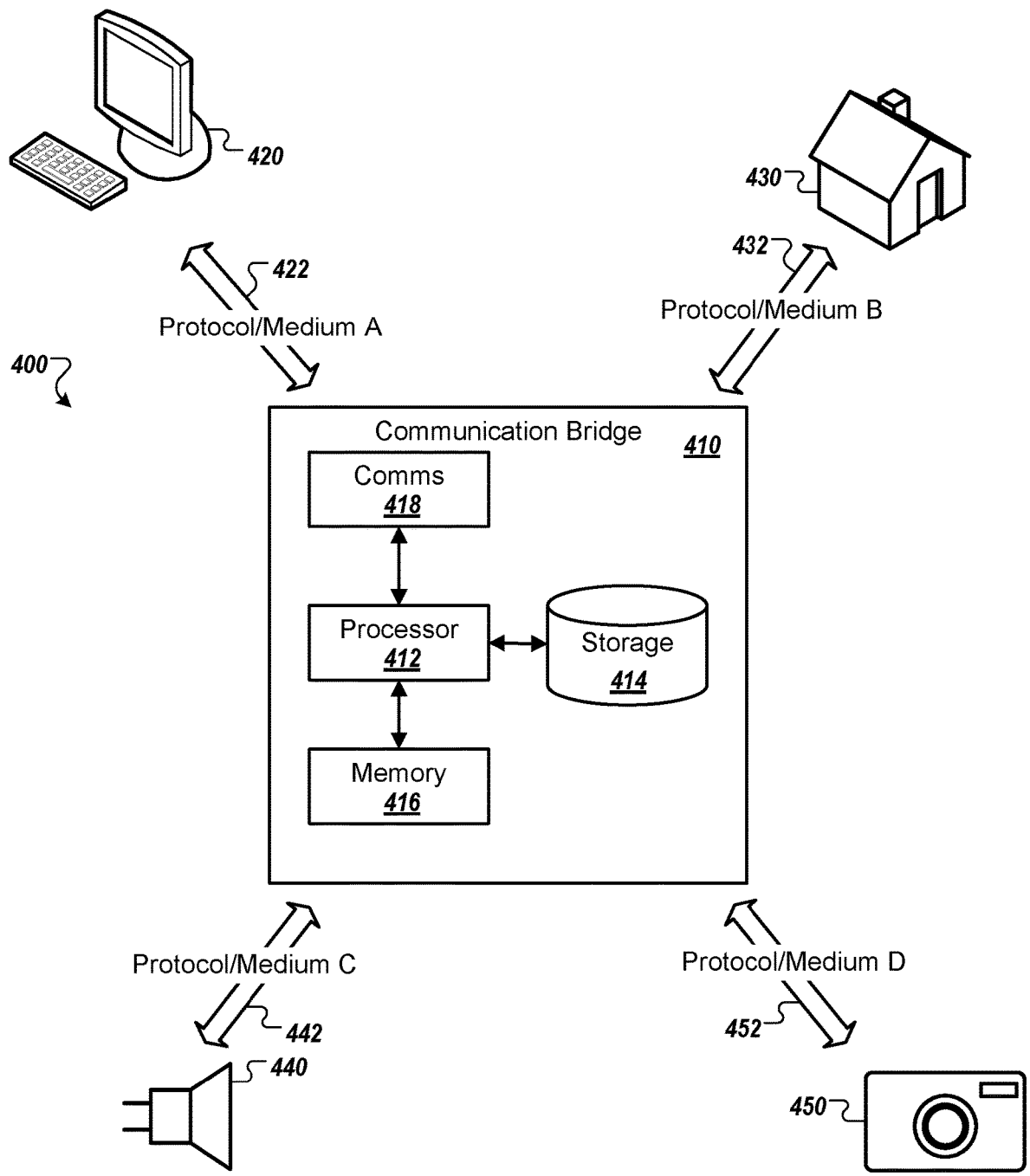
FIG. 4 is a schematic diagram that shows an example of a system for bridging device communications.

FIG. 4 is a schematic diagram that shows an example of a system 400 for intelligent bridging of device communications. The system 400 includes a communication bridge 410 (e.g., a device hub). The communication bridge 410 includes a processor 412, a data storage device 414 (e.g., a hard drive, FLASH memory), a memory 416 (e.g., random access memory RAM), and a communications interface 418. In some embodiments, the communications interface 418 is configured to communicate with other devices using one or more communications protocols (e.g., TCP, UDP, IrDA, BLUETOOTH, ZIGBEE, Z-WAVE, ENOCEAN) and one or more forms of media (e.g., radio frequencies, wired communications, infrared transmission, powerline transmission, sounds). The processor 412 is configured to control the communications interface 418 to perform communications bridging operations based on the execution of computer instructions stored in the data storage device 414 and/or the memory 416.

The communication bridge 410 is communicatively connected to a device 420, a device 430, a device 440, and a device 450. The devices 420, 430, 440, 450 can take the form of various security/automation system components. In an example embodiment, the device 420 is a computer, the device 430 is a home automation controller, the device 440 is a smart speaker, and the device 450 is a network camera. In some embodiments, the devices 420, 430, 440, 450, may not be compatible with each other natively and/or may not be readily configurable to communicate with one another to perform a particular function. In some embodiments, devices 420, 430, 440, 450 could, alternatively or additionally, include sensors, tablets, smartphones, automobiles, controllable switches, remote controllers, robots (e.g., robotic vacuums, lawn mowers), smart appliances, televisions, weather sensors, remote door locks, security systems, personal monitors, smart beds, automatic pet feeders, solar/wind generators, power storage systems, or any other appropriate device capable of communicating with another device, such as in a premises security/automation system.

The communication bridge 410 is communicatively connected to the device 420 by a connection 422. The connection 422 uses a selected communications medium (e.g., wires, radio frequency, light, sound) and a selected communications protocol (e.g., Ethernet, WiFi, IrDA, BLUETOOTH, Z-WAVE, ZIGBEE). The communication bridge 410 is communicatively connected to the device 430 by a connection 432, to the device 440 by a connection 442, and to the device 450 by a connection 452. The connections 432-452 uses communications media and protocols that are different from the connection 422 and from each other. For example, the connection 422 may be an infrared light connection based on the IrDA protocol, while the connection 442 may be a radio frequency connection based on IEEE 802.11AC.

In addition to protocol and media conversion, the communication bridge 410 also performs data collection, management, and redistribution among the devices 420, 430, 440, and 450. For example, the device 430 as a home automation controller in this example may be configured to accept "on" and "off" commands to control a light switch, but may not have been designed to accept voice commands, whereas the device 440 as a smart speaker in this example may be configured to accept voice commands but may not be natively capable of communicating with or controlling the light switch. In such an example, the communication bridge can receive a message from the device 440 such as "Turn living room light on," determine that this is a command that is intended for the device 430, and reformat and transmit a "Command(hallway_light,1)" message to the device 430.

The communication bridge 410 is also configured to publish information received from the devices 420, 430, 440, and 450, and make that information available to others of the devices 420, 430, 440, and 450. For example, the device 450, as a network camera, may detect a person within its field of view and transmit a "person=yes" message to the communication bridge 410. The communication bridge 410 may store that information based on that message in a table or other data repository. In such an example, the device 420 may be running a dashboard application that can query the communication bridge 410 and display selected information about the devices, such as a "person detected" status of the device 450. In another example, a user can ask "what is the status of the camera?" to the device 440. The device 440 can query the communication bridge 410 based on the user's voice command (e.g., "request:status(camera1)"). The communication bridge 410 can respond to the query by retrieving the current status information of the camera and transmitting a response message to the device 440 (e.g., "status (camera1, 'front yard camera', power_on=1, person_detected=1)". The device 440 can receive the response and speak a reply to the user such as "The front yard camera is on and detects a person."

Figure 5:
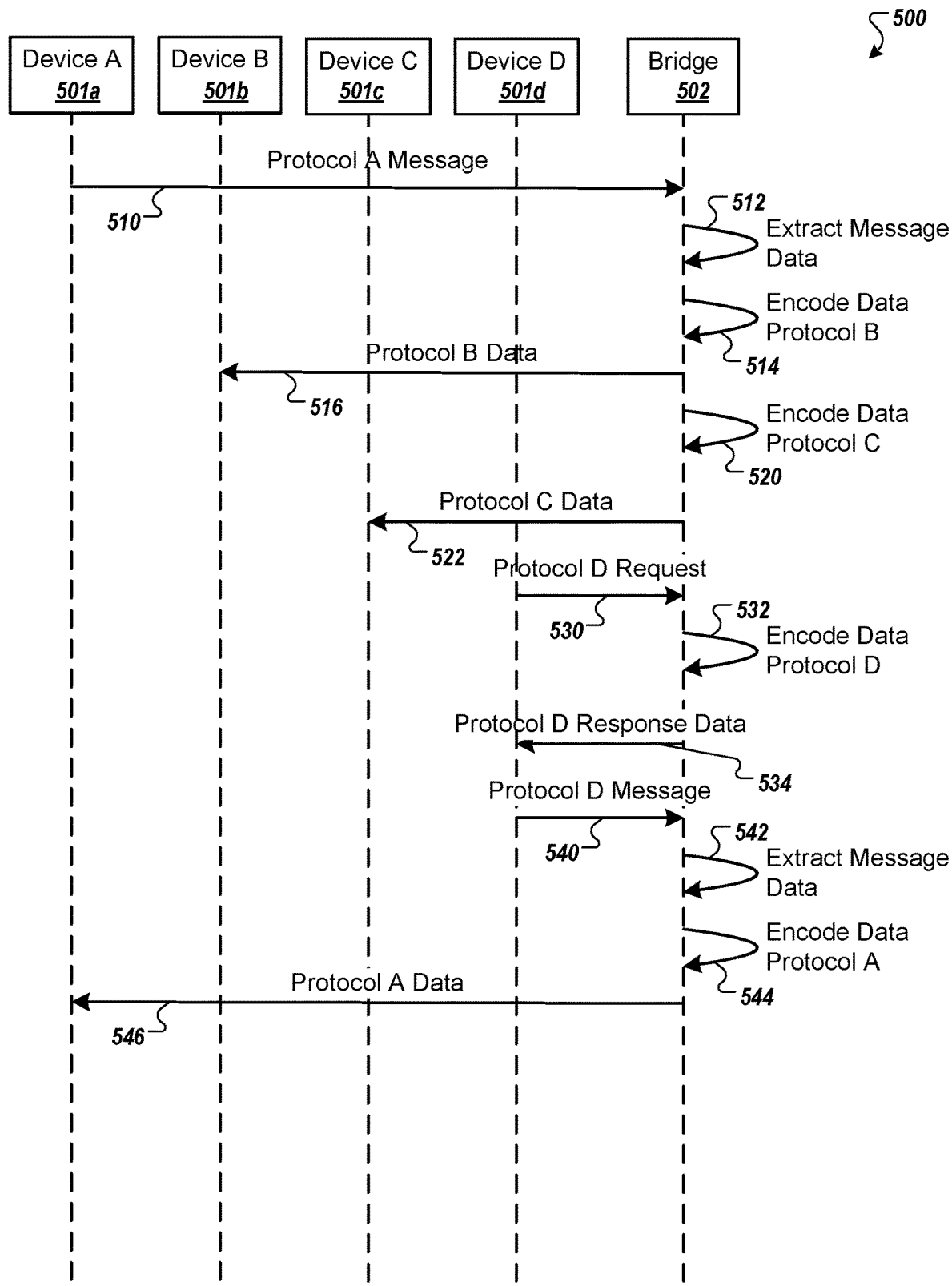
FIG. 5 is a timeline diagram that shows an example of bridged device intercommunications.

FIG. 5 is a timeline diagram that shows examples of a bridged device intercommunication process 500. In some implementations, the process 500 can be performed in part or entirely by the example ICS 400 of FIG. 4. The process 500 includes communications between a device 501a, a device 501b, a device 501c, a device 501d, and a communication bridge 502.

In the process 500, the device 501a sends a message 510 to the communication bridge 502. The device 501a is configured to communicate using a selected protocol (e.g., protocol "A") and a selected communications medium, and the communication bridge 502 is configured to be compatible with the protocol and medium.

The communication bridge 502 receives the message 510 and parses the selected protocol to extract message data 512 from the message 510. The extracted data is stored at least temporarily by the communication bridge 502.

The device 501b is configured to communicate using another selected protocol (e.g., protocol "B") and/or another selected communications medium, and the communication bridge 502 is configured to be compatible with the protocol and medium. The communication bridge 502 generates a message for the device 501b based on the message 510 by transforming and encoding 514 data from the message 510 using the selected protocol of the device 501b. The communication bridge 502 sends the encoded data to the device 501b as a message 516.

The device 501c is configured to communicate using another selected protocol (e.g., protocol "C") and/or another selected communications medium, and the communication bridge 502 is configured to be compatible with the protocol and medium. The communication bridge 502 generates a message for the device 501c based on the message 510 by transforming and encoding 520 data from the message 510 using the selected protocol of the device 501c. The communication bridge 502 sends the encoded data to the device 501c as a message 522.

In some implementations, the steps 514-522 may be a process of sending "push" messages (e.g., the communication bridge 502 can be configured to send updates to the devices 501b and 501c in their native formats proactively, based on some trigger external to the devices 501*b* and 501*b*, such as receipt of the message 510). For example, the message 510 may describe an alert from a driveway arrival sensor, and the message 516 may trigger the device 501*b* to ring a doorbell, and the message 522 may cause a security panel light for the driveway to change from green to red.

In the process 500, the device 501*d* sends a message 530 to the communication bridge 502. The device 501*d* is configured to communicate using another selected protocol (e.g., protocol "D") and/or another selected communications medium, and the communication bridge 502 is configured to be compatible with the protocol and medium.

The communication bridge 502 receives the message 530 and parses the selected protocol to extract message data 542 from the message 530. In the illustrated example, the extracted data identified as a request for information. The communication bridge 502 responds to the request by generating a message for the device 501*d* based on the message 530 by transforming and encoding 532 stored data using the selected protocol of the device 501*d*. The communication bridge 502 sends the encoded data to the device 501*d* as a message 534.

In some implementations, the steps 530-534 may be a process of sending "pull" messages (e.g., the communication bridge 502 can be configured to respond to the devices 501*a*-501*d* in their native formats upon request). For example, the device 501*d* may be a web server responding to a user request for device status information such as the driveway sensor status of the previous example, the message 530 may be a request for device status information that can be used to generate the requested web page, and the message 534 can be a response message that include the requested sensor status information that can be used to generate the web page.

In the process 500, the device 501*d* sends a message 540 to the communication bridge 502. The communication bridge 502 receives the message 540 and parses the selected protocol to extract 542 message data from the message 540. The extracted data is stored at least temporarily by the communication bridge 502. The communication bridge 502 generates a message for the device 501*a* based on the message 540 by transforming and encoding 544 data from the message 540 using the selected protocol of the device 501*a*. The communication bridge 502 sends the encoded data to the device 501*a* as a message 546. In some implementations, the message 540 can be directed specifically for use by the device 501*a*. For example, the device 501*a* can be an older (e.g., pre-"smart" device era) gate controller configured to open or close a gate in response to a message, and the device 501*d* can be a modern touchscreen assistant device. The communication bridge 502 can make the older gate controller available for control by the touchscreen assistant, and can make commands from the touchscreen controller compatible with the older gate controller (e.g., transform touch inputs into gate trigger messages).

Figure 6:
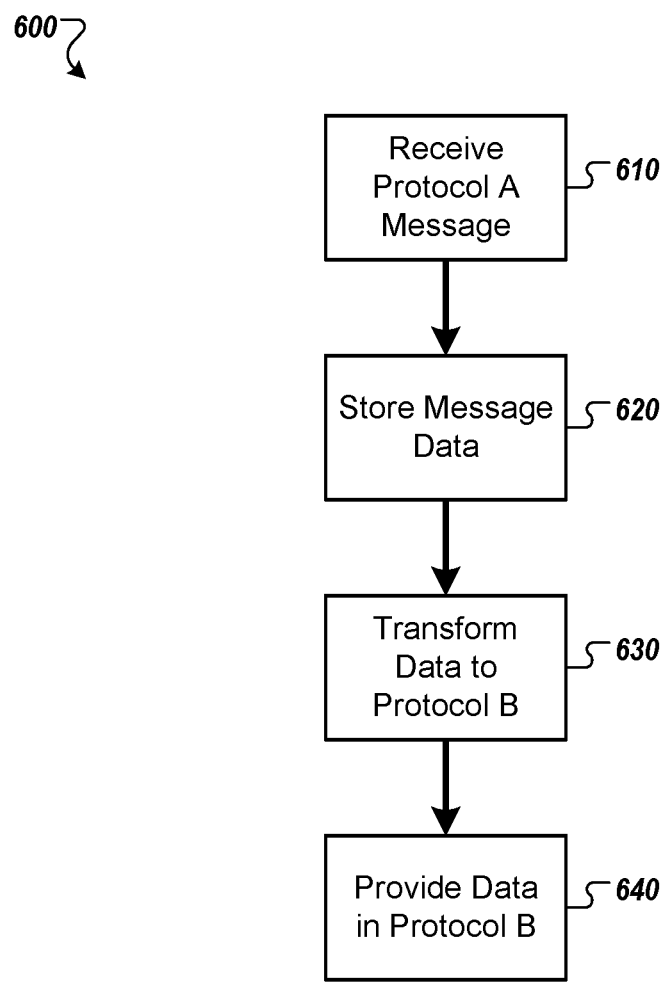
FIG. 6 is flow chart that shows an example of a process for bridging device communications.

FIG. 6 is flow chart that shows an example of a process 600 for bridging device communications. In some implementations, the process 600 can be performed in part or entirely by the example ICS 400 of FIG. 4.

At 610 a first communication having a first communication protocol is received at a first processing system. In some implementations, the first communication is provided by another processing system configured to communicate based on the first communication protocol. For example, the example communication bridge 410 can receive a message from the device 420 over the connection 422.

At 620 the first processing system stores at least part of the first communication. For example, the communication bridge 410 can parse and cache information received from the device 420 in the protocol used for the connection 422.

At 630 the first processing system transforms at least part of the stored first communication into a second communication having a second communication protocol. For example, the communication bridge 410 can generate a message that is compatible with the device 430 and the connection 432.

At 640, the first processing system provides the second communication. In some implementations, the second communication can be transmitted to a second processing system. For example, the communication bridge 410 can send the communication to the device 430 over the connection 432.

In some implementations, the second communication can be provided to the second processing system in response to a third communication based on the second communication protocol. For example, the device 430 can request information from the communication bridge 410.

In some implementations, the process 600 can include transforming, by the first processing system, at least part of the stored first communication into a third communication having a third communication protocol, and providing, by the first processing system, the third communication to a third processing system configured to communicate based on the third communication protocol. For example, the communication bridge 410 can generate another message based on information from the device 420 into a format that is compatible with the device 450 and the connection 452, and transmit the message to the device 450 over the connection 452.

In some implementations, the process 600 can include receiving, at the first processing system, a third communication having a third communication protocol, storing, by the first processing system, at least part of the third communication, transforming, by the first processing system, at least part of the stored third communication into a fourth communication having the second communication protocol, and providing, by the first processing system, the fourth communication to a fourth processing system configured to communicate based on the second communication protocol. For example, the communication bridge 410 can receive a message from the device 440 over the connection 442. Information can be parsed, extracted, and cached by the communication bridge 410. The communication bridge 410 can generate another message based on information from the device 440 into a format that is compatible with the device 450 and the connection 452, and transmit the message to the device 450 over the connection 452.

In some implementations, the process 600 can also include determining, by the first processing system, data having a first data type in a first format in the first communication, and identifying, by the first processing system, that the first data type is consumable by a second processing system, wherein transforming at least part of the stored first communication into the second communication having a second communication protocol further comprises transforming the data from the first format into a second format consumable by the second processing system, and wherein providing the second communication further comprises transmitting, by the first processing system and based on the identifying, the second communication to the second processing system. For example, the communication bridge 410 can receive a message from the device 450, and respond by transforming information from the message into a format that can be consumed by the device 420, and then "push" that message to the device 420.

Figure 7:
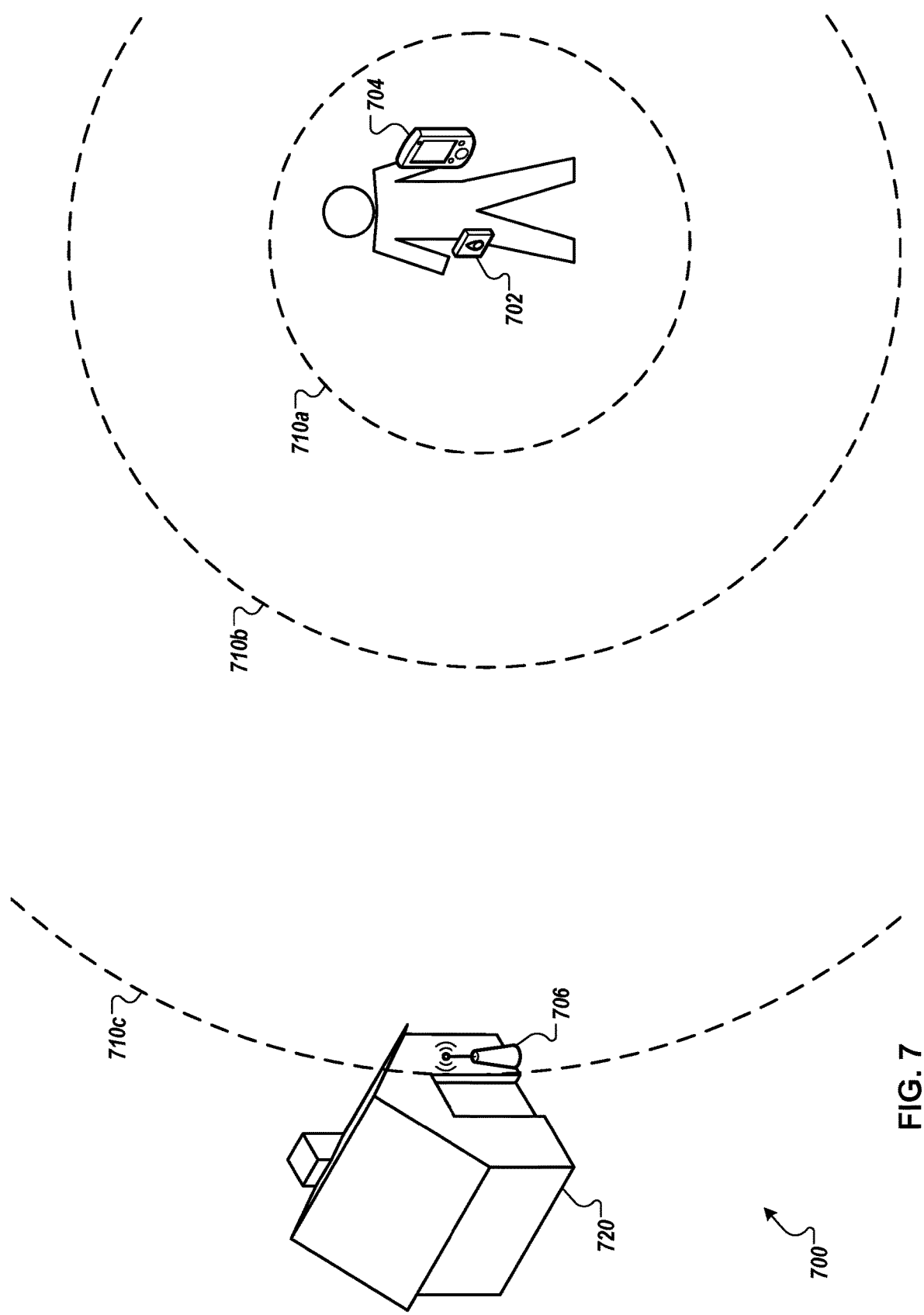
FIG. 7 is conceptual diagram of an example system for adjusting a transmission signal strength of a pinger device.

FIG. 7 is a conceptual diagram of an example system 700 for adjusting a signal strength of a pinger device. In the depicted example, the system 700 includes a pinger device 702, a mobile computing device 704, and a gateway device 706.

The pinger device 702, for example, can be a portable remote control device (e.g., a key fob) that includes a radio transmitter configured to transmit a wireless beacon signal at a repeating interval (e.g., once per second, once every two seconds, once every five seconds, or another suitable interval). For example, the pinger device 702 can wirelessly communicate with the gateway device 706, to passively provide information (e.g., pings), which can indicate the presence of an associated user, and to actively provide information (e.g., button presses), which can indicate one or more inputs from the user (e.g., emergency command, arm command, disarm command, unlock command, signal strength setting command). In some examples, the pinger device 702 may wirelessly communicate with the mobile computing device 704 and/or the gateway device 706, to send and/or receive information (e.g., commands, configuration settings) between the devices. For example, the pinger device 702 can use a Bluetooth Low Energy (BLE) communication protocol, a Near Field Communication (NFC) protocol, or another suitable protocol to send and receive information. In some examples, the pinger device 702 may include one or more processing devices and one or more memory devices. For example, the pinger device 702 can maintain various configuration settings (e.g., signal strength, schedule) to be used during device operation.

The mobile computing device 704, for example, can be a touchscreen smartphone, a smart watch, a tablet, a personal digital assistant, or another suitable type of mobile computing device that can wirelessly communicate with the pinger device 702 and/or the gateway device 706. For example, the mobile computing device 704 can use Wi-Fi, Bluetooth Low Energy (BLE), Near Field Communication (NFC), or other suitable communication protocols to communicate with other devices. In some examples, the mobile computing device 704 may use a first communication protocol to communicate with the pinger device 702, and a second, different communication protocol to communicate with the gateway device 702. Communication between the mobile computing device 704 and the pinger device 702 may generally be performed using a relatively low power, short range protocol, such that battery power of the pinger device 702 may be conserved, and a hardware design of the pinger device 702 may be simplified—whereas communication between the mobile computing device 704 and the gateway device 706 may be performed using a higher-powered, longer-ranged protocol. For example, the mobile computing device 704 can communicate with the pinger device 702 using NFC, and can communicate with the gateway device 706 using BLE or WiFi. As another example, the mobile computing device 704 can communicate with the pinger device 702 using NFC or BLE, and communicate with the gateway device 706 using WiFi.

In some examples, the mobile computing device 704 may serve as a communication bridge between the pinger device 702 and the gateway device 706. For example, information received by the mobile computing device 704 from the gateway device 706 (e.g., using a relatively long range communication protocol) can be passed by the mobile computing device 704 to the pinger device 702 (e.g., using a relatively short range communication protocol), and/or information received by the mobile computing device 704 from the pinger device 702 can be passed to the gateway device 706. Thus, in the present example, the pinger device 702 can be designed with a short range wireless receiver rather than a long range wireless receiver, while benefiting from the longer-ranged communication capabilities of the mobile computing device 704 to which the pinger device 702 may be paired.

In some examples, the mobile computing device 704 may provide user interface capabilities for specifying one or more configuration settings for the pinger device 702 and/or controlling the pinger device 702. In comparison to the mobile computing device 704, for example, the pinger device 702 may provide a relatively limited user interface, or may not provide any interface. For example, a simple interface provided by the pinger device 702 may include one or more hardware push buttons, one or more indicator lights (e.g., LEDs), and/or an audio speaker for playing simple tones—whereas an interface provided by the mobile computing device 704 may include a touch screen for displaying information and presenting various interactive software controls, a microphone for receiving spoken commands, and a speaker for playing full audio. Thus, in the present example, the pinger device 702 can be designed with a relatively simple interface, while benefiting from the more advanced interface capabilities of the mobile computing device 704 to which the pinger device 702 may be paired.

The gateway device 706, for example, can be a communication hub of a security system (not shown) used to secure a property 720 (e.g., a building, a vehicle, or another type of property), and can wirelessly communicate with the pinger device 702 and/or the mobile computing device 704. For example, the gateway device 706 can communicate with plural components of the security system, including Internet-of-Things (IoT) devices, security system detectors, security system control devices, and remote security system services. IoT devices of the security system can include components that may or may not be security system-related, such as temperature sensors and controls (including heating and air conditioning), doors, locks, garage doors, appliances, lights, and other systems. Communications among the gateway device 706 and related components can include local area network (LAN) communications and wide area network (WAN) communications. LAN communications (e.g., WiFi, Bluetooth, Bluetooth Low Energy (BLE)) can be used, for example, among components that are situated in a premises of the gateway device 706 (e.g., the property 720), including the mobile computing device 704 when present within a threshold distance of the gateway device 706 (e.g., in or near the building(s) in which the gateway 706 is located). WAN communication between the gateway device 706 and the mobile computing device 704, for example, can be handled using a WAN communication system network (e.g., cellular phone network), can occur between the gateway device 706 and one or more remote security services, and can occur between the gateway device 706 and the mobile computing device 704 when the device 704 is not present within the threshold distance of the device 706. In some examples, the gateway device 706 may not include a display component providing a graphical user interface or textual user interface. For example, user interface and display functionality for the gateway device 706 can be provided through the mobile computing device 704.

In some implementations, a signal strength at which a pinger device transmits a wireless beacon signal for detection by a gateway device may be adjusted. For example, the pinger device 702 can transmit wireless beacon signal 710*a*

(e.g., having a low signal strength), wireless beacon signal 710*b* (e.g., having a medium signal strength), or wireless beacon signal 710*c* (e.g., having a high signal strength). Generally, wireless beacon signal's range may be proportional to its signal strength—in the present example, wireless beacon signal 710*a* is shown as having a short range, signal 710*b* is shown as having a medium range, and signal 710*c* is shown has having a long range.

Figure 8:
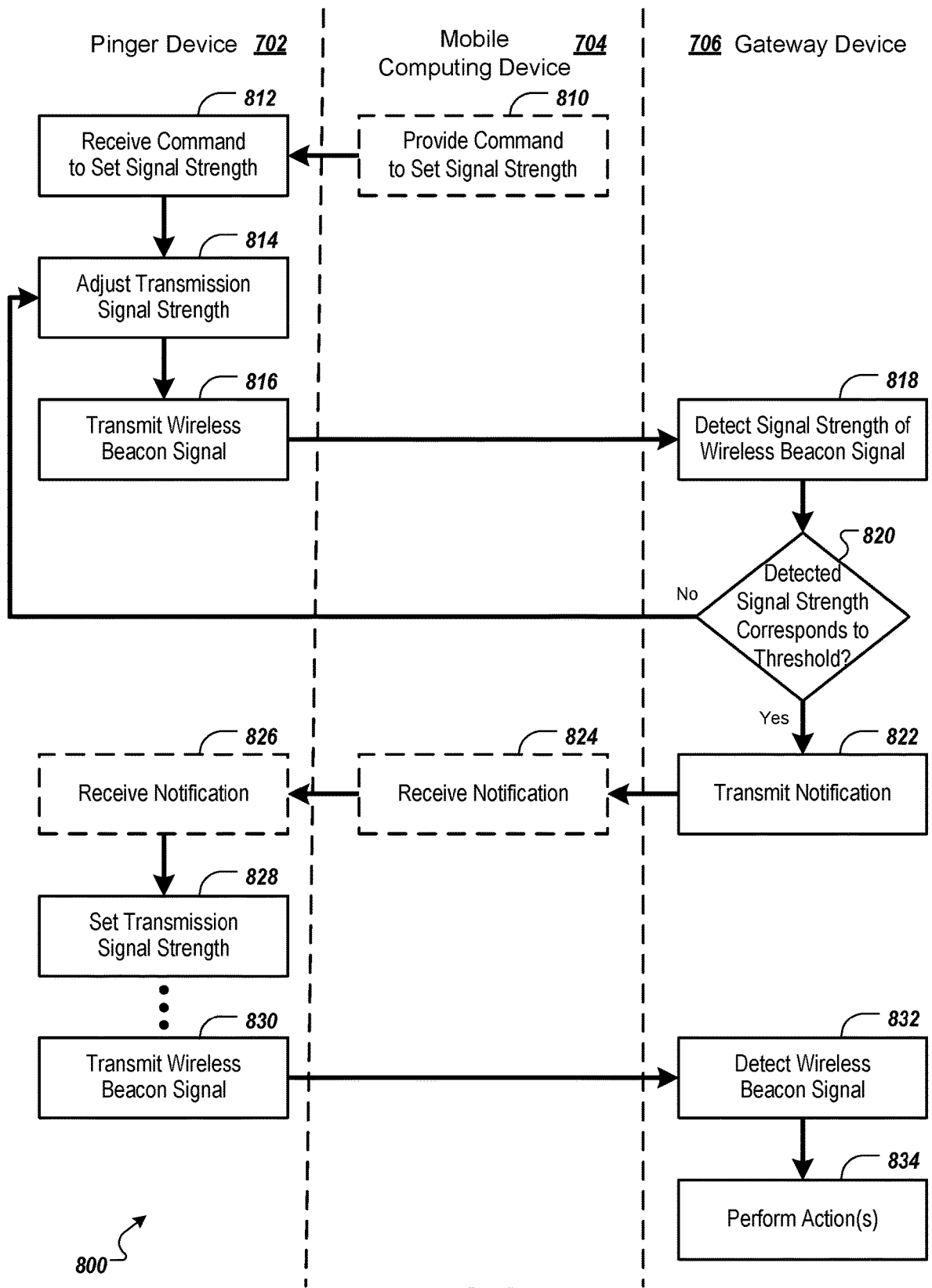
FIG. 8 is a swim lane diagram of an example process for adjusting a transmission signal strength of a pinger device.

Referring now to FIG. 8, a swim lane diagram of an example process 800 for adjusting a transmission signal strength of a pinger device is shown. Operations for adjusting the transmission signal strength may be performed within the system 700 (shown in FIG. 7), for example, and may include presenting one or more user interfaces, such as the user interface 900 (shown in FIG. 9). However, the operations may also be performed by different systems and/or may include presenting different sorts of user interfaces, or no user interfaces.

Figure 9:
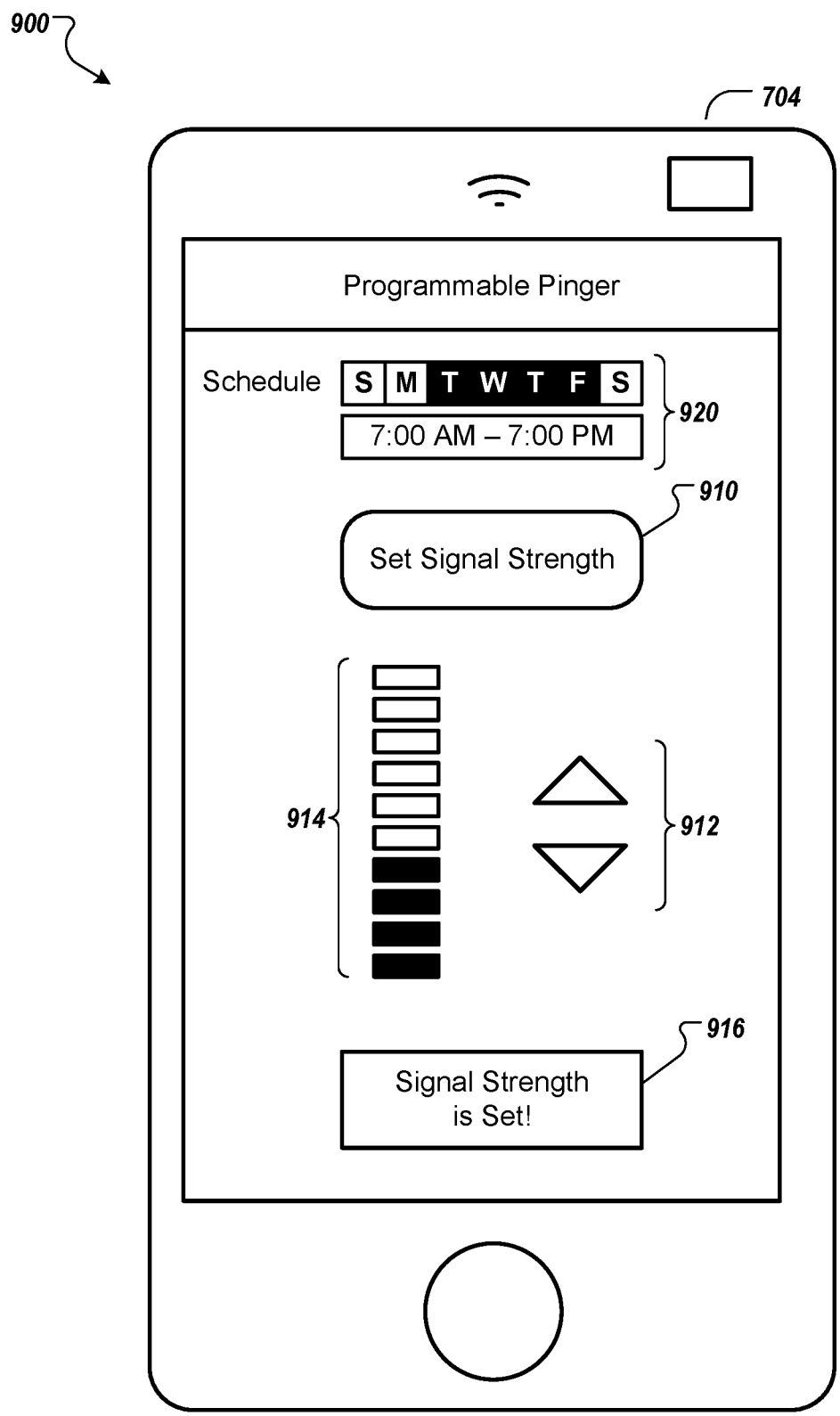
FIG. 9 shows an example interface presented by a mobile computing device for adjusting a transmission signal strength of a pinger device.

At box 810, the mobile computing device 704 optionally provides a command to set a signal strength of the pinger device 702. Referring to FIG. 9, for example, an example interface 900 presented by mobile computing device 704 for adjusting a transmission signal strength of a pinger device is shown. A user, for example, can carry on his or her person, both the mobile computing device 704 and the pinger device 702. When the user is located at a suitable distance from the gateway device 706, for example, the user can interact with (e.g., select) initiation control 910 of the interface 900 presented by the mobile computing device 704, to initiate a process through which the transmission signal strength of the pinger device 702 will be adjusted and set. In the present example, the user intends for the transmission signal strength of the pinger device 702 to be set such that its wireless beacon signal is to be within a detection threshold of the gateway device 706 whenever the device 702 is located at or within its current distance to the device 706, yet the wireless beacon signal is to be outside of the detection threshold whenever the device 702 is located beyond its current distance to the device 706. In response to receiving the user input through the initiation control 910, for example, the mobile computing device 704 can wirelessly transmit a command to set the transmission signal strength to the pinger device 706. In some implementations, a command to set a transmission signal strength may be provided using an interface of a pinger device. For example, the pinger device 702 can include one or more buttons which, when pressed, initiate the process through which the transmission signal strength of the pinger device 702 will be adjusted and set. In some implementations, a command to set a transmission signal strength may be provided when a mobile computing device is proximate to a pinger device. For example, the mobile computing device 704 and the pinger device 702 may be paired (e.g., through a custom software application and/or one or more security codes), and as a security measure, the command to set the transmission signal strength may be provided only when the pinger device 702 is within close range (e.g., within a few feet) of the mobile computing device. In some implementations, a command to set a transmission signal strength may be provided to a gateway device. For example, the mobile computing device 704 can establish communication with the gateway device 706 when the process to adjust and set the transmission signal strength of the pinger device 702 is initiated, such that the gateway device 706 is placed in a mode to facilitate at least a portion of the process.

Referring again to FIG. 8, at box 812, the pinger device 702 receives a command to set a transmission signal strength at which the device 702 transmits a wireless beacon signal for detection by the gateway device 706. For example, the pinger device 702 can receive the command (e.g., resulting from user interaction with an interface of the mobile computing device 704 and/or the pinger device 702), and in response, can adjust its signal strength at box 814.

At box 816, the pinger device 702 transmits a wireless beacon signal using the adjusted transmission signal strength, and at box 818, the gateway device 706 may or may not detect a signal strength of the wireless beacon signal transmitted by the pinger device 702. In some examples, the wireless beacon signal may transmit data that identifies the pinger device 702, and/or indicates that the transmission signal strength is being adjusted. Referring again to FIG. 7, for example, the pinger device 702 can begin by transmitting wireless beacon signal 710*a* (e.g., having a low signal strength), including an optional identifier for the device 702, and/or a code associated with a signal strength adjustment. In the present example, the signal 710*a* may not be detectable by the gateway device 706, or may be detectable but below a threshold signal strength called for by the gateway device 706. Thus, in the present example, at box 820 (shown in FIG. 8), the detected signal strength does not correspond to the threshold signal strength, and the process continues at box 814 (also shown in FIG. 8) where the pinger device readjusts its transmission signal strength.

In some implementations, (i) adjusting the transmission signal strength, (ii) transmitting the wireless beacon signal using the adjusted transmission signal strength, and (iii) detecting a detected signal strength of the wireless beacon signal transmitted by the pinger device, may be iteratively performed, until the gateway device determines that the detected signal strength corresponds to the threshold signal strength. Referring again to FIG. 7, for example, after the gateway device 706 determines that the wireless beacon signal 710*a* has a signal strength below the threshold signal strength, or the gateway device 706 fails to detect the signal 710*a*, the pinger device 702 can again adjust its transmission signal strength. After adjusting its transmission signal strength, for example, the pinger device 702 can transmit wireless beacon signal 710*b* (e.g., having a medium signal strength), which may again not be detectable by the gateway device 706, or may be detectable but below a threshold signal strength called for by the gateway device 706. The pinger device 702, for example, can again adjust its transmission signal strength, and afterwards can transmit wireless beacon signal 710*c* (e.g., having a high signal strength). In the present example, at boxes 818 and 820 (shown in FIG. 8), wireless beacon signal 710*c* may be detectable by the gateway device 706, or may be detectable and correspond to a threshold signal strength called for by the gateway device 706. Thus, in the present example, the iterative process may be complete. In some examples, a transmission signal strength may be initially adjusted to a low value, and for each subsequent iteration, the transmission signal strength may be adjusted to an increasingly higher value. For example, a first transmission signal strength can be used to transmit wireless beacon signal 710*a*, and subsequently higher signal strengths can be used to transmit wireless beacon signals by the pinger device 702 until a suitable signal strength is detected by the gateway device 706. In some examples, a transmission signal strength may be initially adjusted to a high value, and for each subsequent iteration, the transmission signal strength may be adjusted to a decreasingly lower value. For example, a first transmission signal strength can be used to transmit wireless beacon signal 710*c*, and subsequently low signals strengths can be used by the pinger device 702 to transmit wireless beacon signals until a suitable signal strength (e.g., a detectable wireless beacon signal within a threshold range) is detected by the gateway device 706.

In some implementations, a transmission signal strength at which a pinger device transmits a wireless beacon signal for detection by a gateway device may be manually set using an interface of a paired mobile computing device. Referring again to FIG. 9, for example, the interface 900 presented by the mobile computing device 704 can include one or more signal strength adjustment controls 912 through which a user can adjust a transmission signal strength of a pinger device paired to the device 704. For example, the user can interact with the adjustment controls 912 to adjust the transmission signal strength of the pinger device 702 (shown in FIG. 7) higher or lower.

In some implementations, a user interface presented by a mobile computing device for adjusting a transmission signal strength at which a paired pinger device transmits a wireless beacon signal may include a control for presenting signal strength information. Referring again to FIG. 9, for example, the interface 900 presented by the mobile computing device 704 can include a signal strength indication control 914. For example, the signal strength indication control 914 can present an indication of a transmission signal strength currently being used by the pinger device 702 (shown in FIG. 7). As another example, the signal strength indication control 914 can present an indication of a signal strength of a pinger device's wireless beacon signal being detected by the gateway device 706 (shown in FIG. 7). As the pinger device 702 adjusts its signal strength higher or lower (e.g., as part of an automatic iterative adjustment process or as part of a manual adjustment process), for example, the signal strength indication control 914 can be updated to indicate a current signal strength being used by the pinger device 702 and/or being detected by the gateway device 706.

Referring again to FIG. 8, at box 822, in response to determining that the detected signal strength corresponds to the threshold signal strength, the gateway device 706 transmits a notification that the detected signal strength corresponds to the threshold signal strength. For example, the gateway device 706 can determine that the wireless beacon signal 710c (shown in FIG. 7) detected by the device 706 has a signal strength that corresponds to a predetermined threshold signal strength value stored by the device 706. The gateway device 706, for example, can transmit the notification for receipt by the mobile device 704 and/or the pinger device 702.

In some implementations, a mobile computing device may receive, from a gateway device, a notification that a detected signal strength corresponds to a threshold signal strength, and can transmit the notification for receipt by a pinger device. Referring again to FIG. 8, for example, at box 824, the mobile computing device 704 can optionally receive the notification transmitted by the gateway device 706 (e.g., using a higher-powered, longer-ranged communication protocol), and forward the notification to the paired pinger device 702 (e.g., using a lower-powered, shorter-ranged communication protocol). At box 826, for example, the pinger device 702 can optionally receive the notification that has been transmitted by the gateway device 706 and forwarded by the mobile computing device 704. In some examples, a pinger device can receive a notification that a detected signal strength corresponds to a threshold signal strength, directly transmitted by a gateway device for receipt by the pinger device. For example, the pinger device 702 can directly receive the notification from the gateway device 706, without the notification having been forwarded from the mobile computing device 704.

At box 828, for example, in response to receiving the notification that the detected signal strength corresponds to the threshold signal strength, the pinger device 702 can set its transmission signal strength as the currently adjusted transmission signal strength. In the present example, the pinger device's transmission signal strength is set to be the transmission signal strength at which the pinger device 702 transmits the wireless beacon signal 710c (shown in FIG. 7). After the pinger device's transmission signal strength has been set, for example, the pinger device 702 will transmit its wireless beacon at that signal strength at a repeating interval (e.g., once per second, once every two seconds, once every five seconds, or another suitable interval), and the gateway device 706 will detect the wireless beacon signal when the signal is within its detection threshold. By setting a transmission signal strength of the pinger device 702 to be a minimum value needed for detection by the gateway device 706 within a desired range, for example, power can be conserved by the pinger device 702.

In some implementations, a user interface presented by a mobile computing device for adjusting a transmission signal strength at which a paired pinger device transmits a wireless beacon signal may include a completion control for presenting an indication that the transmission signal strength has been set. Referring again to FIG. 9, for example, the interface 900 presented by the mobile computing device 704 can include a completion control 916. In the present example, the completion control 916 presents a message (e.g., "signal strength is set") that indicates that a process for adjusting and setting the transmission signal strength of the pinger device 702 is complete. As another example, the pinger device 702 can present feedback (e.g., one or more lights and/or audio tones) indicating that the process is complete.

In some implementations, a transmission signal strength at which a pinger device transmits a wireless beacon signal for detection by a gateway device may be set according to a schedule. For example, the interface 900 presented by the mobile computing device 704 can include a schedule specification control 920 through which a user can specify a schedule for which a transmission signal strength is to be used by the pinger device 702 (shown in FIG. 7). The pinger device 702, for example, can include a computer clock that is periodically synchronized with the mobile computing device 704 and/or the gateway device 706. In the present example, the transmission signal strength that is set for the pinger device 702 is to be used from Tuesday through Friday, 7:00 AM-7:00 PM. During different times, for example, the pinger device 702 may use different transmission signal strengths, and may thus be located at different distances from the gateway device 706 in order to be detected by the gateway device 706. For example, a user of the pinger device 702 may set a relatively high transmission signal strength for the device 702 during daytime hours, and a relatively low transmission signal strength for the device 702 during nighttime hours—such that the pinger device 702 may be detected by the gateway device 706 when relatively close during nighttime, and the pinger device 702 detected by the gateway device 706 when relatively far during daytime.

Referring again to FIG. 8, at box 830, after the pinger device 702 has adjusted and set its transmission signal strength, it repeatedly transmits its wireless beacon signal at the set transmission signal strength, and at box 832, the gateway device 706 detects the wireless beacon signal being transmitted by the pinger device 702. In response to detecting the wireless beacon signal (e.g., the signal having a detected signal strength that meets or exceeds a threshold signal strength), at box 834 the gateway device 706 can perform one or more actions. The one or more actions, for example, may include actions performed in connection with the property 720 (shown in FIG. 7), such as disarming one or more alarms, unlocking one or more doors, turning on one or more lights, logging one or more security events, or performing other suitable actions. In some examples, various security conditions may be specified in connection with transmitting a wireless beacon signal and/or performing one or more actions. For example, the pinger device 702 can be configured to transmit wireless beacon signals and/or the gateway device 706 can be configured to respond to wireless beacon signals according to a schedule, and/or when an authorized mobile computing device 704 is also detected (e.g., by the pinger device 702 and/or the gateway device 706), and/or according to another suitable condition.

Figure 10A:
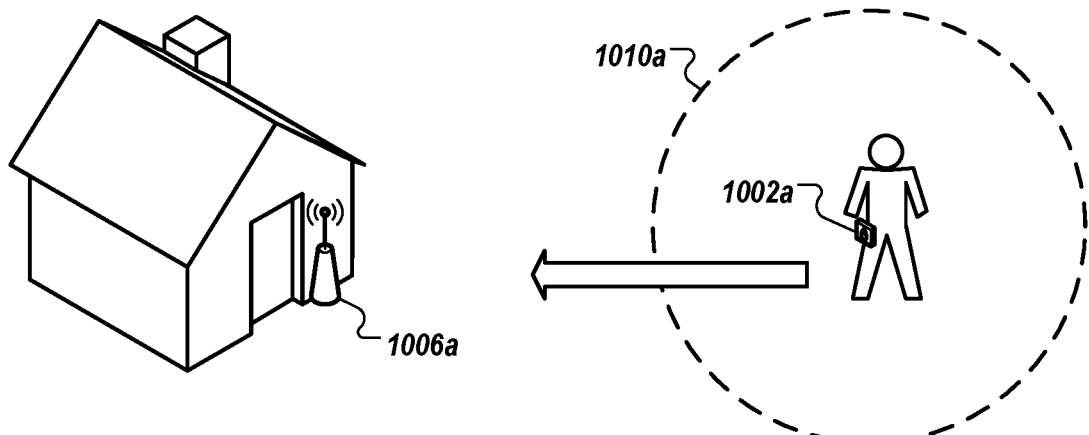
FIGS. 10A-C is a conceptual diagram of detecting, by a gateway device, a wireless beacon signal transmitted by a pinger device.
Figure 10B:
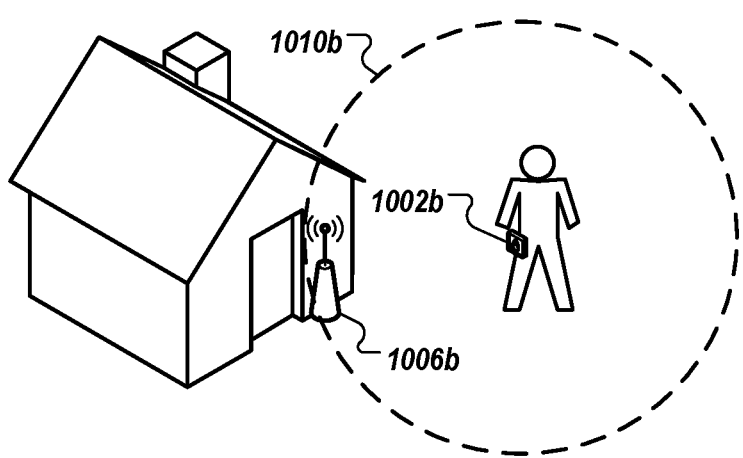
Figure 10C:
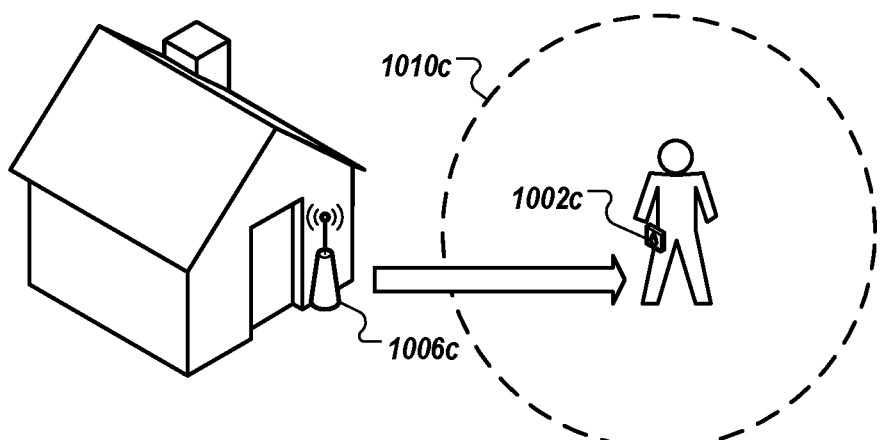

Referring now to FIGS. 10A-C, for example, conceptual diagrams of detecting, by gateway device 1006 (e.g., similar to gateway device 706, shown in FIG. 7), a wireless beacon signal 1010 (e.g., similar to wireless beacon signal 710, shown in FIG. 7) transmitted by pinger device 1002 (e.g., similar to pinger device 702, shown in FIG. 7). As shown in FIG. 10A, for example, a user of the pinger device 1002a carries the device 1002a on his or her person, and moves toward the gateway device 1006a. As the device 1002a moves, for example, it repeatedly transmits wireless beacon signal 1010a at periodic intervals (e.g., once per second, once every two seconds, once every five seconds, or another suitable interval). In the present example, the wireless beacon signal 1010a is not detectable by the gateway device 1006a, or has a signal strength that does not correspond to the threshold signal strength. Thus, in the present example, the gateway device 1006a does not trigger any actions.

As shown in FIG. 10B, for example, the pinger device 1002b continues transmitting the wireless beacon signal 1010b, which is now detectable by the gateway device 1006b, or has a signal strength that corresponds to the threshold signal strength. For example, the pinger device 1002b may now be within a similar distance to the gateway device 1006b as when its transmission signal strength was adjusted and set. Thus, in the present example, the gateway device 1006b performs the one or more actions (e.g., disarming an alarm, unlocking a door, turning on a light, logging an arrival security event, or performing another suitable action.)

As shown in FIG. 10C, for example, the user of the pinger device 1002c moves away from the gateway device 1006c. As the device 1002c moves, for example, its wireless beacon signal 1010c as detected by the gateway device 1006c becomes weaker as its distance to the gateway device 1006c increases. In the present example, the wireless beacon signal 1010c is eventually undetectable by the gateway device 1006c, or has a signal strength that does not correspond to the threshold signal strength. Thus, in the present example, the gateway 1006a no longer performs the actions, or performs a different, opposite sort of action (e.g., arming an alarm, locking a door, turning off a light, logging a departure security event, or performing another sort of action.)

Although examples have been described in which a transmission signal strength of a pinger device is adjusted and set, in some examples, the pinger device's transmission signal strength may be constant, and a threshold signal strength of a gateway device may instead be adjusted, set, and stored by the gateway device, such that a range at which the gateway device detects the pinger device and performs various actions may be varied. Also, examples have been described in which a single gateway device is used to detect a signal strength of a wireless beacon signal transmitted by a pinger device, however in some examples, multiple gateway devices may be used to detect a pinger device's signal strength. When adjusting and setting the transmission signal strength of the pinger device and/or when adjusting and setting the threshold signal strengths of various gateway devices, for example, each gateway device may be associated with a different threshold signal strength, such that an absolute position at which the pinger device is detected with respect to a premises may be determined and used for triggering actions.

Figure 11A:
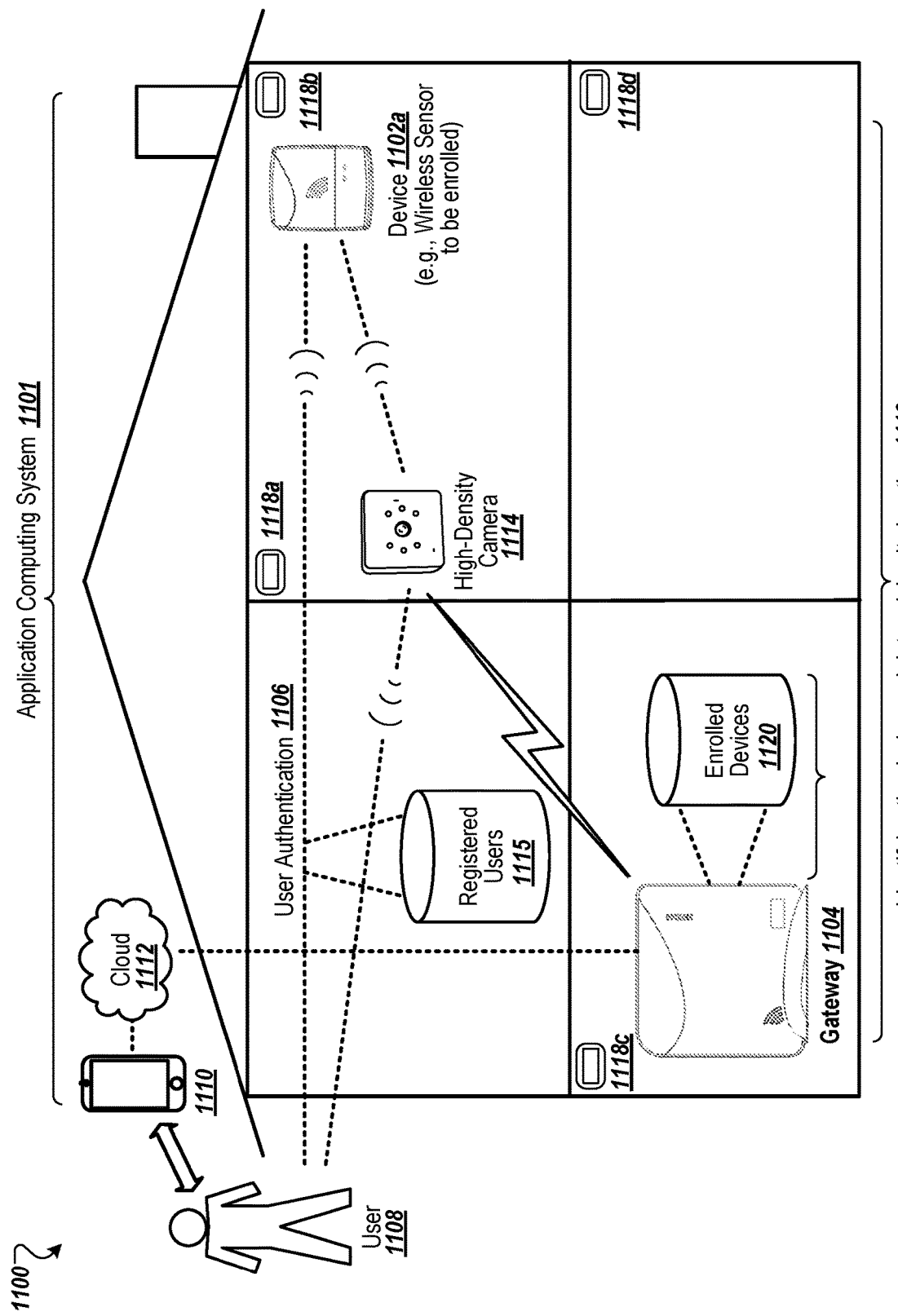
FIG. 11A is a block diagram of an example environment in which an application computing system enrolls devices into a security system.

FIG. 11A is a block diagram of an example environment 1100 in which an application computing system 1101 enrolls devices into a security system. The security system can be a home security system, for example, at the home of a user. The devices to be enrolled can be, for example, sensors or other security system equipment provided with the security system or available from a third-party system and on the premises. In some implementations, the environment 1100 can provide an image-based device enrollment session to enroll a device 1102a, for example, a wireless sensor to be enrolled. Enrollment of the device 1102a can incorporate the device 1102a into the security system that is controlled, for example, by a gateway 1104. The purpose of the gateway 1104 can include communicating with security devices enrolled in the security system.

For example, to obtain and use information from wireless sensors, a wireless system can recognize, enroll, and configure wireless sensors into its system. In some implementations, outdoor perimeter sensors can be used in a different way than typical sensors of conventional home security systems that include home and building perimeter sensors. Outdoor sensors can, for example, trigger different behaviors in a security system, such as generating warnings instead of alarms or initiating enrollment of devices that are part of a home security system. Outdoor perimeter sensors include, for example, motion sensors, gate sensors, outdoor building/structure sensors, asset tags, and others.

For example, an application computing system, which may be referred to herein as a wireless system, can automatically detect, configure, use, and anticipate expected operation of wireless sensors. A wireless gateway used in a security system or an intelligent wireless "translator," may be part of an example wireless system that is able to automatically (or with minimized user assistance) discover, enroll, classify, and configure the system to respond to, and pass on information from, existing sensors, regardless of the sensor manufacturer, protocols, sensing functions, radio frequencies, and/or operational models/vintages. The wireless gateway can also facilitate image-based device enrollment into the system.

The wireless system can, for example, use a multitude of objective and subjective algorithms to set up the system to utilize these existing sensors. Further, the algorithms can aid in discovering existing sensors from the sensors' supervisory or responsive wireless transmissions, which can involve numerous steps and phases, including deductions and inferences about interrelationships of pieces of information.

The wireless system can, for instance, automatically connect to various sensors by accumulating and/or measuring objective, deterministic information that is wirelessly detectable. Such information can include, for example, one or more of the following: frequency of operation, modulation type, modulation parameters, error detection scheme, timing of transmissions, signal strength, signal strength relative to other sensors, unique identifiers (e.g., serial numbers), device type, and status information such as tamper, battery state, alarm state, temperature, humidity, and other conditions).

The wireless system can use various pieces of information to form a working theory of where, what, and how sensors are operating in a particular location, such as a home, a building, and/or another location. For instance, the wireless system can progress through a series of logical deductions, inferences, and/or possibilities that can narrow down each sensor's identity (e.g., type, manufacturer, and protocol) from a broad range of sensors to a smaller pool of candidate sensors. Multiple iterations of deductions, inferences, and possibilities can be performed that include generating working theories for each sensor, which can be tested (e.g., theories evaluated against wirelessly detected sensor information) and then improved upon to generate better theories, which can be further tested. In some instances, theories can be additionally narrowed through actual requests for information from humans, like a pre-educated setup wizard.

The wireless system can deduce a variety of subjective information and/or indirect conclusions. Example information that is queried and/or obtained can include (including based on images captured of the device): 1) what type of device the sensor is, such as a magnetic door/window sensor, motion sensor, and/or tilt sensor, to name only a few possibilities; 2) whether the sensor is a perimeter sensor (e.g., door or window sensor) or an interior sensor (e.g., motion detector pointing inside); 3) where a particular sensor might be located (e.g., a garage overhead door, a garage entry door, or a basement motion detector); and 4) what the sensor might be named/referred to as (e.g., "front door"). Conclusions can include probable assessments regarding a type of sensor for a given wireless sensor. Each generated conclusion can ultimately be used in a process to enroll the wireless sensor into an application computing system that controls sensors. Conclusions can be presented to a user and can include information related to the probable assessment regarding the probable type of sensor, the sensor's function, a sensor use case, and other attributes or information for the wireless sensor.

In addition, various subjective deductions can be made on less definitive information, such as one or more of the following: 1) the time delay between opening (an alarm condition) and closing (a restore); 2) the time of day the sensor sends various information; 3) the number of sensor trips per day, and distribution of such trips throughout the day; 4) the interrelationship and relative timing or order between two or more sensors tripping; 5) the relationship between sensor trips and other information collected by the wireless system itself, such as audio information and vibration; 6) the interrelationship and relative timing or order between a security system reporting over observable methods such as phone, cellular, or IP networks and the tripping of one or more sensors; 7) the minimum time between any two trips of a sensor (e.g., the fact that most wireless motions "lock out" for 3 minutes after any trip, could be used in guessing the sensor is a motion sensor); and/or 8) the state of various status bits in the transmissions may also give clues to the exact type of sensor (e.g., some sensors may default certain unused bits in a certain way).

Using the techniques described in this document, wireless energy can be detected and evaluated, and wireless parameters and/or protocols can be determined. For example, the wireless system can detect information that includes the frequency band of detected wireless signals, the modulation method and parameters. Using the detected information, the wireless system can discern the particular protocols that are predominant at the location (e.g., in the home). The sensor manufacturer can be determined, which may serve to introduce a whole additional subset of information about the sensor and how it operates. The sensor manufacturer may be determined, for example, from one or more of the frequency band, modulation method and parameters, particular protocols, and/or other information/wireless characteristics.

Local sensors—meaning sensors that are being used at the vicinity (e.g., house or home, building, or other location) where the wireless system is installed—can be differentiated from sensors at neighboring vicinities (e.g., neighboring home, building, or unit). For example, the wireless system can discover more than one protocol being used in the vicinity. The system can then survey the relative signal strengths of the populations of protocol 1 and protocol 2 sensors, and may conclude that the lower signal strength sensors are from a neighboring home and should generally be ignored. The system may even postulate that a neighboring home has the same protocol sensors, but by evaluating and comparing their signal strengths, can determine that those significantly lower signal strengths are from neighbor's sensors and not from the local vicinity. Other information may also be used to determine which sensors belong to the local vicinity. For example, interrelationships between multiple sensors or between a sensor and wireless-system-generated information contain information that is useful in determining whether a sensor is part of the local system.

In addition, sensor identifier numbers (IDs) included in all wireless transmissions made by a sensor and/or sensor type information can be determined using the techniques described in this document. For example, using the protocol information for the detected sensors, the wireless system can start looking at the next layer of information, such as evaluating supervisory check-ins over a period of time (e.g., several hours) to make a listing of the sensor IDs at the vicinity. For instance, since sensors generally send an hourly supervisory check-in, within several hours, the system should know what sensors it can hear well, and can make a confident listing of the sensor IDs in the home. Part of this monitoring and evaluation can also include examining whether the sensor protocol sends device types, which can be catalogued as well. In the absence of device types, the system can start evaluating what the device types might be based on detected patterns. For example, a sensor that closes about five seconds after opening might be a door/window sensor. A sensor that closes a split second after it alarms (or that never closes at all) might be a motion sensor. If that same sensor has never alarmed twice closer than three minutes apart, it can be assumed that it is a motion sensor. The system can include a variety patterns that are associated with particular types of sensors, which can guide the evaluation and determination of the device type.

Further yet, locations where sensors are placed within the vicinity can be determined. For instance, the wireless system can evaluate where the sensors are placed, again, based on detected patterns for the particular sensors and/or patterns across multiple sensors. For example, if a sensor is the first one to trip in a series of sensor trips, and the delay between open and close is about 30-60 seconds, it might be the garage door. The next trip might be the garage entry and the following trip might be the motion. Again, the wireless system can include a variety patterns that are associated with particular sensor locations (absolute and/or relative to each other). Sensors that are not frequently tripped will still transmit supervisory messages. These sensors can be identified, but are typically installed on the perimeter of homes or would fall into a life-safety sensor category.

Detecting and configuring sensors may be performed across a number of living-experience-days before the system has converged on a determination of the home's likely sensor configuration. Once the system has converged on a solution (e.g., the determined sensor configuration has not deviated more than a threshold amount over a recent period of time, such as an hour, 6 hours, 12 hours, one day), a set-up wizard session can be initiated with the user based on the determined sensor configuration. Such an example setup wizard can include one or more of the following questions. In a first example, the setup wizard can ask a question along the lines of, "When you come home, you seem to trip the following three sensors: <sensor_A>, <sensor_B>, and <sensor_C>. Might these be the garage door, the garage entry, and kitchen motion detectors?" In another example, the setup wizard can ask a question along the lines of, "These three sensors <sensor_X>, <sensor_Y>, and <sensor_Z> never seem to open; might they be windows?" If the user answers affirmatively in this case, the setup wizard can ask a question along the lines of, "Could you please open and close all the windows that have sensors on them? And once you've done that, come back and name them in the same order." In another example, the setup wizard can send a text to the homeowner's phone along the lines of, "You've just tripped a sensor. What would you like to call that sensor?"

In some implementations, the system may be able to proceed without the setup wizard if the system determines a conclusion with a sufficiently high degree of confidence and/or may only perform specific portions of the setup wizard when irreconcilable inconsistencies are present in the sensor configuration after a threshold period of time (e.g., several days, one week).

Systems and services outside of security could see value in the information from security sensors. As such, it may not be necessary that the sensors be immediately, or even perfectly configured into the non-security system. It can be acceptable for the security sensors to be incorporated gradually over time, as the non-security system learns the security sensors. The system can figure out as much as it can in the background and, if appropriate, can ask a user (e.g., the homeowner) for the smallest possible set of configuration information in finalizing the system configuration.

The following terms are applicable to this disclosure. "Observation" refers to listening to sensors and retaining information and/or characteristics of the sensors. For example, the system can perform observation of yet unknown sensors when the system is initially installed, such as during a learning period, and observation can continue on an ongoing basis after a sensor is known to the system. "Assessment" refers to making one or more conclusions about the sensors, using at least the information determined through observation and/or the use of a rule set. For example, assessment of a sensor can include concluding that the sensor is a garage door, that the sensor is an interior door, or that the sensor is an infrequently-used window. "Enrollment" refers to making a sensor a unique, known, and qualified member of a set of sensors in the purview of the system. Enrollment may include associating, with the sensor, conclusions about the sensor itself, including the sensor's type, location, and other information.

Some of the information used for enrollment can be obtained during an image-based device enrollment session. "Programming" refers to configuring the system on how to treat, respond, display, and report to signals from the sensor. For example, a garage door sensor can be programmed to act differently during time periods having patterns of use consistent with normal activities of the residents of a home, versus the garage door opening and staying open for a long period of time during a work day or late at night. "Utilization" refers to using the signals and information from the sensor in the normal mode of the system. For example, utilization of a normally-closed window sensor can indicate that normal use is a rare, if ever, occurrence, and a motion sensor in a kitchen occurs many times each day. Utilization can incorporate time-of-day, day-of-week, holiday, vacation, and other information.

Still referring to FIG. 11A, enrollment of the device 1102a can be initiated, for example, after user authentication 1106 of a user 1108. For example, authentication of the user can provide verification that the user 1108 is an owner of the security system or a qualified user of the security system (e.g., for the purpose of enrolling new devices). User authentication 1106 of the user 1108 can be part of a device enrollment function of the security system, for example, that is provided through the application computing system 1101. Some parts of the image-based enrollment process can be facilitated by application software that executes on a user device 1110, such as the user's smartphone, in conjunction with applications executing in the gateway 1104. In general, the application computing system 1101 can include some or all of the applications that execute within the environment 1100. The user device 1110 can communicate wirelessly with the gateway 1104, for example, through the cloud 1112 and/or using other wireless transmission technology and protocols, such as Bluetooth and wireless Ethernet. Some parts of the image-based enrollment process can be facilitated using a high-density camera 1114, which may be part of the home security system. The high-density camera 1114 can communicate with the application computing system 1101 and the gateway 1104, such as through wireless communications. The high-density camera 1114 can have other functions within the security system. For example, the high-density camera 1114 can also be used to scan a room to obtain images of devices to be enrolled (e.g., the device 1102a).

In some implementations, user authentication can include the use of biometrics. For example, a biometric feature of the user can be obtained by scanning the user using at least one of a webcam (e.g., on a laptop), a smartphone (using a scanner/camera on the smartphone), or a camera that is part of the security system (for example, the high-density camera 1114). The biometric feature of the user that is captured can be compared to stored biometric information, such as biometric information that is stored with the gateway 1104 (obtained during a user registration process, for example). The user can be authenticated upon determining a match between the biometric feature of the user and the stored biometric information. Biometric features can include, for example, a facial scan, a fingerprint scan, a retinal scan, or a voice print. In the example of a voice print, the user 1108 can provide, during user authentication, a voice sample that is captured using a microphone on the user device 1110. The application computing system 1101 can compare the captured voice sample to a repository containing voice samples of registered users 1115.

After the user 1108 is authenticated, an image-based device enrollment session can be initiated by the device enrollment function (e.g., part of the application computing system 1101). In some implementations, the user device 1110 can display a user interface (UI) that can step the user through the image-based device enrollment session for enrolling at least one unenrolled device on the premises (e.g., the device 1102*a*).

In some scenarios, detection of an unenrolled device can be made by the gateway 1104 (and/or the security equipment it controls) and communicated to the user device 1110. For example, the user 1108 can then be presented with a message on the user device 1110 such as "Unenrolled devices detected . . . " with an additional prompt to which a positive user response initiates enrollment. Identification of the unenrolled device can be facilitated using the high-density camera 1114, for example, which can scan a room or other area for objects that may be security-related devices and that are candidates for enrollment. Identification of security-related devices can be made by matching images of objects in a room to a repository of images of security-related devices. The images can be stored locally or can be accessible through the cloud 1112. In some implementations, the application computing system 1101 can capture images of new objects on the premises (as detected by the high-density cameras 1114), such as objects in a room that may be sensors or other security devices. The application computing system 1101 can periodically provide the images to a web-based clearinghouse, and receive an acknowledgement of a device type and other device-related information for each image.

In other scenarios, the user 1108 can visually identify the device 1102*a* and initiate the device enrollment function. For example, the device 1102*a* can be a new sensor that the user 1108 has just brought into the room and unpacked from a box. In this and other scenarios, the user 1108 can initiate the device enrollment function and can be presented with a message such as, "Would you like to perform image-based device enrollment?" which can initiate the image-based device enrollment session. The image-based device enrollment session can include identifying the device and determining its location (1116).

During the image-based device enrollment session, the device to be enrolled into the home security system is identified. For example, identifying the device can include scanning the device by at least one of a webcam, smartphone, or camera (e.g., the high-density camera 1115) that is part of the security system. The security system can operate in a listen mode to receive and record wireless transmissions produced by the device. The recorded wireless transmissions can be evaluated using a rule set that embodies normal operating characteristics of various types of wireless sensors in an operating environment. Based on the evaluating, a conclusion can be generated regarding at least one attribute of the device that produced the recorded wireless transmissions.

Identifying the device to be enrolled can include determining a unique device identifier (ID) of the device. For example, determining the unique device ID of the device by performing at least one of an optical scan of a bar code of the device, receiving an RFID signal from an RFID embedded in the device, or identifying a MAC address of the device.

After the device to be enrolled has been identified, during the image-based device enrollment session, a location of the device is determined within the premises of the home security system. For example, determining the location of the device can include identifying a location of a room or an area containing the device using a known reference point location and a direction of a line-of-site to the device from a scanning device. For example, when the high-density camera 1115 is pointed at and focuses on the device 1102*a*, the location of the device 1102*a* can be determined form the camera's direction of sight and the location of the high-density camera 1115 and other devices on the premises. For example, the location of the device 1102*a* can be determined using triangulation based on locations and signal strengths of two or more devices 1118*a*-1118*d* registered with the security system.

After the location of the device to be enrolled has been determined, the device is enrolled into the home security system. For example, the device 1102*a* can be added to a data store of enrolled devices 1120. Enrollment can occur using components of the application computing system 1101, for example.

Figure 11B:
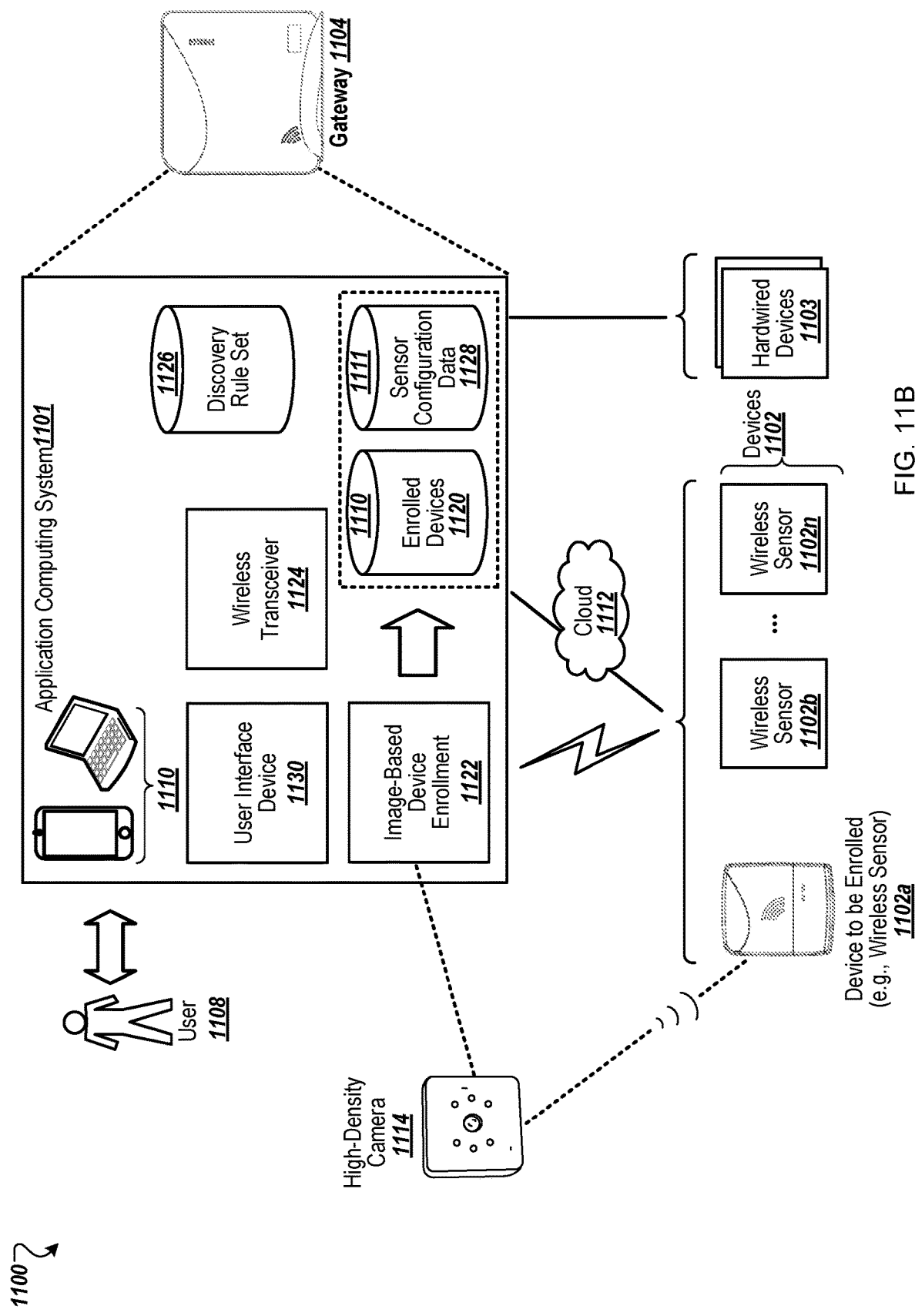
FIG. 11B is a diagram of an example application computing system.

FIG. 11B is a conceptual diagram of the example application computing system 1101. The application computing system 1101 (or system 1101) can be a security system that communicates with various wireless and hardwired sensors, including both security system sensors and other sensors. The system 1101 can be installed at a home, business, or other location. The system 1101 can immediately (and over time) discover devices 1102 (including the device 1102*a* and wireless sensors 1102*b*-1102*n*) and hardwired devices 1103 (e.g., sensors). The system 1101 can also determine operating characteristics of the devices. The devices can be part of a third-party system, yet the system 1101 can be programmed to passively detect and enroll the devices 1102 and 1103 without participating in or completing a formal enrollment with the third-party system. By enrolling existing devices 1102 and 1103 from a third-party system, the information available to the system 1101 regarding the vicinity can be enhanced without having to install a separate sensor array for system 1101. The system 1101 may generate and provide suggested configuration information for the devices 1102 and 1103 to set up, use, and continually optimize the operation of the system 1101 based on the devices 1102 and 1103.

The system 1101 includes an image-based device enrollment program 1122 for enrolling the devices 1102 and 1103. For example, using information received by a wireless transceiver 1124 from signals generated by the devices 1102, the image-based device enrollment program 1122 can make guesses as to the types and locations of the devices 1102 and 1103. For example, the devices 1102 and 1103 can be "closed" in a sense that they may not use a protocol that is standardized among vendors in order to broadcast their identity or other wireless information used to communicate with the devices 1102 and 1103. The system 1101 can detect the wireless devices 1102 and 1103, determine one or more sensor types that are likely for the devices 1102 and 1103, and enroll the devices 1102 and 1103 with the system 1101 so that the system 1101 can use the information generated by the devices 1102 and 1103.

The discovery process can include the use of a discovery rule set 1126 that includes, among other things, rules that can be used by the image-based device enrollment program 1122 for determining the types and locations of the devices 1102 and 1103. For example, the rules can indicate that a time duration between an open and close of an alarm indicates that the sensor is, for example, very likely to be a garage door sensor. The rules can also include information that related groups of sensors, such as to identify an entry door and interior doors based on a time sequence of received signals from those sensors. The system 1101 and the discovery rule set 1126 can use any of a variety of techniques for determining likely sensor information (e.g., sensor type, protocol), such as scoring the devices 1102 and 1103 along one or more dimensions when one or more rules from the discovery rule set 1126 are satisfied by passively monitored wireless transmissions/behavior for the devices 1102 and 1103. For instance, the discovery rule set 1126 can include rules that identify transmission scenarios that indicate that a sensor is likely to be a door sensor (e.g., open and close events occur close to each other in time), and can allocate points that correspond to how much the scenario indicates that the sensor is a door sensor. Once a threshold number of door sensor points have been achieved, the system 1101 can determine that the sensor is likely to be a door sensor. Points may be allocated along dimensions corresponding to each type of sensor, as well as being allocated for other sensor characteristics that can be detected/inferred by the system 1101. The system 1101 can be programmed to identify multiple potential sensor types for each sensor, when warranted based on points for the sensor types exceeding a threshold score. Other scoring and rule set evaluation techniques are also possible for the system 1101.

During the discovery process, the image-based device enrollment program 1122 can enroll identified sensors, such as in enrolled devices 1120. Enrollment information can include, for example, sensor identifiers (identifying each sensor to the system 1101), sensor types, sensor locations (absolute within a building and/or relative with regard to other sensors), and other information, as described below. Sensor configuration data 1128 can include, for each enrolled sensor, configuration information such as communication protocols. Enrollment of the devices 1102 and 1103 with the system 1101 can cause the system 1101 to persistently monitor for wireless transmissions from the devices 1102 and 1103, to process the wireless transmissions (e.g., determine what is happening in a building based on the transmission from the sensor), and to perform further actions based on the processed wireless transmissions (e.g., transmit information to a cloud-based system, automatically perform an operation, and transmit an alert/notification to the user). The discovery process can continue such that new wireless devices that are later installed in the home can also be observed and assessed for inclusion in any non-security or alternative security solutions.

A user interface device 1130, such as an interactive display provided for use by a user 1108, can display information and receive user inputs. For example, the user interface device 1130 can display "best guess" information, informing the user 1108 of the best guesses as to the types and locations of the sensors discovered by the system 1101. The user interface device 1130 can display prompts, including through the wizard described above, that allows the user to provide input associated with sensors and/or confirm assumptions made by the system 1101. In some implementations, the user interface device 1130 is part of the system 1101, such as a panel on a main controller of the system 1101, a remote user interface device that communicates with the system 1101, an application (app) on a mobile device (e.g., a smartphone), or some other device.

Although the example depicted in FIGS. 11A-B includes a single security system from which the system 1101 is enrolling sensors, the system 1101 can passively enroll sensors from multiple different systems within the home 1150. For example, the system 1101 may passively enroll sensors from both a home security system and from a home automation system within the home 1150. Additionally, the system 1101 can passively enroll sensors from both closed and open wireless communication networks. Although the system 1101 is presented as being used in the home 1150, it can be used in other environments, such as businesses, multi-tenant units (e.g., condos, apartments), extended range sensor environments (e.g., indoor/outdoor sensor systems, such as an entertainment park), and/or other environments.

The system 1101 and the closed security system depicted in FIGS. 11A-B can be different from each other and/or part of the same system. For example, the system 1101 can run in parallel to and be separate from the closed security system. In another example, the system 1101 can be part of the closed security system and components of the system 1101 can be part of a home wireless learning process for setting up a new closed security system. In another example, the system 1101 can be the new security system for the home 1150 and the closed security system can be an old system for the home 1150 that no longer exists or is no longer active. Other configurations are also possible.

Figure 12:
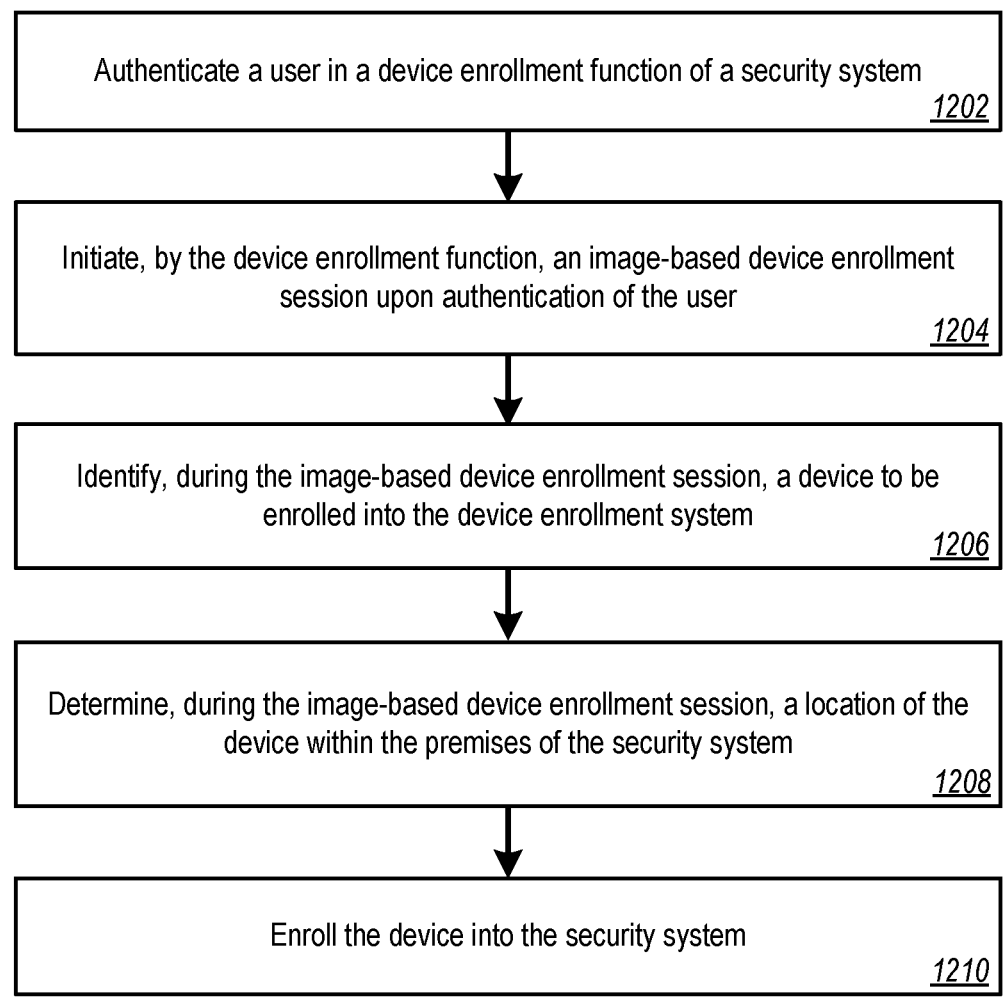
FIG. 12 is a flowchart of an example of a process for enrolling sensors into a system, such as the system.

FIG. 12 is a flowchart of an example of a process 1200 for enrolling sensors into a system, such as the system 1101. In some implementations, the process 1200 can be performed by the image-based device enrollment program 1122 in combination with other components of the system 1101.

In an example process, a user is authenticated in a device enrollment function of a security system (1202). For example, authenticating a user may include verifying that the user is an owner of the security system or a qualified user of the security system (e.g., for the purpose of enrolling new devices). In some implementations, authenticating the user includes capturing, scanning, or otherwise detecting a feature of the user, such as a visually-perceptible feature of the user. The process may include scanning the user using at least one of a webcam, a smartphone, or a camera that is part of the security system (for example, the high-density camera 1114), to detect a biometric information associate with the user, and comparing the capture biometric information to stored biometric information. The user can be authenticated by determining a match between the biometric feature of the user and the stored biometric information.

In an example process, an image-based device enrollment session is initiated by the device enrollment function upon authentication of the user (1204). Initiating an image-based device enrollment session may include displaying a user interface (UI) that can step the user through the image-based device enrollment session for enrolling at least one unenrolled device on the premises. In some implantations, initiating an image-based device enrollment session may include, or be triggered by, a security system component detecting an unenrolled device at the premises.

During the image-based device enrollment session, a device to be enrolled into the device enrollment system is identified (1206). In some implementations, identifying the device to be enrolled can include scanning the device by at least one of a webcam, smartphone, or camera that is part of the security system. Alternatively or additionally, identifying the device to be enrolled may include receiving and/or recording wireless transmissions produced by the device, and evaluating the wireless transmissions using a rule set that embodies normal operating characteristics of various types of wireless sensors in an operating environment. In some implementations, an operation of identifying the device to be enrolled can include determining a unique device identifier (ID) of the device, such as by optically scanning a bar code of the device, receiving an RFID signal from an RFID embedded in the device, or identifying a MAC address of the device.

During the image-based device enrollment session, a location of the device within the premises of the security system is determined (1208). In some implementations, determining the location of the device can include identifying a location of a room or an area containing the device using a known reference point location and a direction of a line-of-site to the device from a scanning device.

The device is enrolled into the security system (1210).

Figure 13:
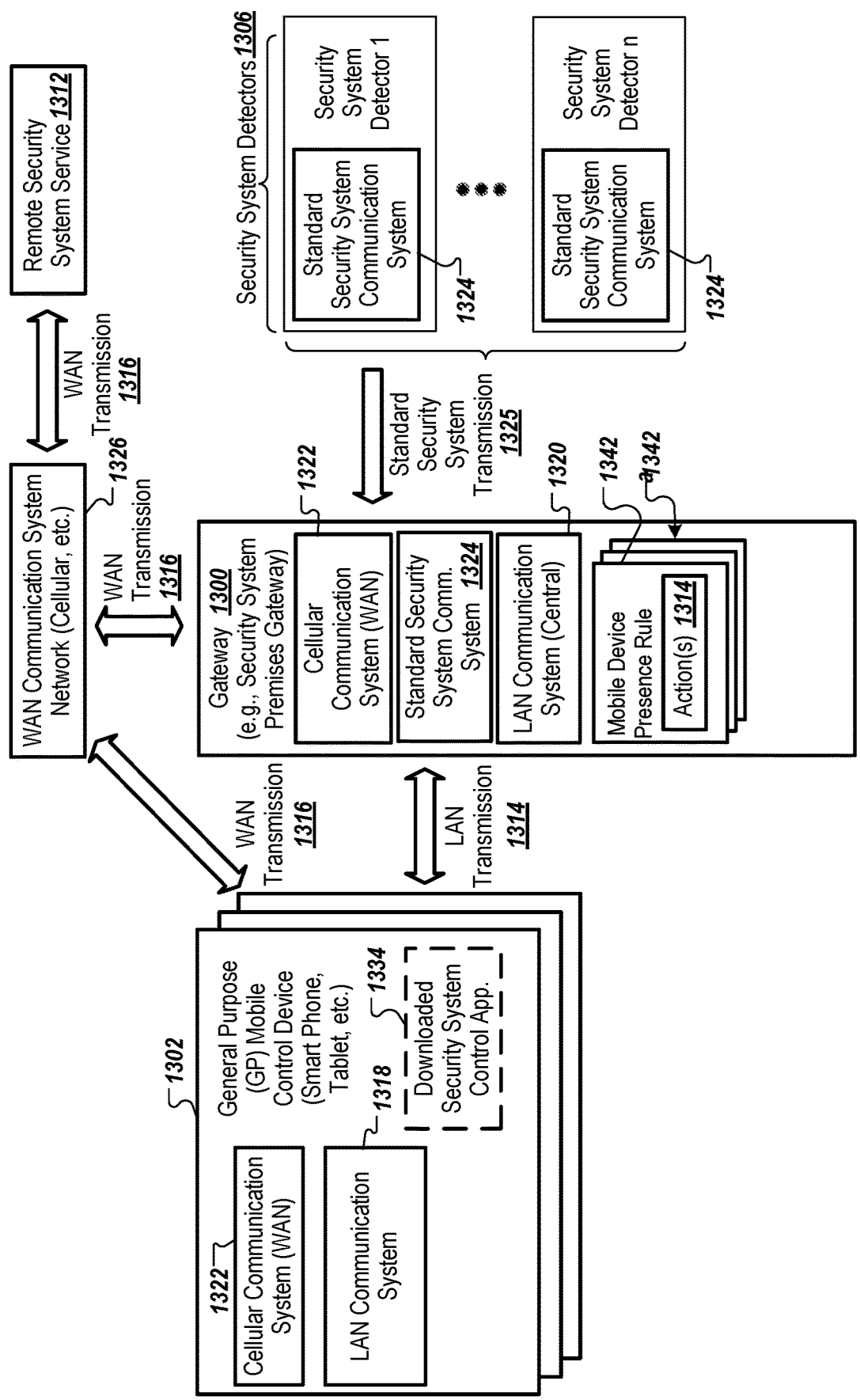
FIG. 13 is a block diagram of an example security system environment.

FIG. 13 is a block diagram showing interactions within an example security system. For example, the security system can include a security system premises gateway (e.g., a gateway 1300) and related components. The example gateway 1300 can control the security system and can provide an interface for a mobile computing device 1302 to access/control the security system. Mobile devices 1302 can include, for example, general purpose mobile control devices, including smart phones, tablet computing devices, laptop computers, wearable computing devices, and/or other computing devices that may be mobile. Other types of computing devices can be used as the mobile device 1302. The mobile devices 1302 an include authorized devices, which are enrolled with the security system and gateway 1300, as well as other devices that are not enrolled/authorized with the security system and gateway 1300, including known mobile devices (e.g., devices detected at premises over at least a threshold number of instances while authorized devices are present, devices manually designated as "known" by an authorized user) and unknown devices (e.g., devices not formally known to the security system—never detected before, not detected at premises at least a threshold number of times, not approved by an authorized user).

The gateway 1300 can communicate with other components, including security system detectors 1306 and a remote security system service 1312. Communications among the gateway 1300 and related components can include local area network (LAN) communications 1314 and wide area network (WAN) communications 1316. LAN communications 1314 can be used, for example, among components that are situated in the premises of the gateway 1300, including the mobile device 1302, IoT (Internet of Things) devices, or non-standard security devices, when present within a threshold distance of the gateway 1300 (e.g., in or near the home or other building(s) in which the gateway 1300 is located). Components that communicate over the LAN can include LAN communication systems 1318 (peripheral role) and 1320 (central role). Security system-related components can use a standard security system communication system 1324 (e.g., using standard security system transmissions 1325). WAN communication between the gateway 1300 and the mobile device 1302 can be handled using a WAN communication system network 1326 (e.g., that services cellular phone networks). Each of the gateway 1300 and the mobile device 1302 can include a cellular communication system (WAN) 1322. In some implementations, communication between the gateway 1300 and the mobile device 1302 can be handled with a downloaded security system control application 1334.

Mobile device presence rules 1342, including a mobile device presence rule 1342a, each describe a pattern of one or more mobile devices being present or not present at a location monitored by the gateway 1300. Each mobile device presence rule 1342 defines an action (e.g., an action 1344) to perform when the mobile device presence rule 1342 is satisfied by a detected presence or non-presence of one or more mobile devices. The gateway 1300 can monitor wireless signals from mobile device(s) that are at the location, determine that the monitored wireless signals from one or more mobile devices match a particular mobile device presence rule 1342, and automatically perform an action specified in the mobile device presence rule 1342 in response to determining that the monitored wireless signals from the one or more mobile devices match the mobile device presence rule 1342. Examples of mobile device presence rules 1342 are discussed in more detail below. As a specific example, the gateway 1300 can automatically disarm the security system in response to detecting a presence of a registered mobile device.

Figure 14:
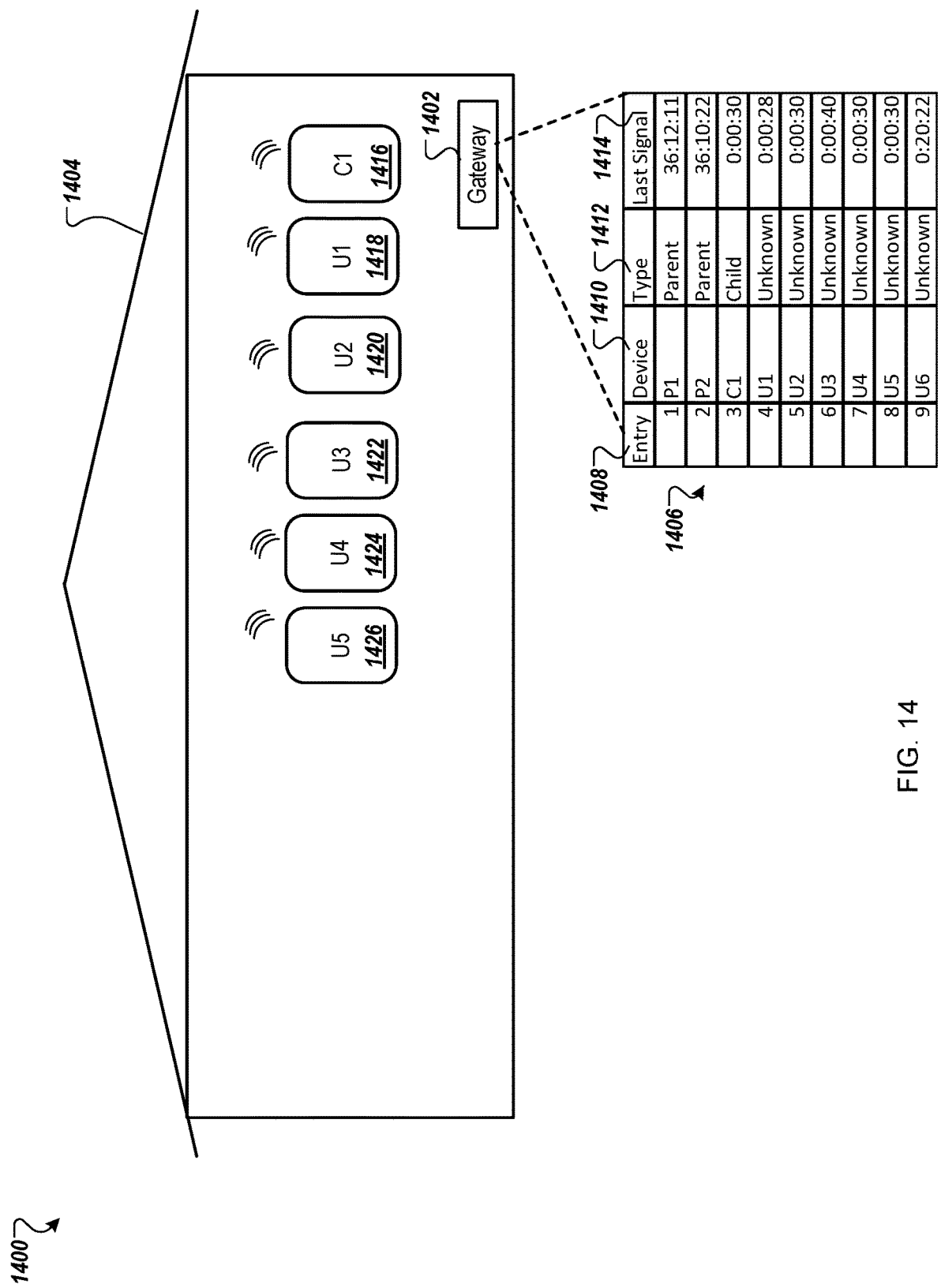
FIG. 14 is a conceptual diagram of an example environment in which an action is automatically performed in response to satisfaction of a mobile device presence rule.

FIG. 14 is a conceptual diagram of an example environment 1400 in which an action is automatically performed in response to satisfaction of a mobile device presence rule. A gateway 1402 monitors and records signals from mobile devices in a home 1404. A registry 1406 includes information for signals that have been previously recorded at the home 1404. The registry 1406 includes an entry column 1408, a device identifier column 1410 that includes identifiers of detected devices, a device type column 1412 that includes device types of detected devices, and a timestamp column 1414 that includes timestamps of last received signals from respective devices.

For instance, entries one and two in the registry 1406 indicate that parent devices with identifiers P1 and P2, respectively, were last detected approximately thirty six hours ago. Entry three in the registry 1406 indicates that a child device with identifier C1 was last detected thirty seconds ago. For instance, a child device 1416 is currently in the home 1404. Entries four, five, six, seven, and eight in the registry 1406 indicate that unknown devices with identifiers U1, U2, U3, U4, and U5, respectively, have been detected recently (e.g., within the last thirty or forty seconds). For instance, unknown devices 1418, 1420, 1422, 1424, and 1426 are currently in the home 1404. A ninth entry in the registry 1406 indicates that an unknown device with identifier U6 was last detected approximately twenty minutes ago (e.g., an unknown device may have been present but the user of that device may have left the home 1404).

The gateway 1402 can monitor wireless signals from mobile devices and compare the monitored signals to mobile device presence rules that have been defined in the gateway 1402. For instance, a rule may be that if more than a threshold number of unknown mobile devices are present while no parent mobile devices are present, that a warning message be automatically sent to one or more parent mobile devices. For instance, the rule may be configured to detect when an unauthorized party or gathering is taking place in the home 1404 (e.g., a child associated with the child device 1416 may be having a party at the home 1404 without the parents' permission).

If a parent device had been detected along with the unknown devices, the rule may not have been satisfied, and accordingly, no action may have been taken by the gateway 1402. Rules can have other conditions. For instance, rules can be time-based. For instance, detection of an unknown device between the hours of 11:00 PM and 6:00 AM can generate an alert, even if a parent device is present. The registry 1406, or a log that has similar information as the registry 1406, can be made available to authorized users (e.g., parents).

Figure 15:
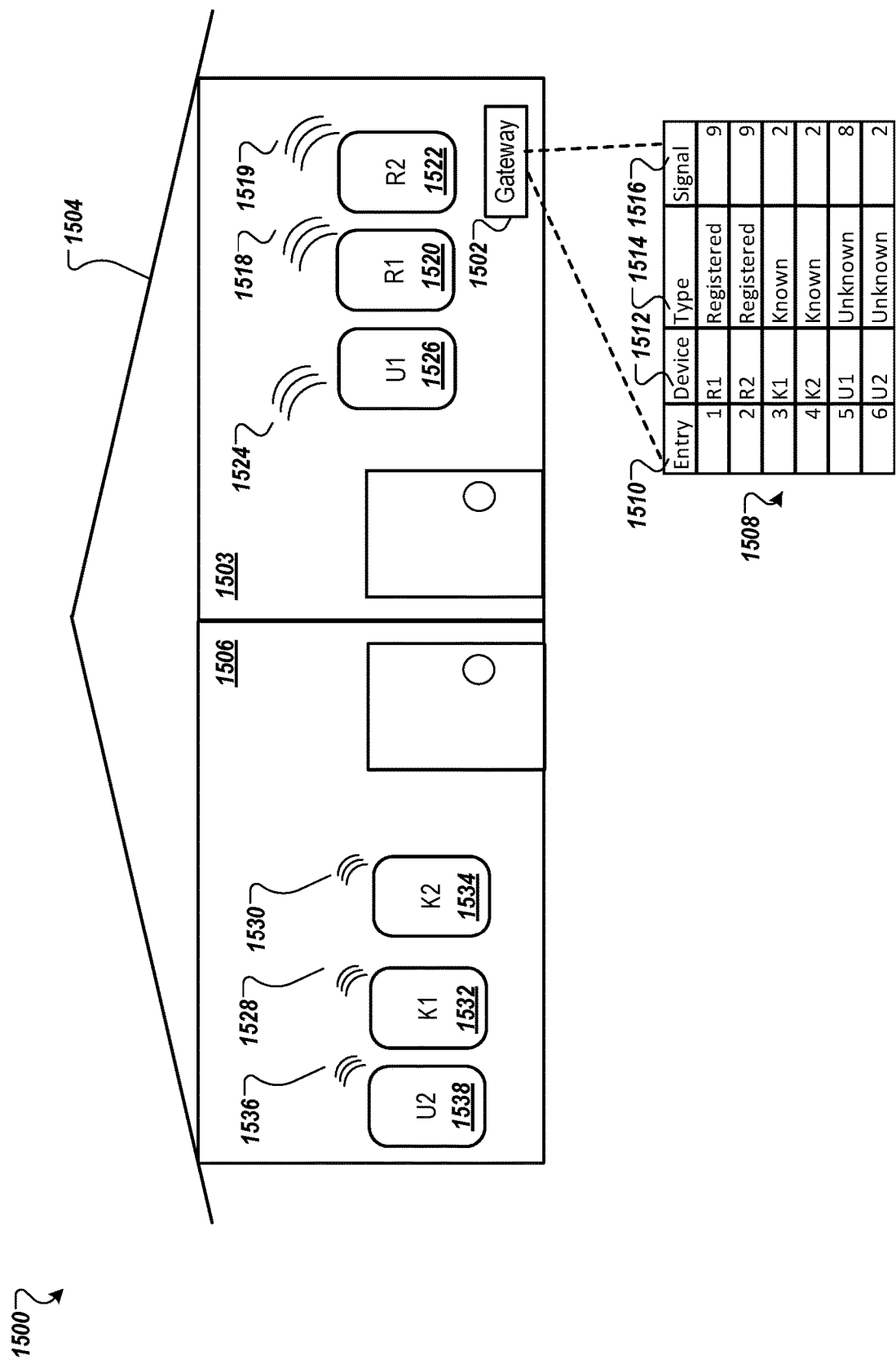
FIG. 15 is a conceptual diagram of an example environment in which mobile device presence rules are evaluated.

FIG. 15 is a conceptual diagram of an example environment 1500 in which mobile device presence rules are evaluated. A gateway 1502 monitors a first unit 1503 of a duplex 1504 that also includes a second unit 1506. For instance, the gateway 1502 can monitor wireless signals of mobile devices that are detectable by the gateway 1502. A registry 1508 stores information about detected wireless signals.

For instance, the registry 1508 includes an entry column 1510, a device identifier column 1512, a device type column 1514, and a signal strength column 1516 that includes signal strength values of detected signals. For instance, first and second entries in the registry 1508 indicate that signals 1518 and 1519 from registered devices 1520 and 1522, with identifiers R1 and R2, respectively, with signal strengths of nine (e.g., out of a maximum signal strength of ten) have been detected by the gateway 1502. A fifth entry in the registry 1508 indicates that a signal 1524 from an unknown device 1526 with identifier U1 has been detected.

An unknown mobile device presence rule can be configured to detect a presence of an unknown device in the first unit 1503. The unknown mobile device presence rule can specify that an alert is to be generated if an unknown device is detected. Presence of a device can be defined as a detected signal within a recent predetermined time window (e.g., one minute). The registry 1508 can also store a timestamp of a last-detected signal, for example.

The unknown mobile device presence rule can specify a further condition that the alert is to be generated only if no registered devices are present. Accordingly, no alert may be generated by the presence of the unknown device 1526, due to presence of the registered devices 1520 and 1522. The unknown device 1526 may be a welcomed guest that is visiting residents of the first unit, for example.

An unregistered mobile device presence rule can specify that only unregistered devices having at least a threshold signal strength are to trigger the alert. For instance, the gateway 1502 can detect signals from devices in the second unit 1506. For example, third and fourth entries in the registry 1508 indicate that signals 1528 and 1530 from known devices 1532 and 1534, respectively, have been detected, with signal strengths of two. The known devices 1532 and 1534 can be tagged as "known" since the gateway 1502 may frequently detect signals (albeit low-strength signals) from the known devices 1532 and 1534, when neighbors in the second unit 1506 are home. Known devices can be considered as recognized devices that have been frequently detected, even though they aren't registered.

The low signal strength of the signals 1528 and 1530 can fail to trigger the unregistered mobile device presence rule, even if the registered devices 1520 and 1522 aren't home. Similarly, a signal 1536 of strength two from an unknown device 1538 (corresponding to a sixth entry in the registry 1508) may not satisfy the unknown mobile device presence rule, due to lack of sufficient signal strength. The unknown device 1538 may be of a guest in the second unit 1506, a new device of a resident in the second unit 1506, etc. The unknown mobile device presence rule may specify that unregistered (or in some cases, unknown or unregistered) devices having a signal strength of more than five, when no registered devices are present, is to trigger an alert.

Rules can refer to unregistered devices, unknown devices, or other types of device types. In some cases, after a period of time of being continually detected, known devices that have not been registered can be treated as registered devices with respect to rule evaluation. In some examples, the gateway 1502 can prompt users in the first unit 1503 as to whether the known devices 1532 and 1534 are to be registered. In some cases, known but unregistered devices can be treated differently in rule evaluation from both registered and unknown devices. For instance, a detected presence of a known device of a sufficient signal strength may generate a warning (e.g., in a log) whereas a detected presence of an unknown device may generate an alert (e.g., on premises or a sending of an alert message to a registered user). As another example, a rule may specify that presence of a particular known device (e.g., the device 1532) is to not trigger an alert during a specified timeframe. For instance, a neighbor may be checking on the first unit 1503 while residents of the first unit 1503 are on vacation, for example.

In some instances, presence of the unknown device 1538 may have triggered an alert, even at a low detected signal strength, if none of the registered devices 1520 or 1522 or the known devices 1532 or 1534 are present. In some implementations, the gateway 1502 can learn patterns of signals from both the first unit 1503 and the second unit 1506 and share learned information or observations with a second gateway that monitors the second unit 1506, for example. The second gateway can also share information with the gateway 1502, and security monitoring from both gateways can use the shared information, for improved monitoring.

Figure 16:
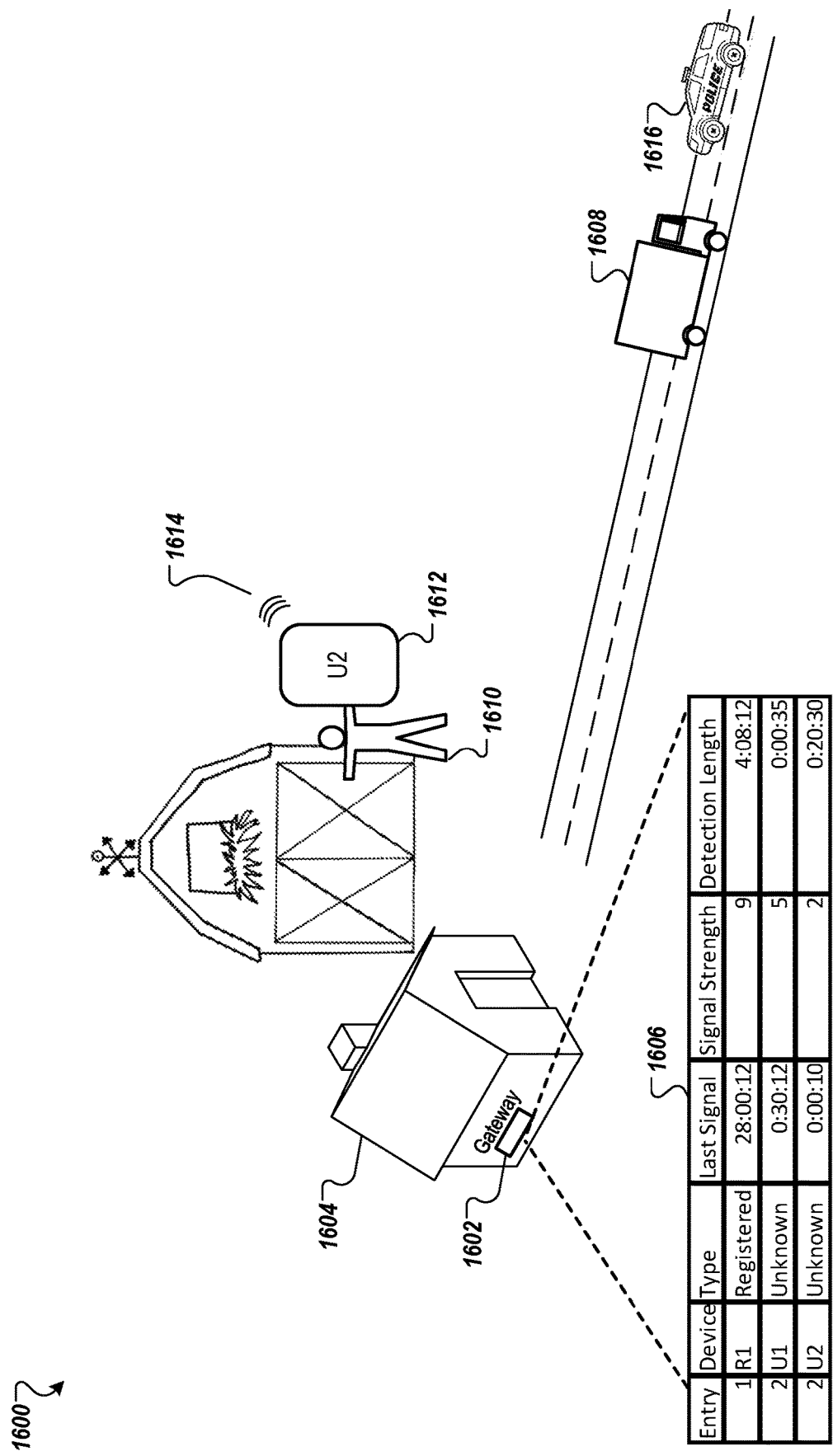
FIG. 16 is a conceptual diagram of an example environment in which an action is automatically performed in response to satisfaction of a mobile device presence rule.

FIG. 16 is a conceptual diagram of an example environment 1600 in which an action is automatically performed in response to satisfaction of a mobile device presence rule. In some examples, a mobile device presence rule can be to generate an alert if any unknown mobile device is detected for more than a threshold period of time when a registered user is not home. For instance, a security system user may have property in the country, and a presence of any unknown mobile device could indicate an intruder on the property.

For instance, a gateway 1602 can monitor a home 1604 and an area around the home 1604. Detected wireless signals are recorded in a registry 1606. For instance, a first entry in the registry 1606 indicates that a registered device with an identifier of R1 had a last detected signal with a signal strength of nine (e.g., out of a possible ten), twenty eight hours ago. The signal detection length was over four hours (e.g., the R1 device was detected at or near the home 1604 for a continuous period of over four hours before the gateway 1602 failed to detect a signal from the R1 device). The recorded signal strength may be a last-recorded signal strength or an average signal strength over the duration of a detection time period. The owner of the home 1604 may have left the home 1604 and before doing so may have enabled a mobile device presence rule that specifies that an alert is to be generated if an unknown mobile device signal is detected in or around the home 1604 for more than a predetermined amount of time (e.g., three minutes).

The predetermined amount of time can be configured so that, for example, a mobile device of a delivery person or mail carrier who may briefly come near the home 1604 doesn't trigger the alert. For instance, a second entry in the registry 1606 indicates that an unknown device U1 was detected approximately thirty minutes ago, with a detected signal duration of thirty five seconds. The signal corresponding to the second entry may have been from a mail carrier who was briefly in front of the home 1602 but is now driving away from the home in a mail truck 1608. The mobile device presence rule, with the threshold duration detection length of three minutes, can be configured so that the brief detection of the mail carrier's mobile device does not trigger an alert.

As another example, an intruder 1610 is on the property near the home 1604, with a mobile device 1612. A third entry in the registry 1606 indicates that signals from the mobile device 1612, including a current signal 1614, have been detected for a duration of over twenty minutes. Accordingly, the mobile device presence rule may have been satisfied (e.g., shortly after a period of three minutes of detection of the mobile device 1612). The gateway 1602 may have performed one or more configured actions, such as to send an alert message to local law enforcement (or to request that a remote security system service contact local law enforcement). For instance, a police vehicle 1616 may have been dispatched to the home 1604 based on a message received from the gateway 1602 or the remote security system service.

Multiple actions may have been performed by the gateway 1602, at a same point in time or at different points in time. For instance, at the three-minute mark of detection of the mobile device 1612, the gateway 1602 may have sent an alert to a mobile device of owner of the home 1604. Further alerts may have been sent at other detection duration points, such as at ten minutes. The gateway 1602 may have sent a prompt to the mobile device of the owner, asking the owner if further action should be taken. Local law enforcement may have been contacted based on a response of the owner to the prompt. As another example, at a certain time point of detection of the mobile device 1612, e.g., at fifteen minutes, the gateway 1602 (or a remote security system service) may have contacted local law enforcement, regardless of whether a reply to a prompt has been received from the owner.

The mobile device presence rule may have been satisfied even though a detected signal strength of the mobile device 1612 was relatively low (e.g., an average signal strength of two, as indicated in the third entry of the registry 1606, as compared to the average signal strength of nine for the home owner's mobile device). The owner may configure the mobile device presence rule to generate alerts even for low-strength signal detection, simply because the owner knows that nobody has been authorized to be on the property for any considerable length of time.

Figure 17:
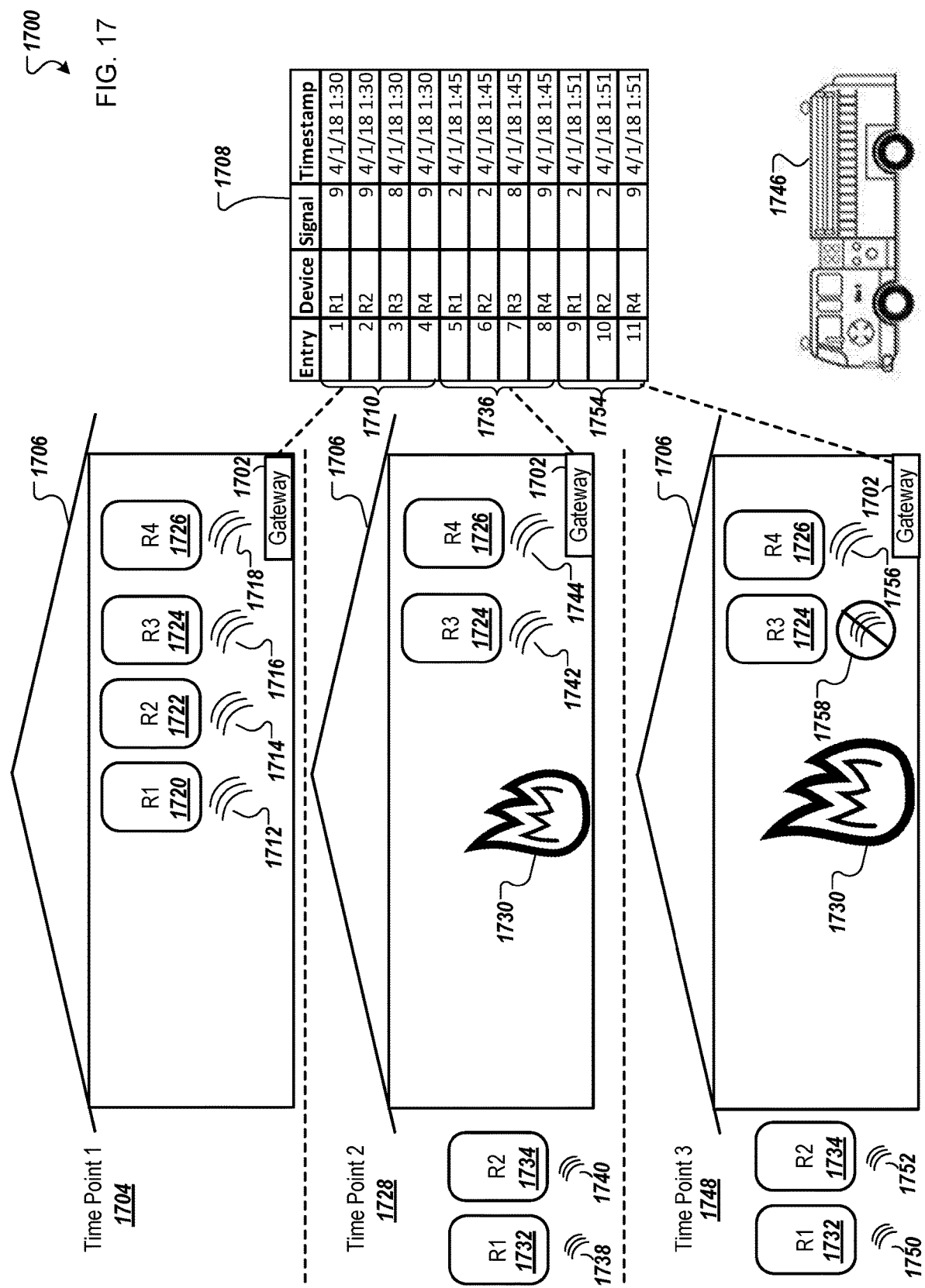
FIG. 17 is a conceptual diagram of an example environment in which a gateway provides information about presence of mobile devices.

FIG. 17 is a conceptual diagram of an example environment 1700 in which a gateway 1702 provides information about presence of mobile devices. As shown in a top portion 1704 of FIG. 17 (e.g., corresponding to a first time point), the gateway 1702 monitors a home 1706. Information about detected signals from mobile devices that have been detected by the gateway 1702 are stored in a registry 1708. For instance, entries one, two, three, and four, in a section 1710 of the registry 1708, correspond to the first time point. For example, the entries one, two, three, and four correspond to detected signals 1712, 1714, 1716, and 1718 from registered mobile devices R1 1720, R2 1722, R3 1724, and R4 1726, respectively. Each of the signals 1712, 1714, 1716, and 1718 are relatively strong signals (e.g., a signal strength of either eight or nine out of a possible ten), which indicate that the respective mobile devices are located in the home 1706.

As shown in a middle portion 1728 of FIG. 17, corresponding to a second time point, a fire 1730 has started in the home 1706. The R1 1720 and R2 1722 mobile devices are now outside the home 1706, as illustrated by a R1 mobile device 1732 and a R2 mobile device 1734. For instance, respective users may have carried their mobile devices while exiting the home 1706 due to the fire 1730. The R3 1724 and R4 1726 mobile devices are still in the home 1706, as shown in the middle portion 1728.

The gateway 1702 can determine whether a respective device is still in the home 1706, based on signal strength patterns detected by the respective device. For instance, a section 1736 of the registry 1708 corresponds to the second time point 1728. Fifth and sixth entries in the registry 1708 correspond to weakening signals 1738 and 1740 (as compared to earlier detected signal strengths) of the R1 mobile device 1732 and the R2 mobile device 1734, respectively. For instance, a relatively sudden change in signal strength from nine to two for the R1 mobile device 1732 and the R2 mobile device 1734 can indicate to the gateway 1702 that the R1 mobile device 1732 and the R2 mobile device 1734 (and associated users) have changed location to outside of the home 1706. Entries seven and eight in the registry 1708 show maintained signal strengths (e.g., of eight and nine, from signals 1742 and 1744) for the R3 mobile device 1724 and the R4 mobile device 1726, respectively, indicating that the R3 mobile device 1724 and the R4 mobile device 1726 (and possibly associated users) are still in the home 1706.

The gateway 1704 can be configured to share potential mobile device/associated user location information with first responders, after the fire 1730 has been detected in the home 1706. Security system component(s) may have detected the fire 1730 and the gateway 1702 may have been notified (or may have determined) presence of the fire 1730. In response to detection of the fire 1730, the gateway 1702 can determine, and communicate to first responders, that of four detected mobile devices, that two devices (e.g., the R1 mobile device 1732 and the R2 mobile device 1734) are likely no longer in the home 1706 and that two devices (e.g., the R3 mobile device 1724 and the R4 mobile device 1726) are likely still in the home 1706. Accordingly, first responders can plan rescue operations (e.g., while en-route to the home 1706 in a fire truck 1746), having useful information about a potential number of occupants who may still be in the home 1706. In some implementations, the gateway 1704 determines an approximate location (e.g., upstairs or downstairs, within a certain room) of the R3 mobile device 1724 and the R4 mobile device 1726, and shares that information with first responders.

The gateway 1702 can continue to monitor wireless signals and share information with first responders while a rescue operation is underway. For instance, as shown in a third portion 1748 of FIG. 17, the R1 mobile device 1732 and the R2 mobile device 1734 continue to have relatively weak signals 1750 and 1752 (e.g., of signal strength two, as indicated in entries nine and ten in a section 1754 of the registry 1706), indicating that the R1 mobile device 1732 and the R2 mobile device 1734 are still nearby but unlikely to be in the home 1706. An entry eleven in the registry 1708, that indicates a continued relatively strong signal 1756 for the R4 mobile device 1726, indicates that the R4 mobile device 1726 (and an associated user) may still be in the home 1706.

The registry 1708 does not have a latest entry for the R3 mobile device 1724, indicating that the R3 mobile device 1724 is no longer transmitting a detectable signal (e.g., as illustrated by a no-signal symbol 1758). Such information can be provided to first responders, since the stopping of a transmitted signal could mean that the R3 mobile device 1724 has overheated and that a user of the R3 mobile device 1724 is in more danger than a user of the R4 mobile device 1726. If the gateway 1702 has previously determined an in-home location estimate for the R3 mobile device 1724 (e.g., and stored such information in the seventh entry of the registry 1708), such information can be shared by the gateway 1702 with first responders, to enable the first responders to potentially prioritize finding the user of the R3 mobile device 1724.

Figure 18:
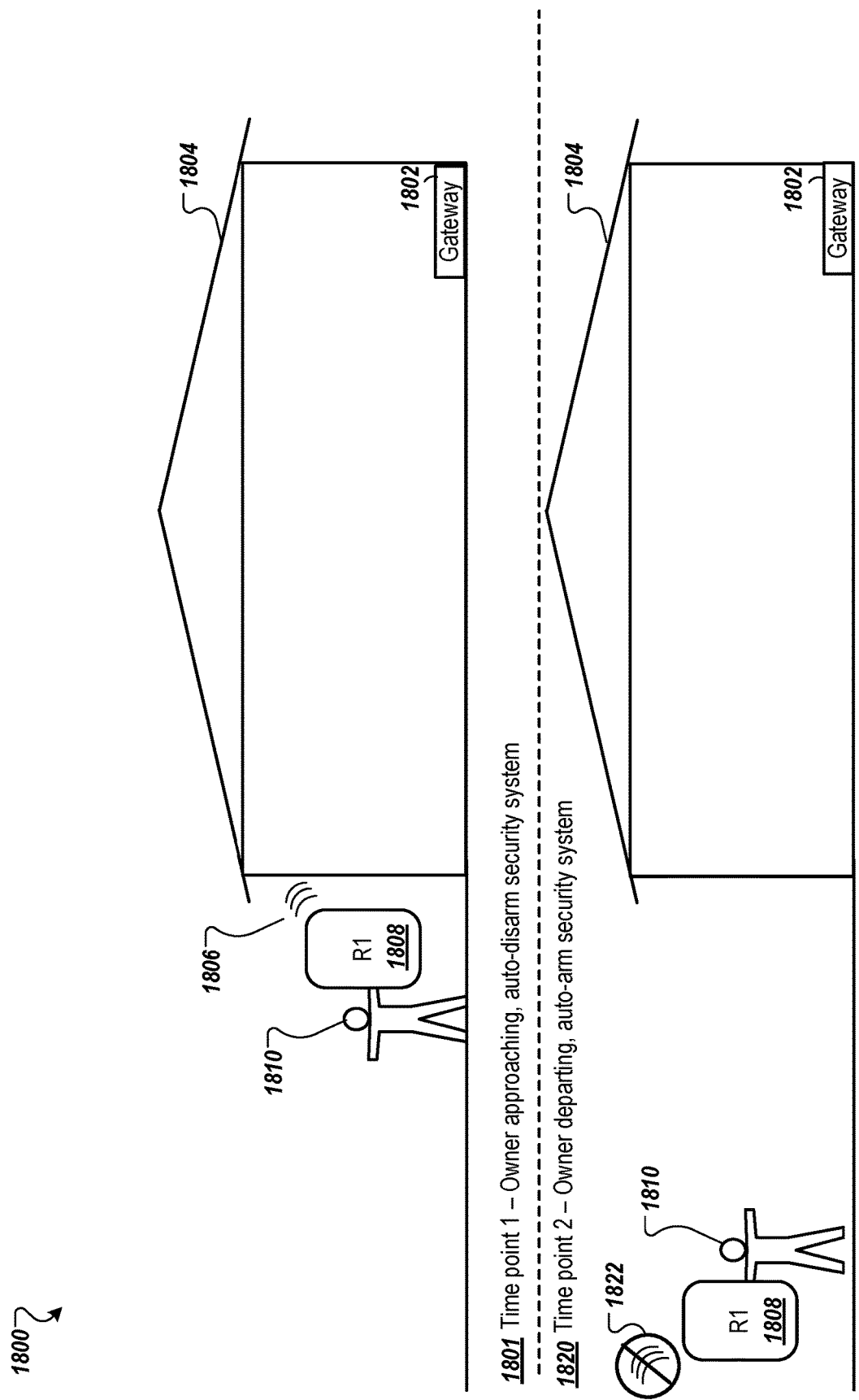
FIG. 18 is a conceptual diagram of an example environment in which an action is automatically performed in response to satisfaction of a mobile device presence rule.

FIG. 18 is a conceptual diagram of an example environment 1800 in which an action is automatically performed in response to satisfaction of a mobile device presence rule. As shown in an upper portion 1801 of FIG. 18, a security system gateway 1802 of a security system monitors a home 1804. The security system gateway 1802 detects a wireless signal 1806 of a mobile device 1808 of a user 1810 who is approaching the home 1804. The security system gateway 1802 evaluates the wireless signal 1806 to determine an identifier for the mobile device 1808. The security system gateway 1802 determines that the mobile device 1808 is a registered mobile device (e.g., known to the security system, with a "R1" identifier indicating that the mobile device 1808 is a registered device).

In response to determining that the mobile device 1808 is a registered mobile device that has just approached the home 1804, the security system gateway 1802 can automatically perform one or more actions. For example, the security system gateway 1802 can automatically disarm the security system (e.g., due to assuming that a known user is arriving at the home 1804). As another example, the security system gateway 1802 can initiate one or more home automation processes (e.g., turning on lights, adjusting a thermostat). The one or more actions can be associated with a mobile device presence rule that has been defined in the security system that describes a pattern of a registered mobile device being present at the home 1804, with the rule specifying that certain action(s) are to be performed upon detecting the presence of the registered mobile device at the home 1804. The security system gateway 1802 can send a notice regarding the automatic disarming of the security system (e.g., to the mobile device 1808, to a security system display in the home 1804, etc.).

The rule can include other conditions, such as detection of a presence of a registered mobile device when no other registered mobile devices are at the home 1804 (e.g., if another registered user is already home, the security system gateway 1802 can assume that the security system is already disarmed). As another example, the rule can include a condition of the security system being armed, with the action being to disarm an armed security system if a registered user approaches.

As another example and as shown in a bottom portion 1820 of FIG. 18, after the security system gateway 1802 has detected a wireless signal from the mobile device 1808, the security system gateway 1802 can detect that the mobile device 1808 is leaving (or has left) the home 1804. For example, after a period of time of detecting a constant signal of at least a threshold signal strength from the mobile device 1808 (e.g., when the mobile device 1808 is at the home 1804), the security system gateway 1802 can detect a weakening of a signal emitted from the mobile device 1808 (e.g., as the user 1810 leaves the home 1804) followed by an absence of a detected signal from the mobile device 1808 (e.g., as indicated by a no-signal symbol 1822) as the mobile device 1808 reaches an out of signal range with the security system gateway 1802.

In response to detecting that the mobile device 1808 is no longer located at the home 1804, the security system gateway 1802 can automatically perform one or more actions. For instance, the security system gateway 1802 can automatically arm the security system. The one or more actions can be associated with a mobile device presence rule that has been defined in the security system that describes a pattern of a registered mobile device leaving the home 1804, with the rule specifying that certain action(s) are to be performed upon detecting a registered mobile device leaving the home 1804. The security system gateway 1802 can send a notice regarding the automatic arming of the security system (e.g., to the mobile device 1808 and/or to a security system display in the home 1804, etc.).

In some examples, the rule can specify that the security system is to be automatically armed when a registered mobile device leaves the home 1804 and no other registered mobile devices are present at the home. In some examples, the action is to send a message to the user 1810 for display on the mobile device 1808 asking the user 1810 if the security system should be armed due to the user 1810 leaving the home. The security system gateway 1802 can arm the security system responsive to a confirmation received from the mobile device 1808.

Figure 19:
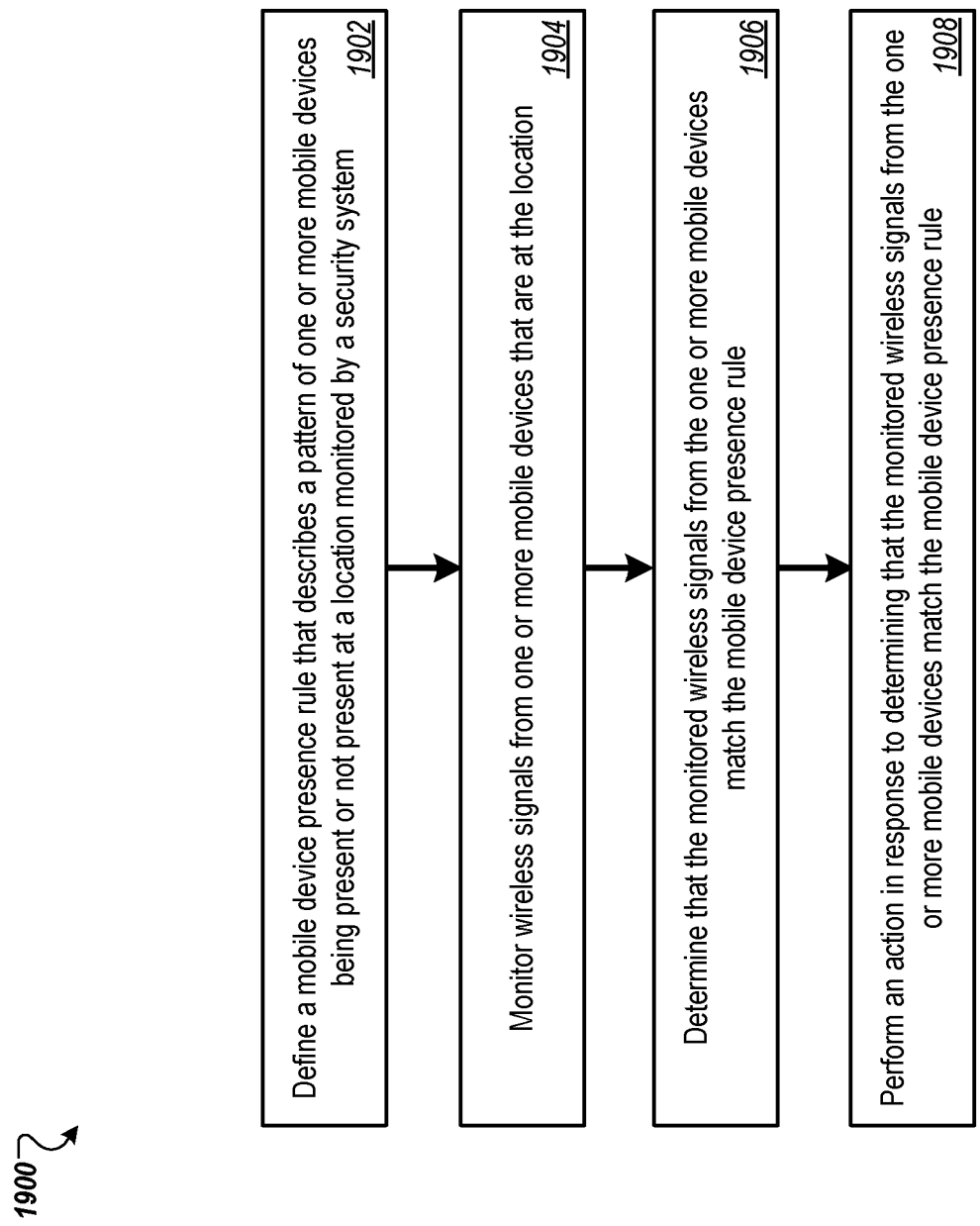
FIG. 19 depicts a flowchart of an example technique for performing an action in response to satisfaction of a mobile device presence rule.

FIG. 19 depicts a flowchart of an example technique 1900 for performing an action in response to satisfaction of a mobile device presence rule. The technique 1900 can be performed by the gateway 1300 of FIG. 13.

The gateway defines a mobile device presence rule that describes a pattern of one or more mobile devices being present or not present at a location monitored by the security system (1902). The mobile device presence rule defines an action to perform when the mobile device presence rule is satisfied by the presence or non-presence of respective mobile device(s). The rule can specify a presence or non-presence of a registered mobile device, for example. As another example, the rule can specify a presence of one or more non-registered mobile devices. The action can be to automatically arm or disarm the security system, generate one or more alerts or alarms, or some other type of action.

The gateway monitors wireless signals from one or more mobile devices that are at the location (1904). For example, the security system can detect wireless signals from a first mobile device that is registered with the security system. As another example, the security system can detect wireless signals from one or more other mobile devices (e.g., including at least a second mobile device) that are not registered with the security system.

The gateway determines that the monitored wireless signals from the one or more mobile devices match the mobile device presence rule (1906). For example, the mobile device presence rule can be that a registered mobile device is at the location, and the detected wireless signals from the first mobile device can satisfy the mobile device presence rule. As another example, the security system can fail to detect wireless signals from any registered mobile devices but may detect wireless signals from one or more other unregistered mobile devices (e.g., including the second mobile device). The rule can be that a registered device is not at the location but nonregistered devices are detected at the location. Failure to detect the first mobile device and detection of the second mobile device (and possibly other unregistered mobile devices) can result in a matching of detected wireless signals with the rule.

The gateway performs the action in response to determining that the monitored wireless signals from the one or more mobile devices match the mobile device presence rule (1908). For example, when the monitored wireless signals indicate that the first mobile device is present at the location, the action can be to automatically disarm the security system (e.g., due to a known user being at the location (e.g., an owner coming home)). When the monitored wireless signals indicate that the first mobile device is no longer present at the location, the action can be to automatically arm the security system (e.g., due to a known user leaving the location). When the monitored wireless signals indicate that the first mobile device is no longer present at the location but other, non-registered mobile devices are at the location, the action can be to automatically generate an alert or alarm.

This document also describes systems and techniques for treating outdoor perimeter sensors in a different way than other sensors, such as home/building perimeter sensors, that are part of a security system. In general, different sensors trigger different behaviors in a security system, such as generating warnings instead of alarms, based on the sensors' physical location (e.g., indoors, outdoors). Outdoor perimeter sensors can include, for example, motion sensors, gate sensors, outdoor building/structure sensors, asset tags, and others.

Figure 20:
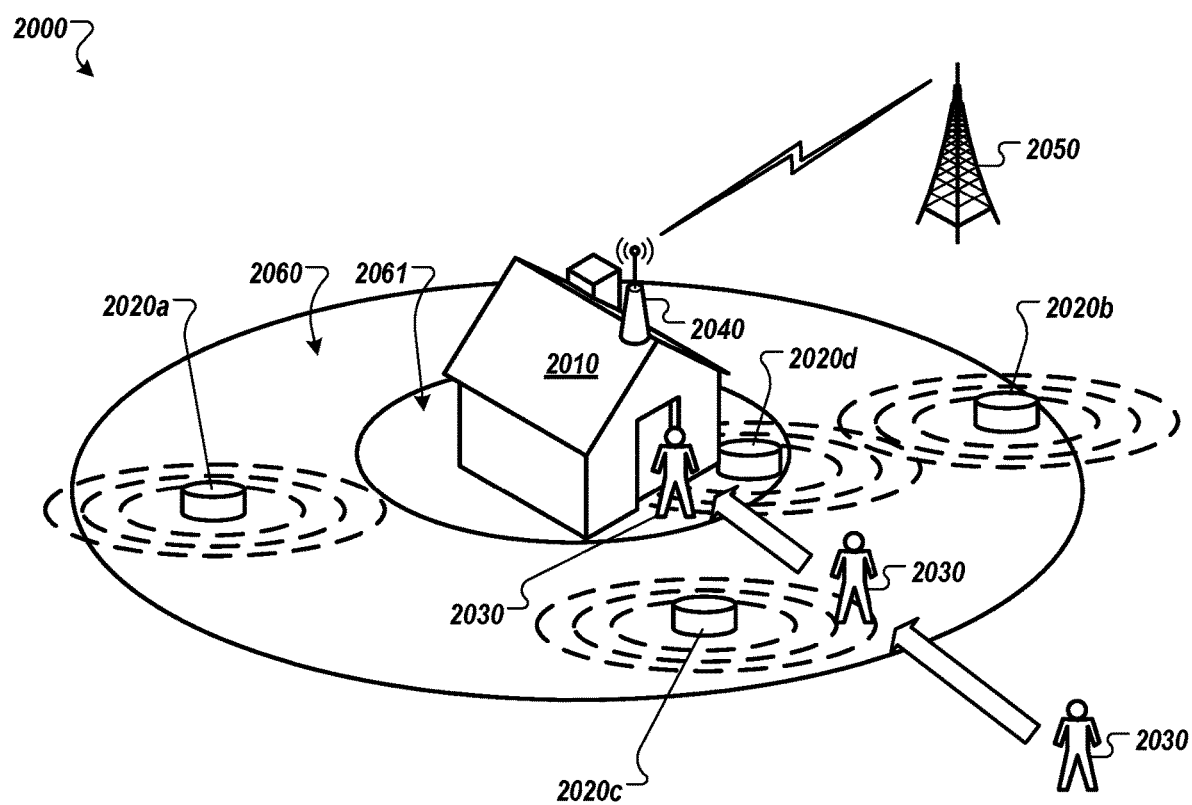
FIG. 20 is a schematic diagram that shows an example sensor system.

FIG. 20 is a schematic diagram that shows an example sensor system 2000. The system 2000 includes a structure 2010 (e.g., a house, business, school, facility). A collection of sensors 2020a-2020d are located at various locations in and around the structure 2010. As a person 2030 moves through the area around the structure 2010, various ones of the sensors 2020a-2020d detect the person's presence and signal the detected presence back to a transceiver 2040 (e.g., an alarm system, a building automation processing system). The transceiver 2040 is configured to communicate with a remote station 2050 to provide updates about the status of the system 2000.

In some embodiments, the remote station 2050 can be an alarm monitoring system or service. For example, the owner of the structure 2010 may subscribe to a service that monitors alarm systems, and responds to alarm notifications by confirming the alarm and/or summoning law enforcement to respond to the alarm. In some embodiments, the remote station 2050 can be an automation control or monitoring system. For example, an occupant of the structure 2010 may have a home automation controller that is configured to perform predetermined tasks (e.g., turn on lights, trigger a smart speaker to make an announcement) in response to notification from the transceiver 2040.

The sensors 2020a-2020d are located at various distanced from the structure 2010. In the illustrated example, the sensors 2020a-2020c are located in a zone 2060 (e.g., "far" from the structure 2010), and the sensor 2020d is located in a zone 2061 (e.g., "close" to the structure 2010). In some implementations, different levels of security can be configured based on the zones 2060 and 2061. In the illustrated example, as the person 2030 moves around outside of the zones 2060, 2061, the person 2030 is beyond the detection ranges of the sensors 2020a-2020d. At the person 2030 moves toward the structure 2010, various ones or combinations of the sensors 2020a-2020d are triggered.

Based on the triggerings of the various ones or combinations of the sensors 2020a-2020d and predetermined knowledge of the locations of the sensors 120a-2020d, the identity of the zone in which the person 2030 is at can be determined. For example, as the person 2030 enters the zone 2060, the sensor 2020c can be triggered alone, which can indicate that the person 2030 is in the zone 2060. As the person 2030 moves closer to the structure 2010, the user 2030 may leave the range of the sensor 2020c and trigger the sensor 2020d, which can indicate that the person 2030 is in the zone 2061.

The transceiver 2040 is configured to determine which, if any, of the zones 2060, 2061 that the person 2030 is in and provide different responses based on which, if any, of the zones 2060, 2061 that the person 2030 is in. For example, no indication may be given when the person 2030 is outside of the zone 2060. When the person 2030 is detected in the zone 2060, a first type of response, such as a warning, may be activated (e.g., a notification may be sent to the remote station 2050, a security light may be turned on, a warning chirp may be emitted from a speaker). When the person 2030 is detected in the zone 2061, a different type of response, such as an alarm, may be activated (e.g., an alarm alert may be sent to the remote station 2050, an alarm strobe may be turned on, a siren may be activated).

Figure 21:
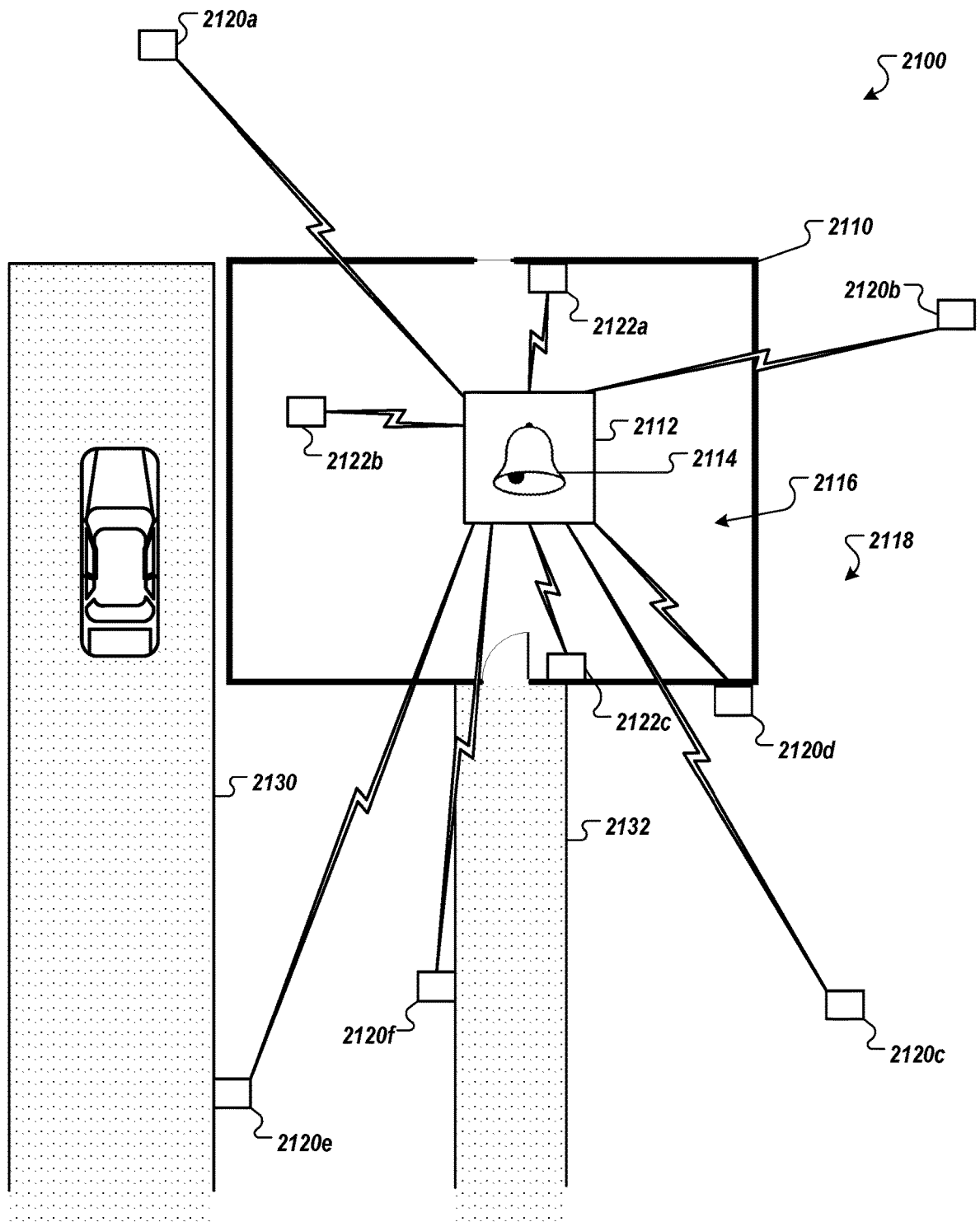
FIG. 21 is a floor plan that shows an example sensor system.

FIG. 21 is a floor plan that shows another example sensor system 2100. The system 2100 is configured to monitor conditions near and within a structure 2110. A monitoring system 2112 is configured to monitor various sensor and other inputs, provide various outputs depending on the conditions of the inputs.

In the illustrated example, the monitoring system 2112 is configured to monitor the status of a collection of sensors in an indoor zone 2116 within the structure 2110 and a collection of sensors in an outdoor zone 2118 outside of the structure 2110. The outdoor zone 2118 includes a sensor 2120a configured as a perimeter sensor (e.g., motion sensor, video sensor, break-beam sensor), a sensor 2120b configured as perimeter sensor, a sensor 2120c configured as a perimeter sensor, a sensor 2120d configured as a proximity sensor (e.g., motion detector, video sensor, sound sensor), a sensor 2120e configured to detect vehicles entering a driveway 2130 (e.g., an inductive sensor, a break-beam sensor), and a sensor 2120f configured to detect people or objects entering a pathway 2132. The indoor zone 2116 includes a sensor 2122a configured as a window sensor (e.g., open/close detector, glass break detector), a sensor 2122b configured as a presence sensor (e.g., motion detector, video sensor, sound sensor), and a sensor 2122c configured as a door sensor (e.g., open/close detector, impact sensor).

The monitoring system 2112 is preconfigured to respond to events that happen in the outdoor zone 2118 differently than events that happen in the indoor zone 2116. For example, when one or more of the sensors 2120a-2120e is triggered, the monitoring system 2112 is configured to provide a first level of response. For example, the monitoring system 2112 may cause an alarm output 2114 to emit a chime or a voice announcement to warn that movement has been detected in the outdoor zone 2118. In another example, the outdoor zone 2118 may be further divided between the driveway 2130, the pathway 2140, and the rest of the outdoor zone 2118.

For example, the monitoring system 2112 may be configured to respond to a trigger of the sensor 2120e by causing the alarm output 2114 to emit a first audibly distinct tone or spoken announcement (e.g., "car approaching"), while triggering the sensor 2120f may cause a different output (e.g., a different tone, "you have a visitor"), while triggering of any of the sensors 2120a-2120d may cause another different output (e.g., a more menacing tone, "unexpected motion has been detected in the back yard").

The monitoring system 2112 is be configured to respond to a trigger of one or more of the sensors 2122a-2122c with a type of level of response that is different from the type(s) or level(s) provided in response to outdoor events. For example, the monitoring system 2112 may be configured respond to a triggering of the sensors 2122a-2122c with a different tone (e.g., a siren configured to draw attention and/or scare away intruders), a different audible announcement (e.g., "Warning, unexpected entry detected," "North window has been broken"), and/or other appropriate response (e.g., turn on lights, flash lights, initiate an automated call to law enforcement or a monitoring service).

Figure 22:
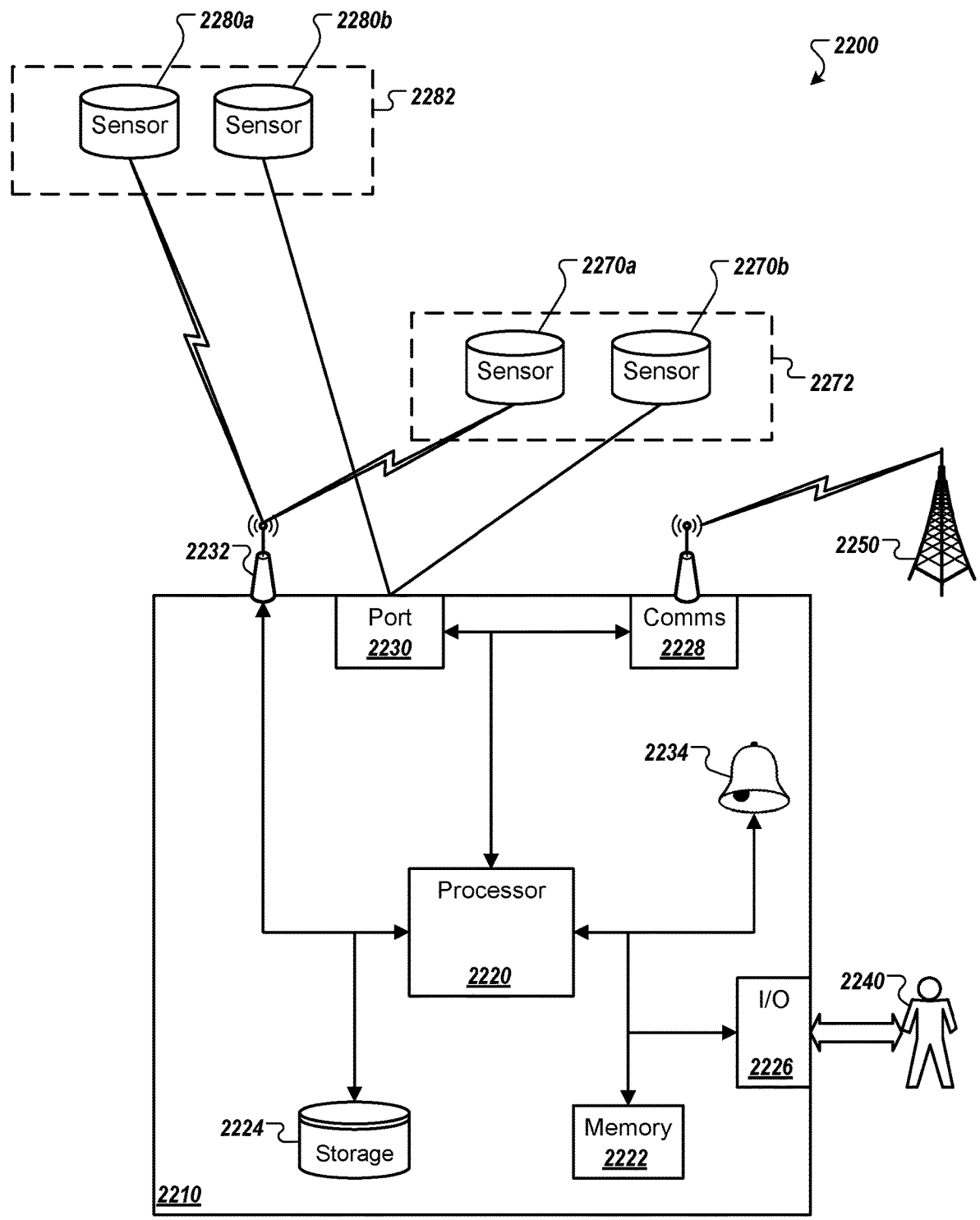
FIG. 22 is block diagram that shows an example sensor system.

FIG. 22 is block diagram that shows an example sensor system 2200. In some examples, the system 2200 can be part of the example system 2000 of FIG. 20 or the example system 2100 of FIG. 21.

The system 2200 includes a controller 2210 (e.g., a monitoring system) configured to receive signals from various sensors and provide outputs based on the signals. The system 2200 includes a processor 2220 configured to perform operations based on configurations and computer instructions stored in a memory 2222 or a data storage system 2224. The operations configure the processor 2210 to receive inputs (e.g., keystrokes, button presses, mouse movements, voice inputs) from a user 2240 through an input/output (IO) device 2226, and provide outputs (e.g., video display, indicator lights, sound or voice output) to the user 2240 through the IO device 2226. The system 2200 also includes an alarm 2234, such as an audible siren or speaker and/or a visual alert such as a strobe of rotating light that can be activated by the processor 2220 to notify people of various alarm triggering states (e.g., chimes or sirens, pulsing or strobing lights).

The processor 2220 is also configured to communicate with a remote system 2250 through a communications module 2228. In some embodiments, the communications module 2228 can be a wireless transceiver (e.g., cellular modem, WIMAX) or a wired transceiver (e.g., cable modem, digital subscriber line modem, private network connection). In some embodiments, the remote system 2250 can be a monitoring service, an emergency services center (e.g., 911 call center), a private service (e.g., a cloud-based service configured to relay information to/from a user's smart phone or computer), or a telecommunications service (e.g., cellular telephone provider, short messaging system).

The processor 2220 is also configured to communicate with two or more collections of sensors. A wireless sensor 2270*a* and a wired sensor 2270*b* are located within a zone 2272. A wireless sensor 2280*a* and a wired sensor 2280*b* are located within a zone 2282. The processor 2210 is in communication with a wired port 2230 that is configured to communicate with the wired sensors 2270*a*, 2280*a*. The processor 2220 is in communication with a wireless port 2232 that is configured to communicate with the wireless sensors 2270*b*, 2280*b*.

The computer instructions and configuration settings stored in the memory 2222 and the data storage system 2224 configure the processor 2220 to respond differently to events detected through the sensors 2270*a* and 2270*b* than it does to events detected through the sensors 2280*a* and 2280*b*. For example, the zone 2272 may be an indoor zone (e.g., inside of a home or business), so the sensors 2270*a* and 2270*b* are indoors, while the zone 2282 may be an indoor zone (e.g., the yard around a home or the lot surrounding the business), so the sensors 2280*a* and 2280*b* are outdoors. The system 2200 is configured to respond differently depending upon which of the zones 2272, 2282 an event was detected in. For example, movement detected after hours just outside of a business in the zone 2282 may be suspicious (e.g., a potential thief looking for a way in, or perhaps just mischievous kids running through the property but causing no actual harm), while movement detected after hours inside a business (e.g., when nobody is expected to be there) may be an indication of something more serious (e.g., a break-in, a customer accidentally locked inside at closing time).

In some implementations, the system 2200 can determine the zone of the sensors 2270*a*, 2270*b*, 2280*a*, and 2280*b*, based on a variety of methods. For example, the user 2240 can explicitly assign a predetermined sensor to a predetermined zone (e.g., set up a configuration file) based on the user's knowledge about where the sensors will be placed. In such an example, a sensor identifier in the incoming signal can be compared to a predetermined mapping stored by controller 2210 (e.g., without modifying the signal). In another example, the controller 2210 can be configured to annotate incoming signals based on their source (e.g., outdoor type motion sensors may be treated as being in an outdoor zone, while indoor type sensors may be treated as being in an indoor zone). In another example, the sensor signals themselves may include indications as to their assignment or location inside or outside of a premises.

Figure 23:
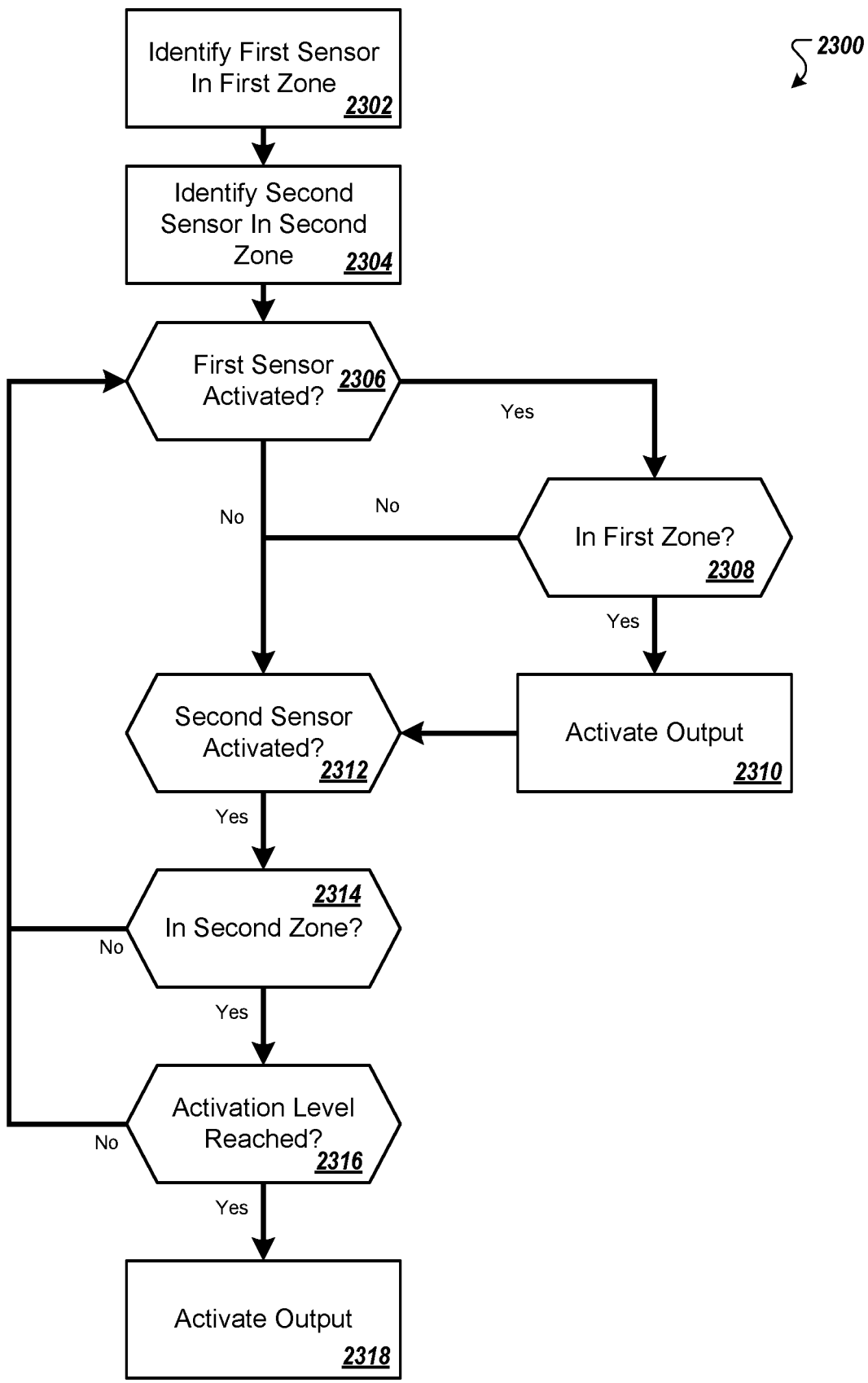
FIG. 23 is a flow diagram of an example process for perimeter sensing.

FIG. 23 is a flow diagram of an example process 2300 for perimeter sensing. In some implementations, the process 2300 can be used with any of the example systems 2000, 2100, or 2200 of FIGS. 20-22.

At 2302, a first sensor is identified as being located in a predetermined first physical zone.

At 2304, a second sensor is identified as being located in a predetermined second physical zone that is different from the first zone.

At 2306, a determination is made as to whether the first sensor is activated.

At 2308, if the first sensor is activated, a determination is made as to whether the first sensor is identified as being located in the predetermined first physical zone. A first input can be received based on activation of the first sensor.

At 2310, an output is activated based on the receipt of the first input and the identification of the first sensor as being located in the predetermined first physical zone.

At 2312, either after the output is activated or based on the first sensor not being active, a determination is made as to whether the second sensor is activated.

At 2314, if the second sensor is activated, a determination is made as to whether the second sensor is identified as being in the predetermined second physical zone. A second input can be received based on of activation of the second sensor.

At 2316, a determination is made as to whether an activation level has been reached. The activation level can be determined based on the second input.

At 2318, the output is activated based on the activation level and the identification of the second sensor as being located in the predetermined second physical zone.

Figure 24:
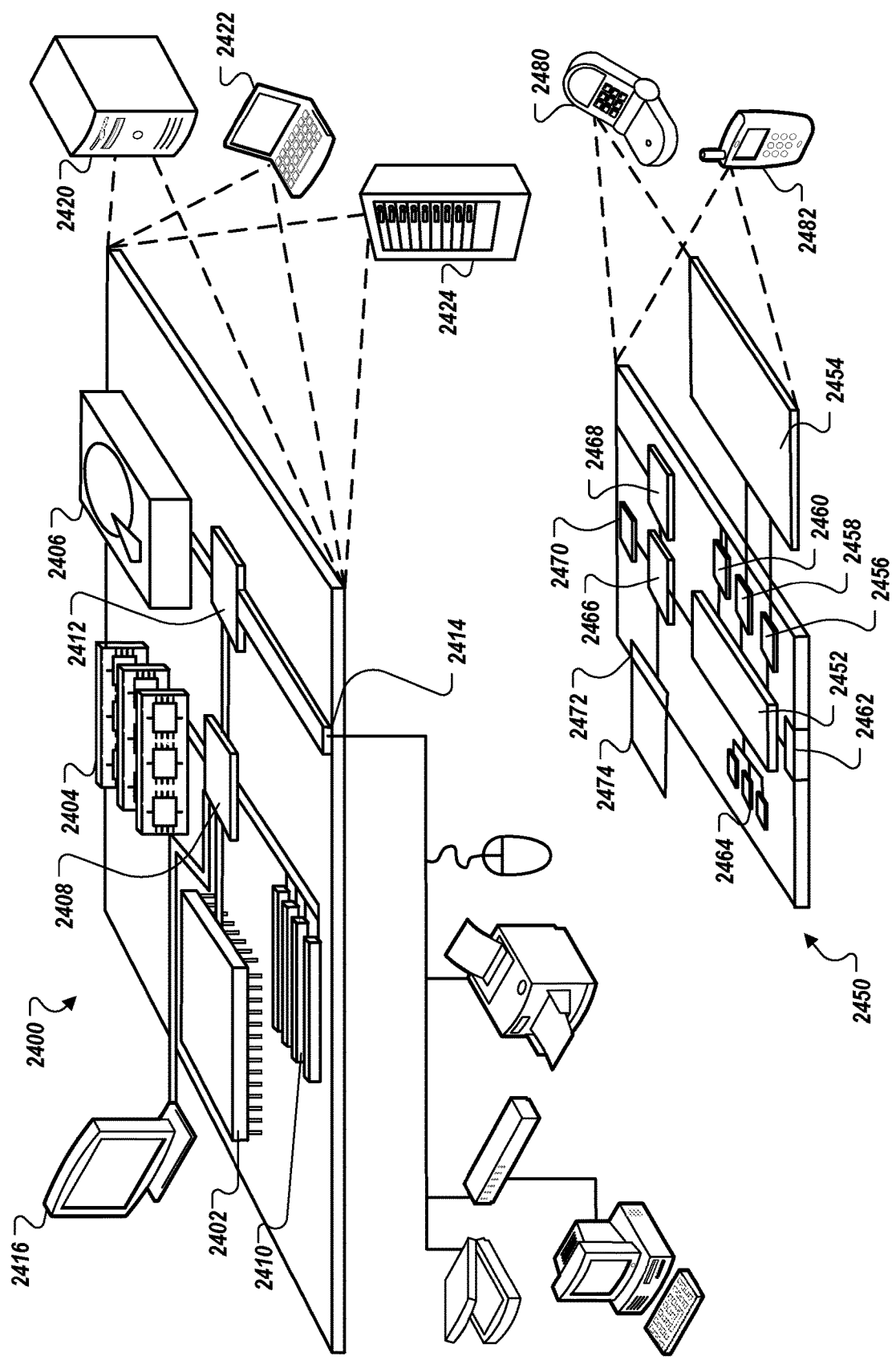
FIG. 24 is a block diagram of example computing devices.

FIG. 24 is a block diagram of computing devices 2400, 2450 that may be used to implement the systems and methods described in this document, either as a client or as a server or plurality of servers. Computing device 2400 is intended to represent various forms of digital computers, such as laptops, desktops, workstations, personal digital assistants, servers, blade servers, mainframes, and other appropriate computers. Computing device 2400 can also represent all or parts of various forms of computerized devices, such as embedded digital controllers, media bridges, modems, network routers, network access points, network repeaters, and network interface devices including mesh network communication interfaces. Computing device 2450 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 2400 includes a processor 2402, memory 2404, a storage device 2406, a high-speed interface 2408 connecting to memory 2404 and high-speed expansion ports 2410, and a low speed interface 2412 connecting to low speed bus 2414 and storage device 2406. Each of the components 2402, 2404, 2406, 2408, 2410, and 2412, are interconnected using various busses, and may be mounted on a common motherboard or in other manners as appropriate. The processor 2402 can process instructions for execution within the computing device 2400, including instructions stored in the memory 2404 or on the storage device 2406 to display graphical information for a GUI on an external input/output device, such as display 2416 coupled to high speed interface 2408. In other implementations, multiple processors and/or multiple buses may be used, as appropriate, along with multiple memories and types of memory. Also, multiple computing devices 2400 may be connected, with each device providing portions of the necessary operations (e.g., as a server bank, a group of blade servers, or a multi-processor system).

The memory 2404 stores information within the computing device 2400. In one implementation, the memory 2404 is a computer-readable medium. In one implementation, the memory 2404 is a volatile memory unit or units. In another implementation, the memory 2404 is a non-volatile memory unit or units.

The storage device 2406 is capable of providing mass storage for the computing device 2400. In one implementation, the storage device 2406 is a computer-readable medium. In various different implementations, the storage device 2406 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 2404, the storage device 2406, or memory on processor 2402.

The high speed controller 2408 manages bandwidth-intensive operations for the computing device 2400, while the low speed controller 2412 manages lower bandwidth-intensive operations. Such allocation of duties is exemplary only. In one implementation, the high-speed controller 2408 is coupled to memory 2404, display 2416 (e.g., through a graphics processor or accelerator), and to high-speed expansion ports 2410, which may accept various expansion cards (not shown). In the implementation, low-speed controller 2412 is coupled to storage device 2406 and low-speed expansion port 2414. The low-speed expansion port, which may include various communication ports (e.g., Universal Serial Bus (USB), BLUETOOTH, BLUETOOTH Low Energy (BLE), Ethernet, wireless Ethernet (WiFi), High-Definition Multimedia Interface (HDMI), ZIGBEE, visible or infrared transceivers, Infrared Data Association (IrDA), fiber optic, laser, sonic, ultrasonic) may be coupled to one or more input/output devices, such as a keyboard, a pointing device, a scanner, or a networking device such as a gateway, modem, switch, or router, e.g., through a network adapter 2413.

Peripheral devices can communicate with the high speed controller 2408 through one or more peripheral interfaces of the low speed controller 2412, including but not limited to a USB stack, an Ethernet stack, a WiFi radio, a BLUETOOTH Low Energy (BLE) radio, a ZIGBEE radio, an HDMI stack, and a BLUETOOTH radio, as is appropriate for the configuration of the particular sensor. For example, a sensor that outputs a reading over a USB cable can communicate through a USB stack.

The network adapter 2413 can communicate with a network 2415. Computer networks typically have one or more gateways, modems, routers, media interfaces, media bridges, repeaters, switches, hubs, Domain Name Servers (DNS), and Dynamic Host Configuration Protocol (DHCP) servers that allow communication between devices on the network and devices on other networks (e.g. the Internet). One such gateway can be a network gateway that routes network communication traffic among devices within the network and devices outside of the network. One common type of network communication traffic that is routed through a network gateway is a Domain Name Server (DNS) request, which is a request to the DNS to resolve a uniform resource locator (URL) or uniform resource indicated (URI) to an associated Internet Protocol (IP) address.

The network 2415 can include one or more networks. The network(s) may provide for communications under various modes or protocols, such as Global System for Mobile communication (GSM) voice calls, Short Message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, General Packet Radio System (GPRS), or one or more television or cable networks, among others. For example, the communication may occur through a radio-frequency transceiver. In addition, short-range communication may occur, such as using a BLUETOOTH, BLE, ZIGBEE, WiFi, IrDA, or other such transceiver.

In some embodiments, the network 2415 can have a hub-and-spoke network configuration. A hub-and-spoke network configuration can allow for an extensible network that can accommodate components being added, removed, failing, and replaced. This can allow, for example, more, fewer, or different devices on the network 2415. For example, if a device fails or is deprecated by a newer version of the device, the network 2415 can be configured such that network adapter 2413 can to be updated about the replacement device.

In some embodiments, the network 2415 can have a mesh network configuration (e.g., ZIGBEE). Mesh configurations may be contrasted with conventional star/tree network configurations in which the networked devices are directly linked to only a small subset of other network devices (e.g., bridges/switches), and the links between these devices are hierarchical. A mesh network configuration can allow infrastructure nodes (e.g., bridges, switches and other infrastructure devices) to connect directly and non-hierarchically to other nodes. The connections can be dynamically self-organize and self-configure to route data. By not relying on a central coordinator, multiple nodes can participate in the relay of information. In the event of a failure of one or more of the nodes or the communication links between then, the mesh network can self-configure to dynamically redistribute workloads and provide fault-tolerance and network robustness.

The computing device 2400 may be implemented in a number of different forms, as shown in the figure. For example, it may be implemented as a standard server 2420, or multiple times in a group of such servers. It may also be implemented as part of a rack server system 2424. It may also be implemented as part of network device such a modem, gateway, router, access point, repeater, mesh node, switch, hub, or security device (e.g., camera server). In addition, it may be implemented in a personal computer such as a laptop computer 2422. Alternatively, components from computing device 2400 may be combined with other components in a mobile device (not shown), such as device 2450. In some embodiments, the device 2450 can be a mobile telephone (e.g., a smartphone), a handheld computer, a tablet computer, a network appliance, a camera, an enhanced general packet radio service (EGPRS) mobile phone, a media player, a navigation device, an email device, a game console, an interactive or so-called "smart" television, a media streaming device, or a combination of any two or more of these data processing devices or other data processing devices. In some implementations, the device 2450 can be included as part of a motor vehicle (e.g., an automobile, an emergency vehicle (e.g., fire truck, ambulance), a bus). Each of such devices may contain one or more of computing device 2400, 2450, and an entire system may be made up of multiple computing devices 2400, 2450 communicating with each other through a low speed bus or a wired or wireless network.

Computing device 2450 includes a processor 2452, memory 2464, an input/output device such as a display 2454, a communication interface 2466, and a transceiver 2468, among other components. The device 2450 may also be provided with a storage device, such as a microdrive or other device, to provide additional storage. Each of the components 2450, 2452, 2464, 2454, 2466, and 2468, are interconnected using various buses, and several of the components may be mounted on a common motherboard or in other manners as appropriate.

The processor 2452 can process instructions for execution within the computing device 2450, including instructions stored in the memory 2464. The processor may also include separate analog and digital processors. The processor may provide, for example, for coordination of the other components of the device 2450, such as control of user interfaces, applications run by device 2450, and wireless communication by device 2450.

Processor 2452 may communicate with a user through control interface 2458 and display interface 2456 coupled to a display 2454. The display 2454 may be, for example, a TFT LCD display or an OLED display, or other appropriate display technology. The display interface 2456 may comprise appropriate circuitry for driving the display 2454 to present graphical and other information to a user. The control interface 2458 may receive commands from a user and convert them for submission to the processor 2452. In addition, an external interface 2462 may be provide in communication with processor 2452, so as to enable near area communication of device 2450 with other devices. External interface 2462 may provide, for example, for wired communication (e.g., via a docking procedure) or for wireless communication (e.g., via Bluetooth or other such technologies).

The memory 2464 stores information within the computing device 2450. In one implementation, the memory 2464 is a computer-readable medium. In one implementation, the memory 2464 is a volatile memory unit or units. In another implementation, the memory 2464 is a non-volatile memory unit or units. Expansion memory 2474 may also be provided and connected to device 2450 through expansion interface 2472, which may include, for example, a SIMM card interface. Such expansion memory 2474 may provide extra storage space for device 2450, or may also store applications or other information for device 2450. Specifically, expansion memory 2474 may include instructions to carry out or supplement the processes described above, and may include secure information also. Thus, for example, expansion memory 2474 may be provide as a security module for device 2450, and may be programmed with instructions that permit secure use of device 2450. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 2464, expansion memory 2474, or memory on processor 2452.

Device 2450 may communicate wirelessly through communication interface 2466, which may include digital signal processing circuitry where necessary. Communication interface 2466 may provide for communications under various modes or protocols, such as GSM voice calls, Voice Over LTE (VOLTE) calls, SMS, EMS, or MMS messaging, CDMA, TDMA, PDC, WCDMA, CDMA2000, GPRS, WiMAX, LTE, among others. Such communication may occur, for example, through radio-frequency transceiver 2468. In addition, short-range communication may occur, such as using a Bluetooth, WiFi, or other such transceiver (not shown). In addition, GPS receiver module 2470 may provide additional wireless data to device 2450, which may be used as appropriate by applications running on device 2450.

Device 2450 may also communication audibly using audio codec 2460, which may receive spoken information from a user and convert it to usable digital information. Audio codex 2460 may likewise generate audible sound for a user, such as through a speaker, e.g., in a handset of device 2450. Such sound may include sound from voice telephone calls, may include recorded sound (e.g., voice messages, music files, etc.) and may also include sound generated by applications operating on device 2450.

The computing device 2450 may be implemented in a number of different forms, as shown in the figure. For example, it may be implemented as a cellular telephone 2480. It may also be implemented as part of a smartphone 2482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

Some communication networks can be configured to carry power as well as information on the same physical media. This allows a single cable to provide both data connection and electric power to devices. Examples of such shared media include power over network configurations in which power is provided over media that is primarily or previously used for communications. One specific embodiment of power over network is Power Over Ethernet (POE) which pass electric power along with data on twisted pair Ethernet cabling. Examples of such shared media also include network over power configurations in which communication is performed over media that is primarily or previously used for providing power. One specific embodiment of network over power is Power Line Communication (PLC) (also known as power-line carrier, power-line digital subscriber line (PDSL), mains communication, power-line telecommunications, or power-line networking (PLN), Ethernet-Over-Power (EOP)) in which data is carried on a conductor that is also used simultaneously for AC electric power transmission.

The computing system can include clients and servers. A client and server are generally remote from each other and typically interact through a communication network. The relationship of client and server arises by virtue of computer programs running on the respective computers and having a client-server relationship to each other.

The computing system can include routers, gateways, modems, switches, hub, bridges, and repeaters. A router is a networking device that forwards data packets between computer networks and performs traffic directing functions. A network switch is a networking device that connects networked devices together by performing packet switching to receive, process, and forward data to destination devices. A gateway is a network device that allows data to flow from one discrete network to another. Some gateways can be distinct from routers or switches in that they can communicate using more than one protocol and can operate at one or more of the seven layers of the open systems interconnection model (OSI). A media bridge is a network device that converts data between transmission media so that it can be transmitted from computer to computer. A modem is a type of media bridge, typically used to connect a local area network to a wide area network such as a telecommunications network. A network repeater is a network device that receives a signal and retransmits it to extend transmissions and allow the signal can cover longer distances or overcome a communications obstruction.

A number of embodiments of the invention have been described. Nevertheless, it will be understood that various modifications may be made without departing from the spirit and scope of the invention. For example, various forms of the flows shown above may be used, with steps re-ordered, added, or removed. Also, although several applications of the payment systems and methods have been described, it should be recognized that numerous other applications are contemplated. Accordingly, other embodiments are within the scope of the following claims.

What is claimed is:

1. A communications apparatus comprising:
a communications circuit comprising:
a first communications system configured to communicate with a first communications network over a first communications medium;
a second communications system configured to communicate with the first communications network over a second communications medium; and
a communications port configured to communicate with a second communications network;
a power circuit comprising:
a first power system configured to power the communications apparatus with a first power source; and
a second power system configured to power the communications apparatus with a second power source; and
a processing system configured to be powered by the power circuit and selectively control communications flows between the communications port and at least one of the first communications system and the second communications system;
wherein selectively controlling communications flows between the communications port and at least one of the first communications system and the second communications system comprises:
identifying a data connection between a first endpoint on the first communications network and a second endpoint on the second communications network;
identifying a first data packet of the data connection;
identifying a second data packet of the data connection;
routing the first data packet through the first communications system; and
routing the second data packet through the second communications system.

2. The apparatus of claim 1, wherein the power circuit further comprises a power selection circuit configured to:
determine availability of power from the first power system and the second power system;
selectively source power from the first power source or the second power source based on the determined availability; and
power at least one of the communications circuit and the processing system with the selectively sourced power.

3. The apparatus of claim 2, wherein the power selection circuit further configured to:
determine costs of power from the first power system and the second power system; and
selectively source power from the first power source or the second power source based on the determined costs.

4. The apparatus of claim 1, wherein the first power source comprises a main power source.

5. The apparatus of claim 1, wherein the second power system comprises an onboard uninterruptable power supply (UPS).

6. The apparatus of claim 1, wherein selectively controlling communications flows between the communications port and at least one of the first communications system and the second communications system comprises:
  determining a first communications bandwidth to the first communications network through the first communications system;
  determining a second communications bandwidth to the first communications network through the second communications system; and
  routing communications between the first communications network and the second communications network through at least one of the first communications system and the second communications system based on the first communications bandwidth and the second communications bandwidth.

7. The apparatus of claim 1, wherein selectively controlling communications flows between the communications port and at least one of the first communications system and the second communications system comprises:
  determining a first cost of communications with the first communications network through the first communications system;
  determining a second cost of communications with the first communications network through the second communications system; and
  routing communications between the first communications network and the second communications network through at least one of the first communications system and the second communications system based on the first cost and the second cost.

8. The apparatus of claim 1, wherein the first communications network is the Internet.

9. The apparatus of claim 1, wherein the second communications network is a local area network (LAN).

10. The apparatus of claim 1, wherein selectively controlling communications flows between the communications port and at least one of the first communications system and the second communications system comprises:
  identifying a data connection to a remote target between a first endpoint on the first communications network and a second endpoint on the second communications network, and
  dividing the data connection to the remote target between the first communications system and the second communications system.

11. The apparatus of claim 10, wherein dividing a connection to a remote target between the first communications system and the second communications system further comprises:
  identifying a first data packet of the data connection, and
  identifying a second data packet of the data connection.

12. The apparatus of claim 11, further comprising:
  routing the first data packet through the first communications system to the remote target; and
  routing the second data packet through the second communications system to the remote target.

13. The apparatus of claim 1, further comprising:
  determining that at least one of the first communications system and the second communications system is unavailable.

14. The apparatus of claim 13, further comprising:
  in response to determining that at least one of the first communications system and the second communications system is unavailable, using another of the first communications system and the second communications system as a backup communications system.

15. The apparatus of claim 14, further comprising:
  determining that the at least one of the first communications system and the second communications system has become available, and using the at least one of the first communications system and the second communications system for communication.

16. The apparatus of claim 6, wherein routing communications based on the first communications bandwidth and the second communications bandwidth further comprises:
  identifying a highest bandwidth between the first communications bandwidth and the second communications bandwidth; and
  routing communications between the first communications network and the second communications network based on the identified highest bandwidth.

17. The apparatus of claim 6, further comprising:
  determining a first communications latency to the first communications network through the first communications system and a second communications latency to the second communications network through the second communications system.

18. The apparatus of claim 17, wherein routing communications between the first communications network and the second communications network through at least one of the first communications system and the second communications system based on the first communications bandwidth and the second communications bandwidth further comprises:
  routing communications between the first communications network and the second communications network through at least one of the first communications system and the second communications system based on the first communications bandwidth and the second communications bandwidth and based on first communications latency and the second communications latency.

19. The apparatus of claim 7, wherein routing communications between the first communications network and the second communications network through at least one of the first communications system and the second communications system based on the first cost and the second cost further comprises:
  determining a lowest usage cost between the first cost and the second cost; and
  routing communications between the first communications network and the second communications network through at least one of the first communications system and the second communications system based on the lowest usage cost.

20. The apparatus of claim 1, wherein one of the first power source and the second power source comprises a solar power source.

* * * * *